(12) United States Patent  
Yamamoto et al.

(10) Patent No.: US 8,000,097 B2  
(45) Date of Patent: Aug. 16, 2011

(54) INFORMATION PROCESSING DEVICE AND DISK DRIVE DEVICE

(75) Inventors: Kazuyuki Yamamoto, Kanagawa (JP); Toshio Mamiya, Tokyo (JP); Hidetoshi Kabasawa, Saitama (JP); Katsuhiko Yamada, Tokyo (JP); Takashi Yamada, Tokyo (JP); Hideaki Kumagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 12/082,174

(22) Filed: Apr. 9, 2008

(65) Prior Publication Data

US 2008/0263574 A1  Oct. 23, 2008

(30) Foreign Application Priority Data

Apr. 23, 2007  (JP) .................................. 2007-113194

(51) Int. Cl.  
 *G06F 1/16* (2006.01)
(52) U.S. Cl. ................ 361/679.37; 360/97.01; 439/638; 720/682; 340/572.1
(58) Field of Classification Search ............... 360/244.3, 360/250, 245.58, 73.03, 99.08, 97.01, 97.02; 439/135, 55, 638; 720/601, 600, 636, 671, 720/682; 361/679.3, 679.33, 679.32, 679.34, 361/679.58, 679.36, 679.46, 679.4, 679.37, 361/679.26; 369/53.42, 53.28; 340/505, 572.1, 10.1, 3.3; 312/223.2, 332.1, 223.1
See application file for complete search history.

(56) References Cited

U.S. PATENT DOCUMENTS

| | | | | |
|---|---|---|---|---|
| 7,425,141 | B2 * | 9/2008 | Kanayama et al. | 439/135 |
| 2008/0253028 | A1 * | 10/2008 | Chang et al. | 360/244.3 |
| 2009/0213499 | A1 * | 8/2009 | Yamamoto et al. | 360/250 |
| 2009/0293076 | A1 * | 11/2009 | Ho | 720/601 |

FOREIGN PATENT DOCUMENTS

| | | |
|---|---|---|
| JP | 05-004421 A | 1/1993 |
| JP | 05-100770 A | 4/1993 |
| JP | 2005-032437 A | 2/2005 |

* cited by examiner

*Primary Examiner* — Hung V Duong  
(74) *Attorney, Agent, or Firm* — Wolf, Greenfield & Sacks, P.C.

(57) ABSTRACT

An information processing device is provided. The device includes an upper enclosure; a lower enclosure which supports the upper enclosure with a varied attitude and on which the upper enclosure may be superposed; a disk drive device stored in the upper or lower enclosure and having a disk mounting part on which a disk-shaped recording medium is detachably mounted; and an enclosure moving mechanism setting a disk storage region to have a first thickness with the upper enclosure allowed to have a distance from the lower enclosure when the disk drive device is used and setting the disk storage region to have a second thickness smaller than the first thickness with the upper enclosure allowed to come close to the lower enclosure to reduce the disk storage region when the disk drive device is not used.

19 Claims, 48 Drawing Sheets

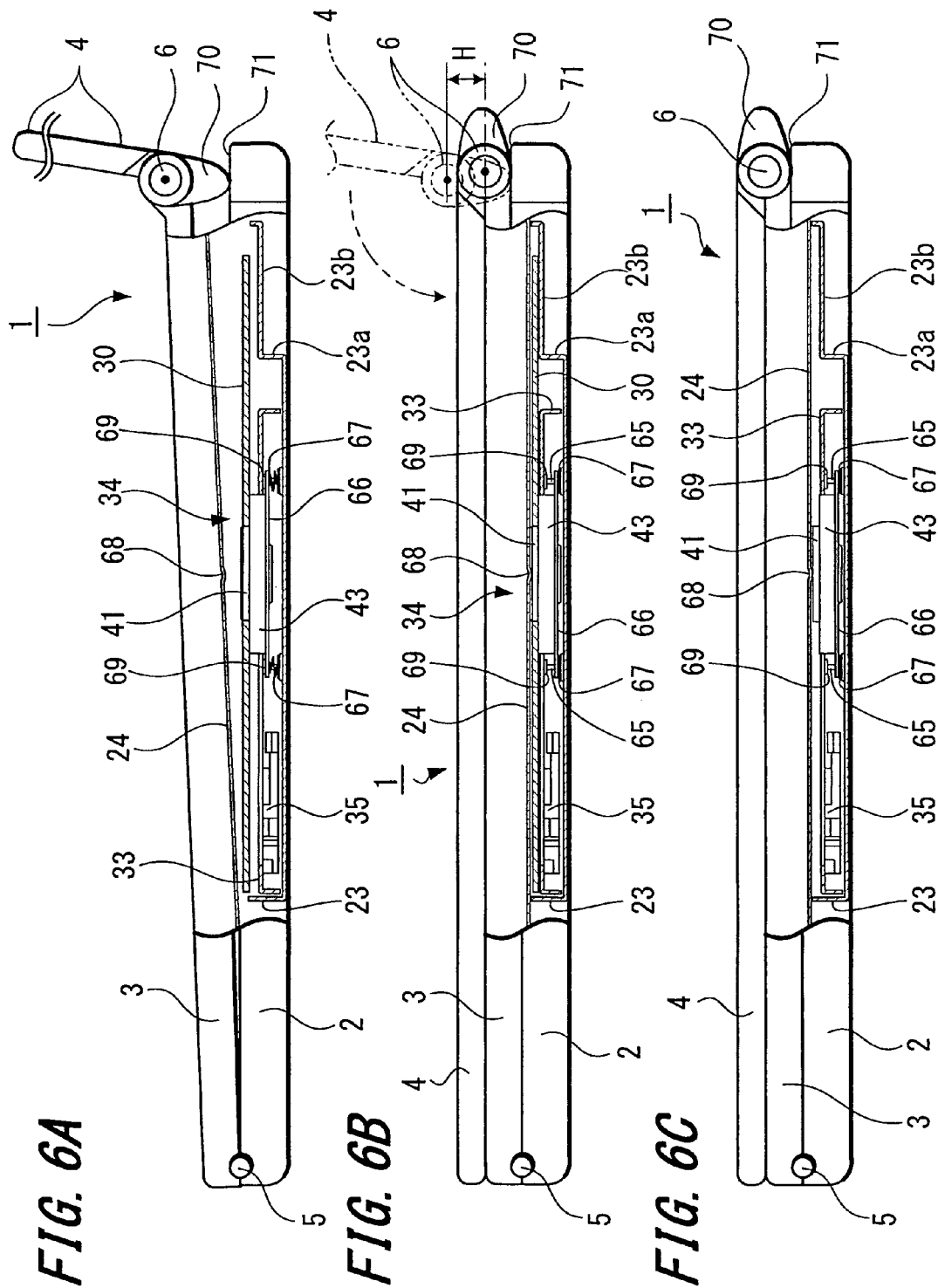

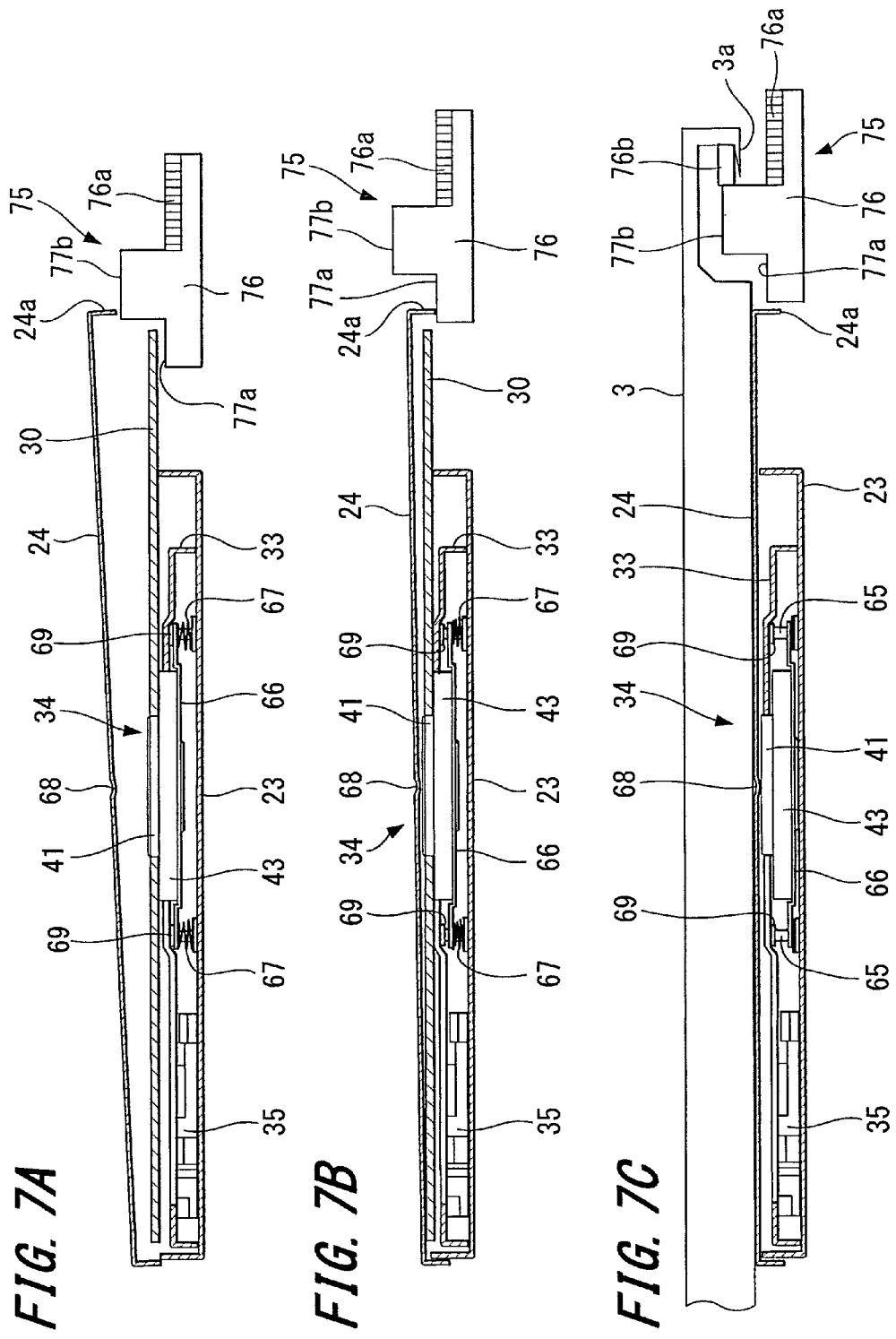

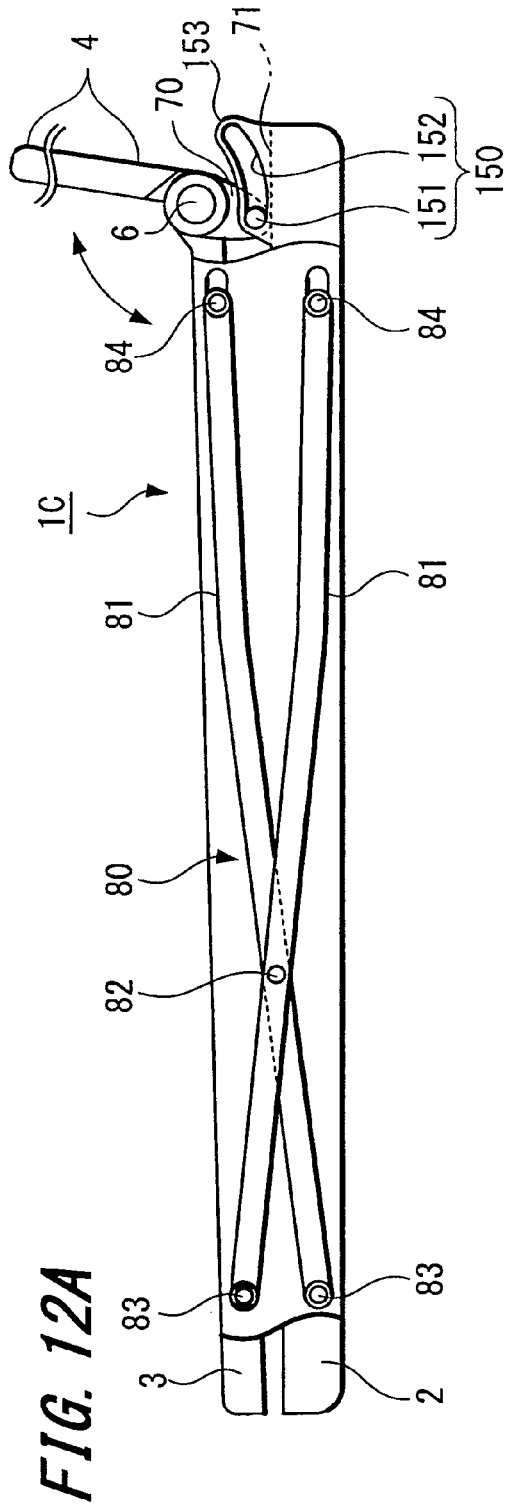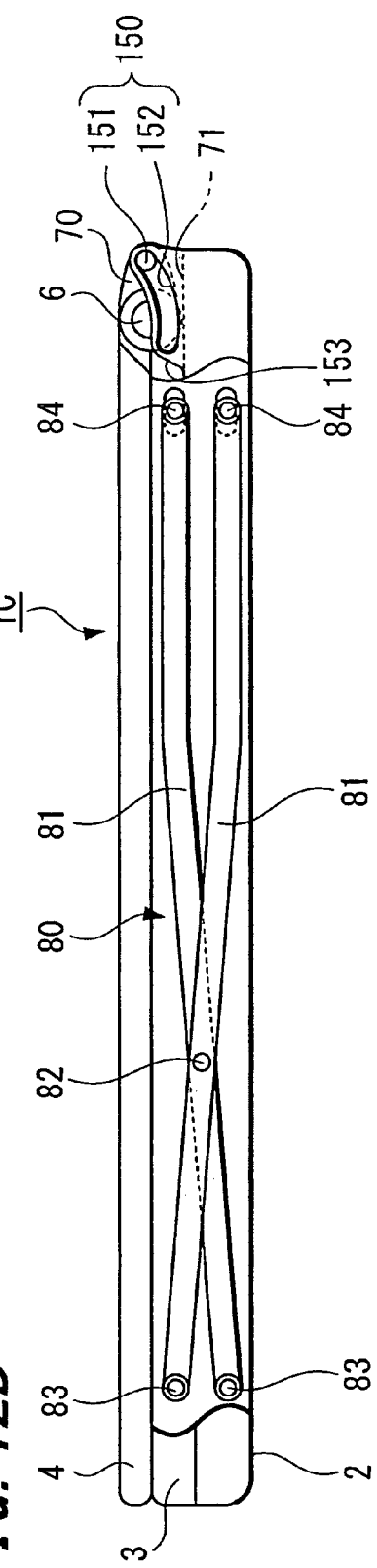

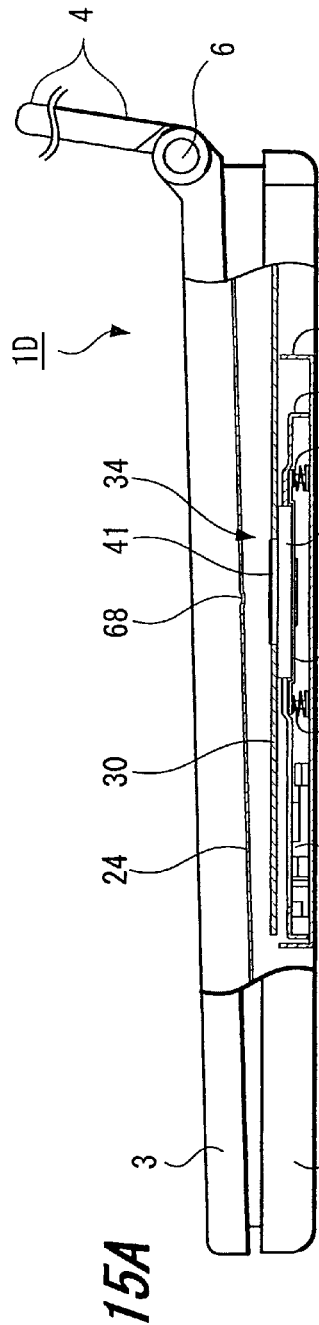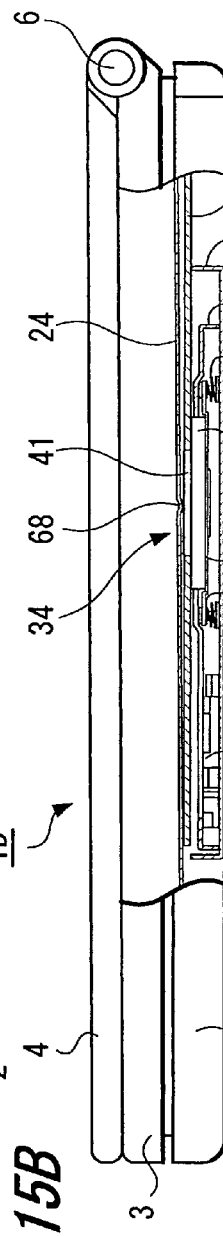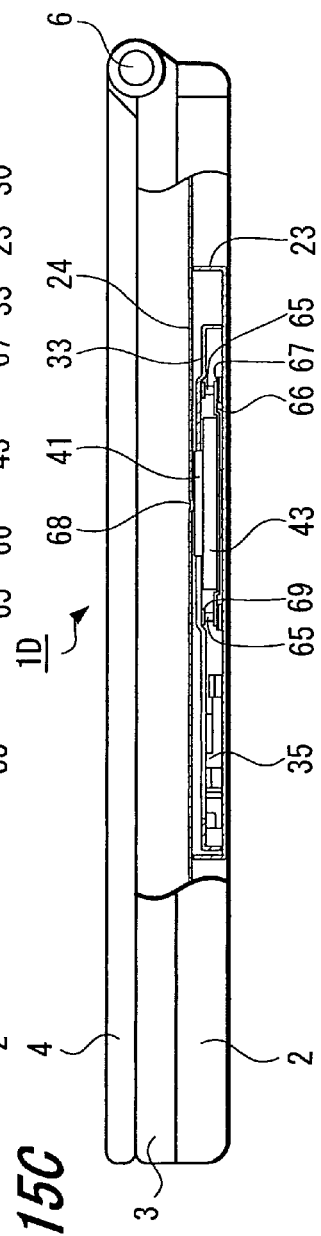

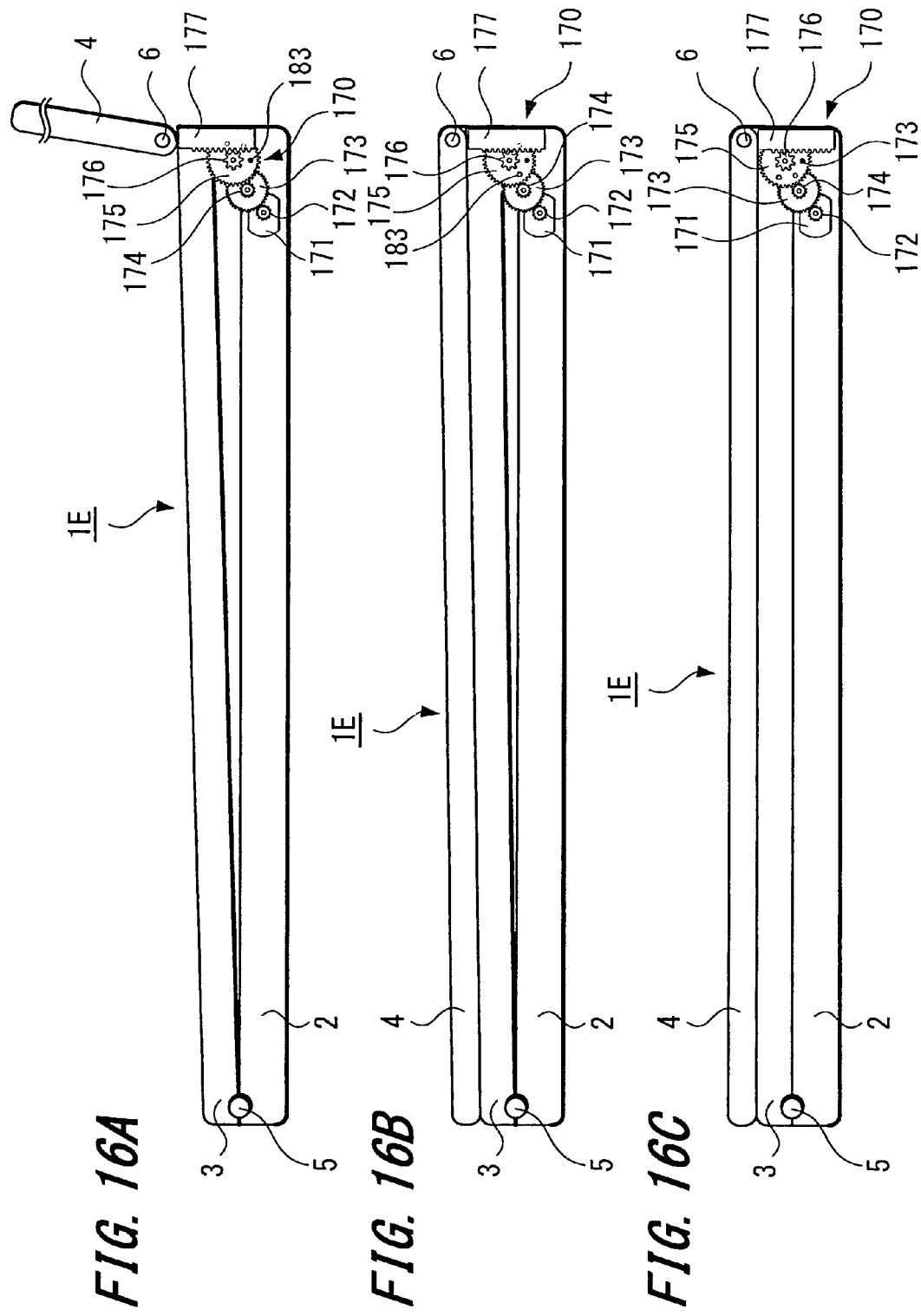

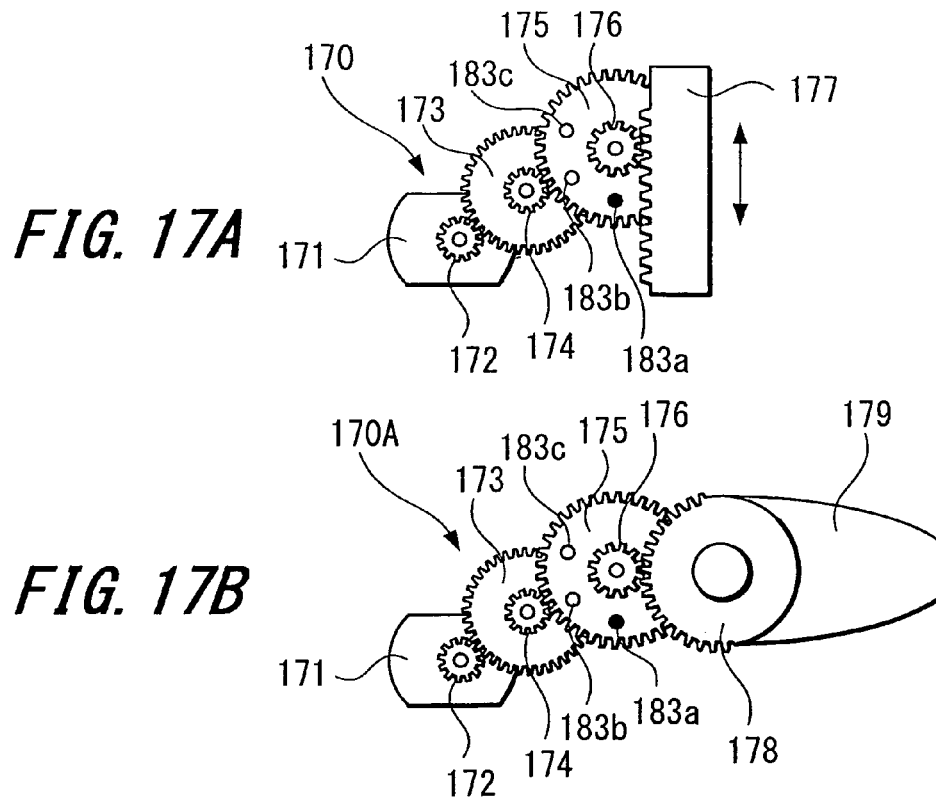
FIG. 17A
FIG. 17B
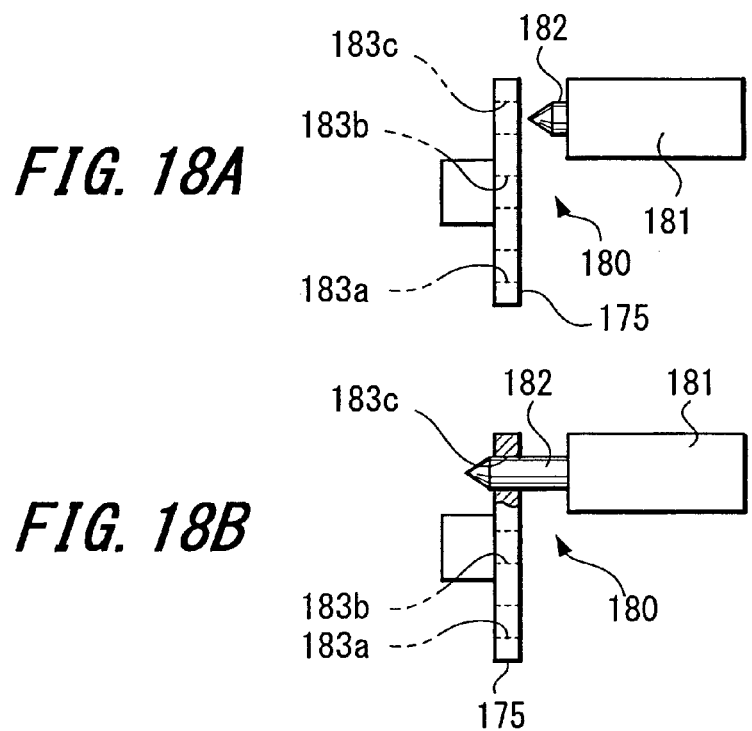
FIG. 18A
FIG. 18B

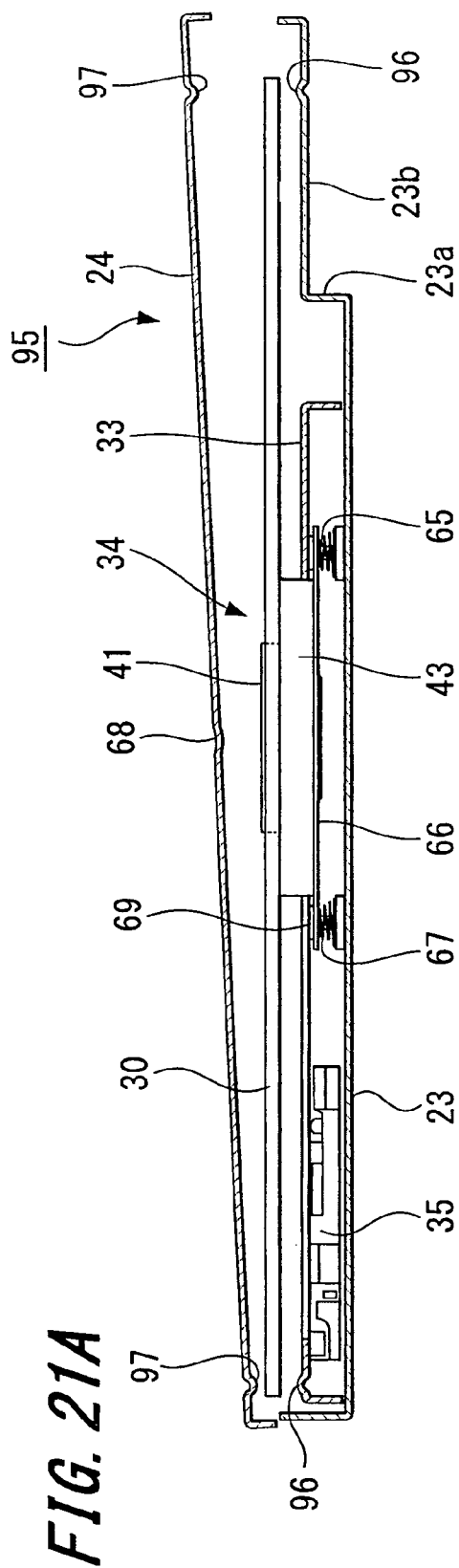
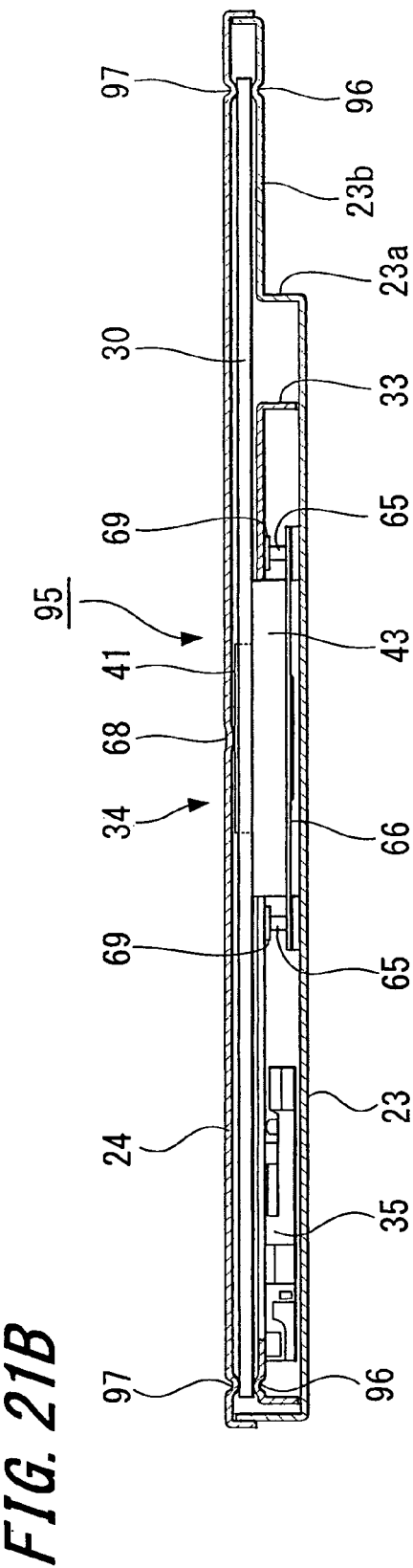
FIG. 21A
FIG. 21B

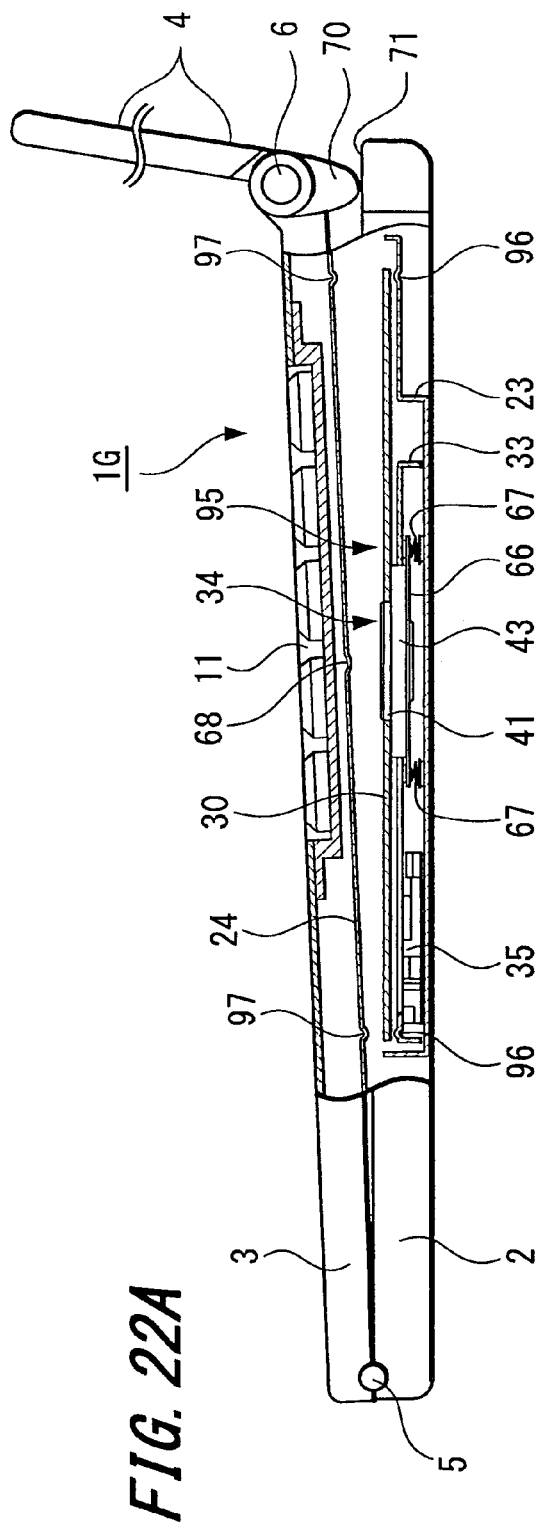
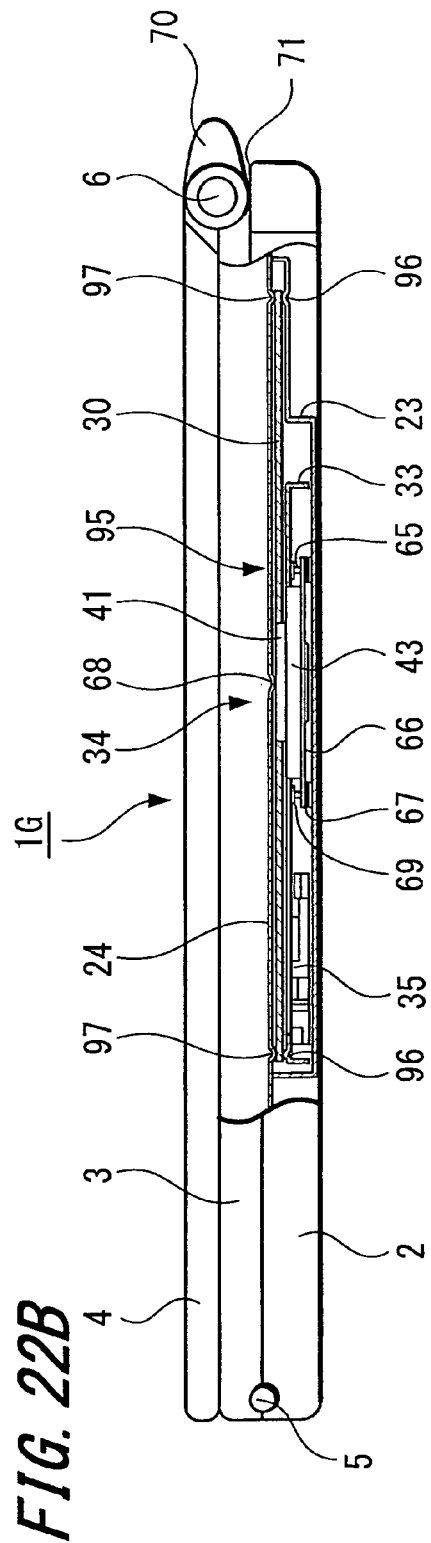
FIG. 22A
FIG. 22B

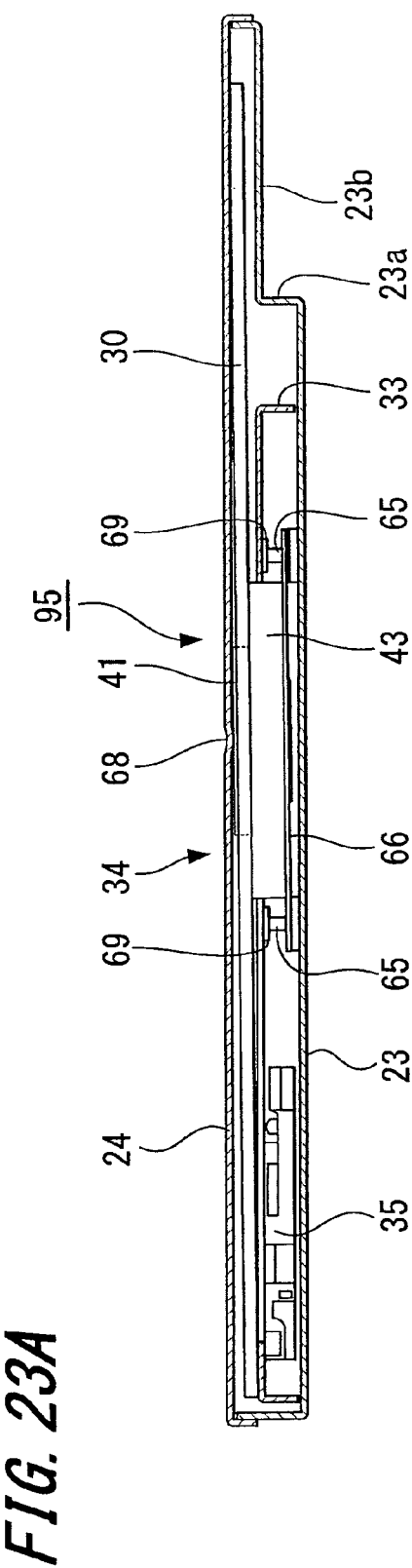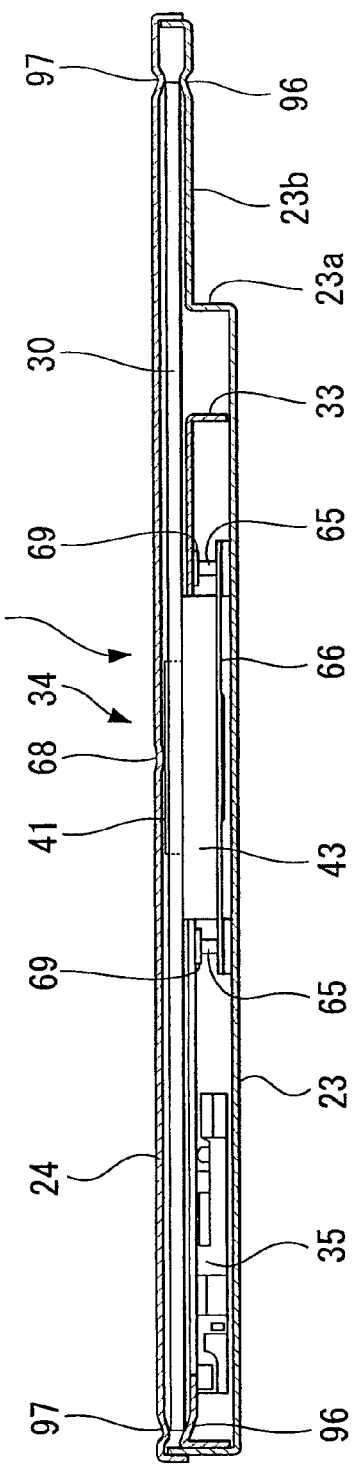

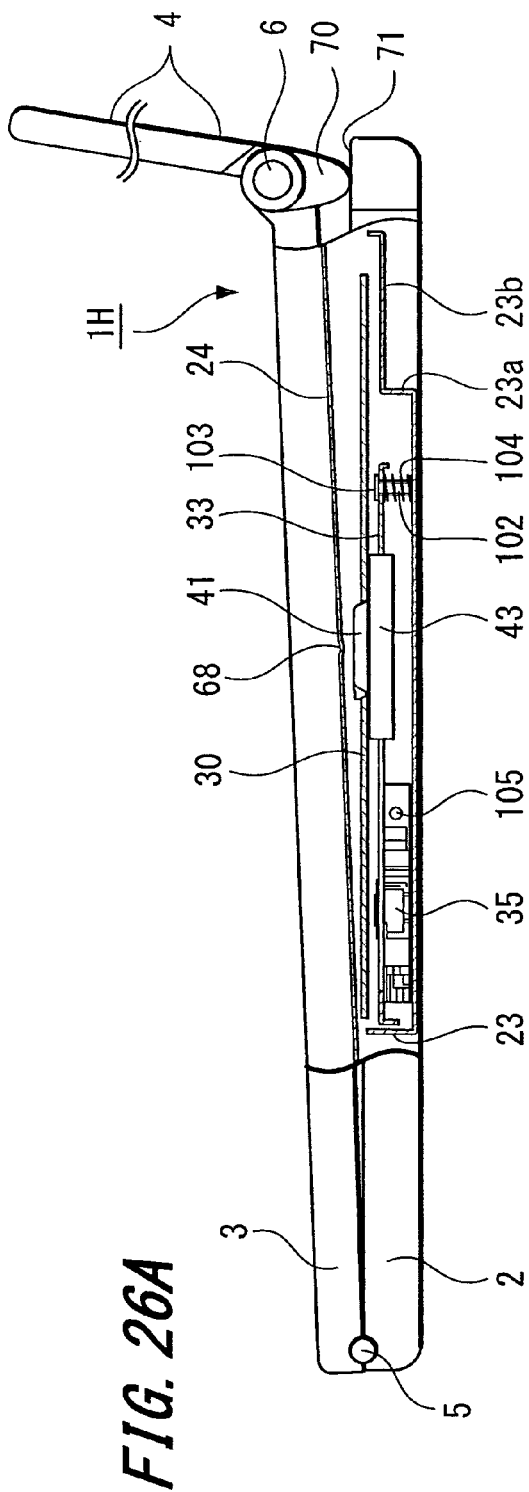
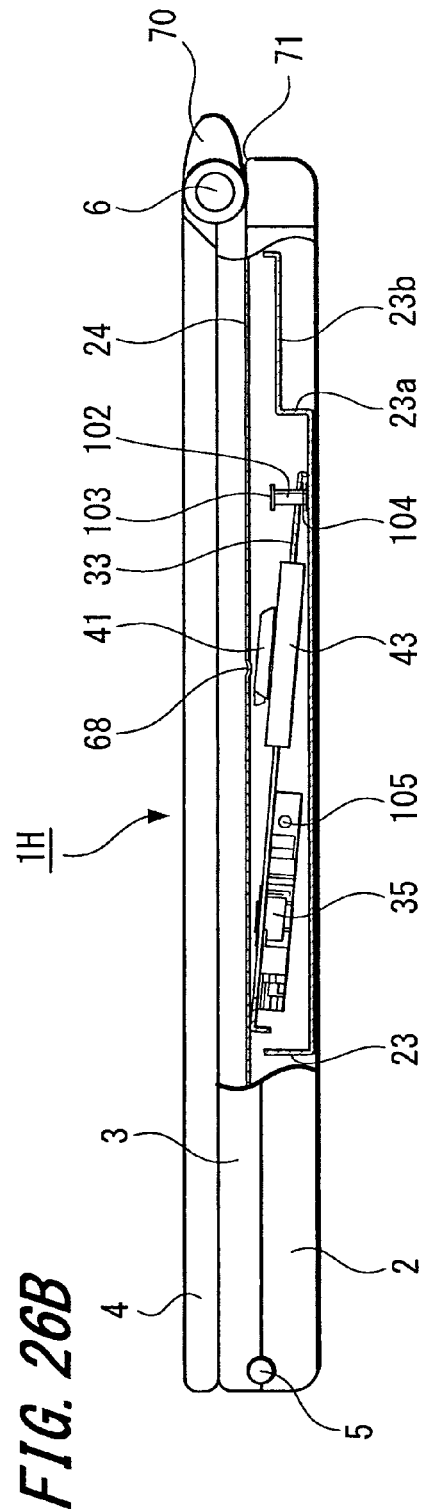

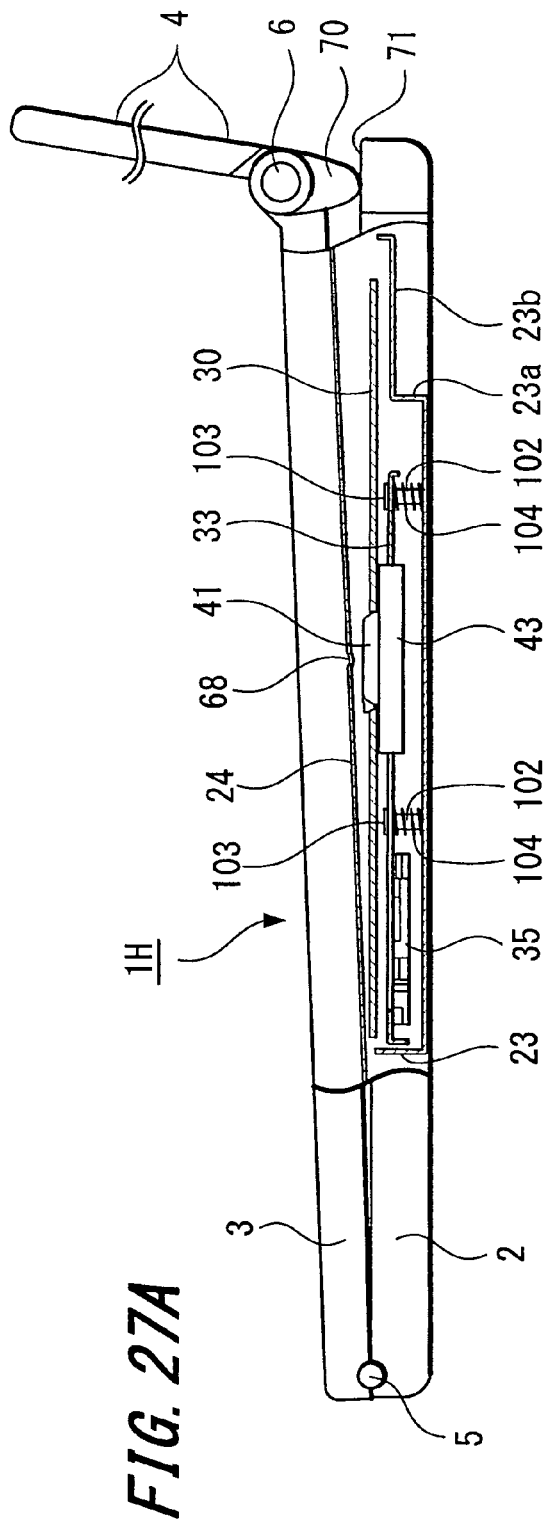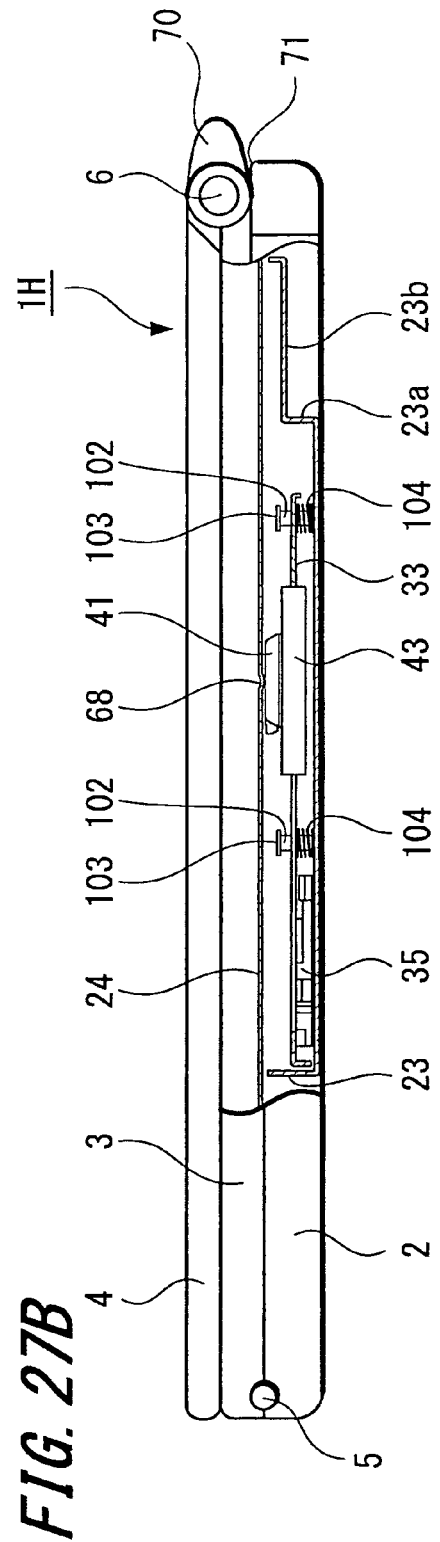

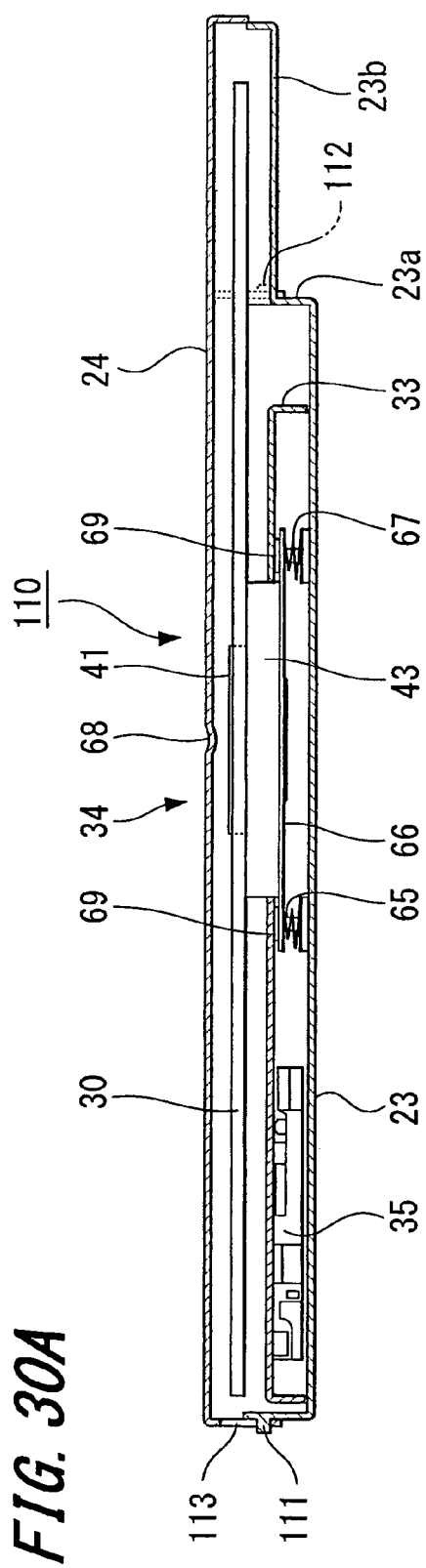
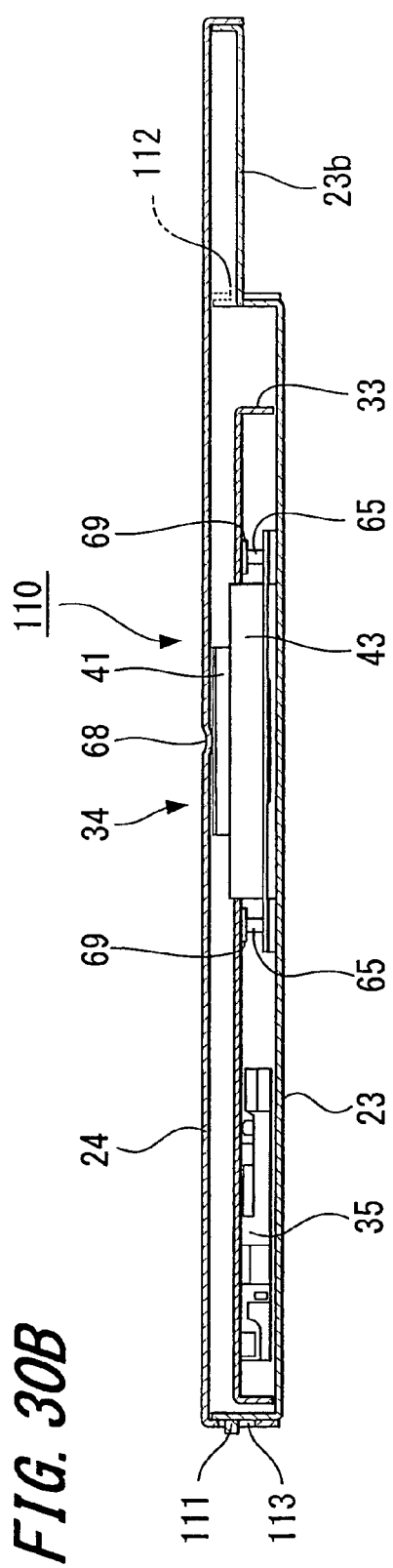
FIG. 30A
FIG. 30B

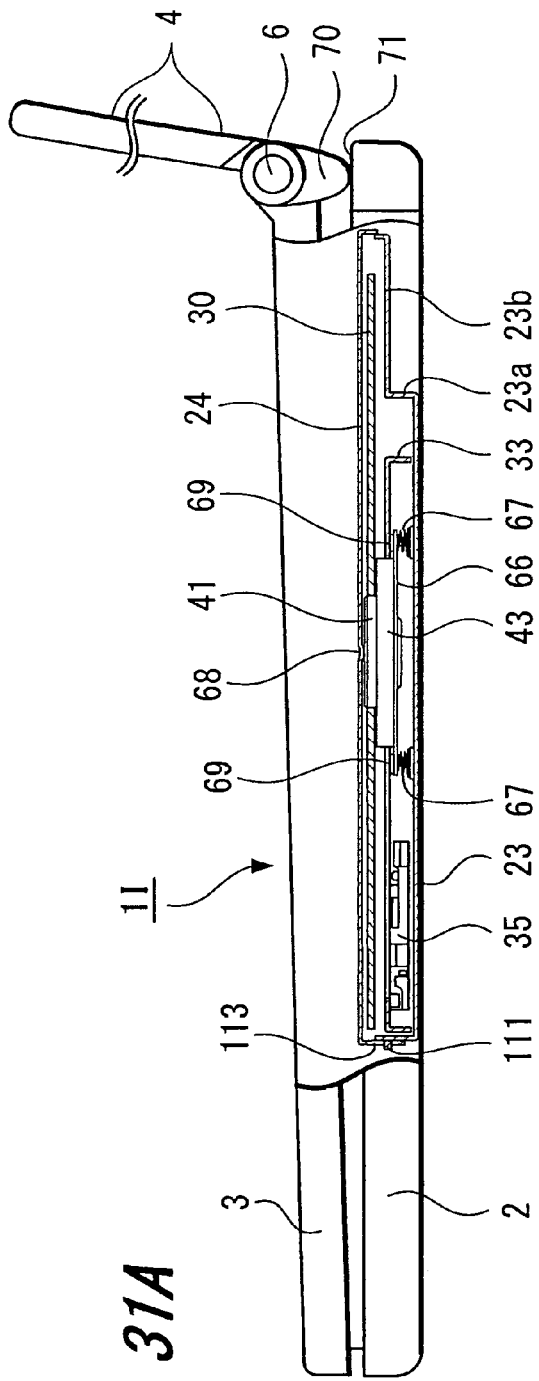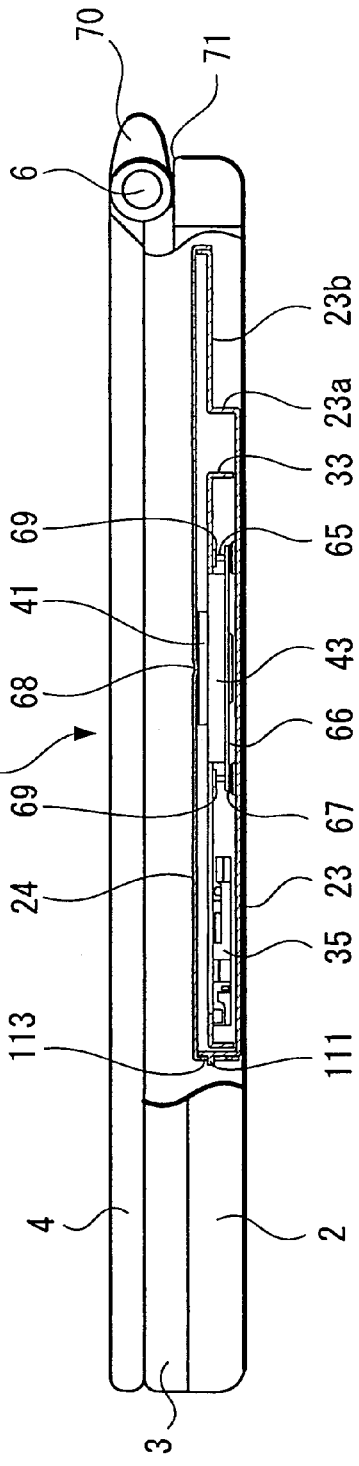

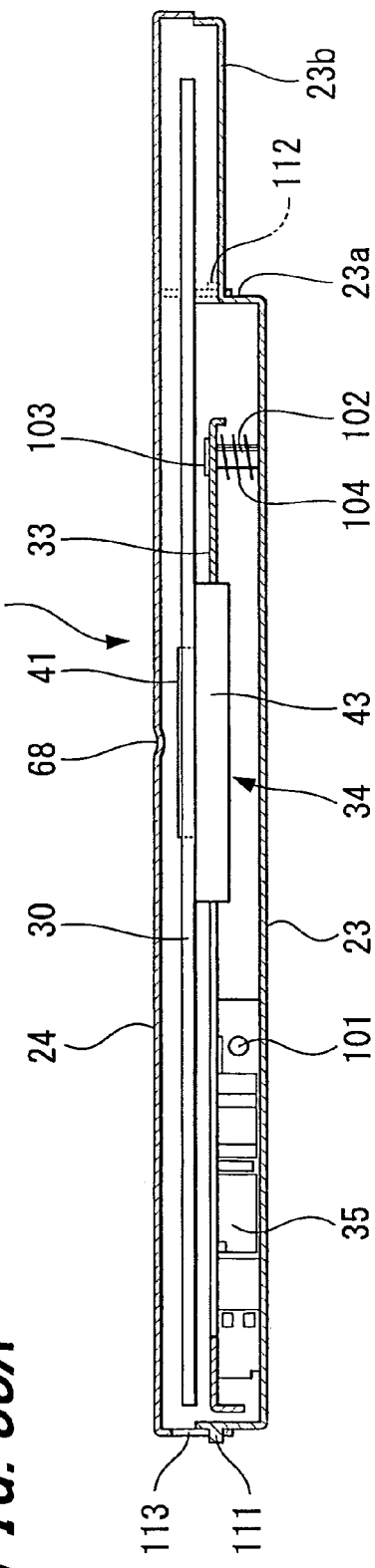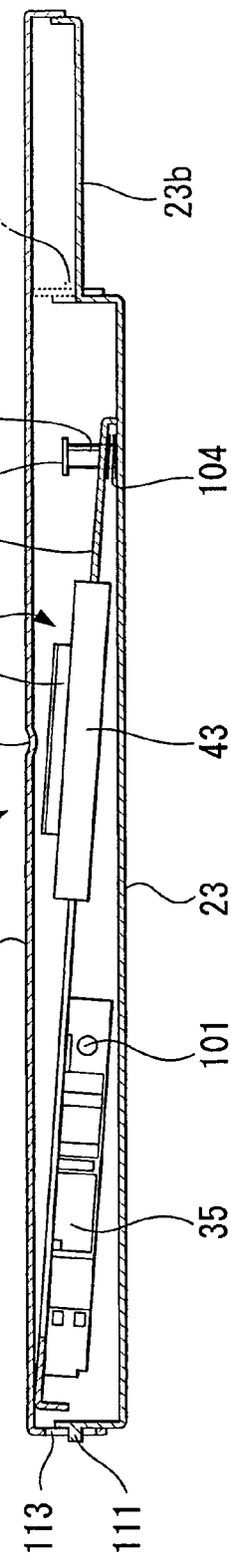
FIG. 33A
FIG. 33B

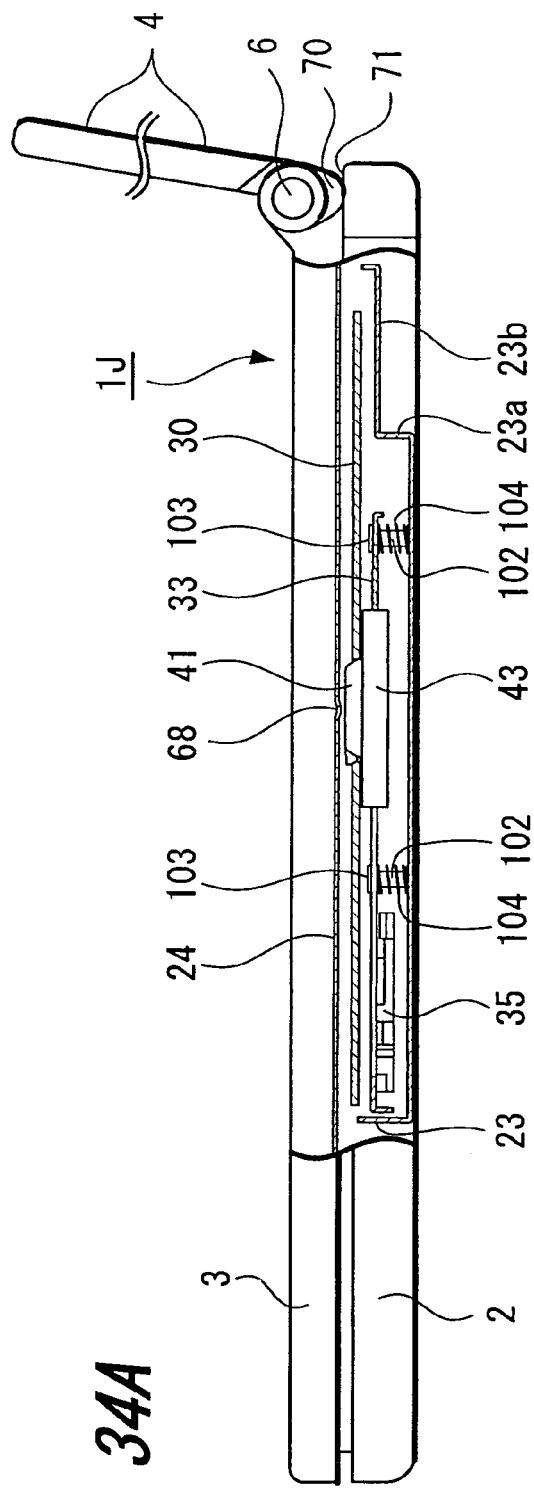
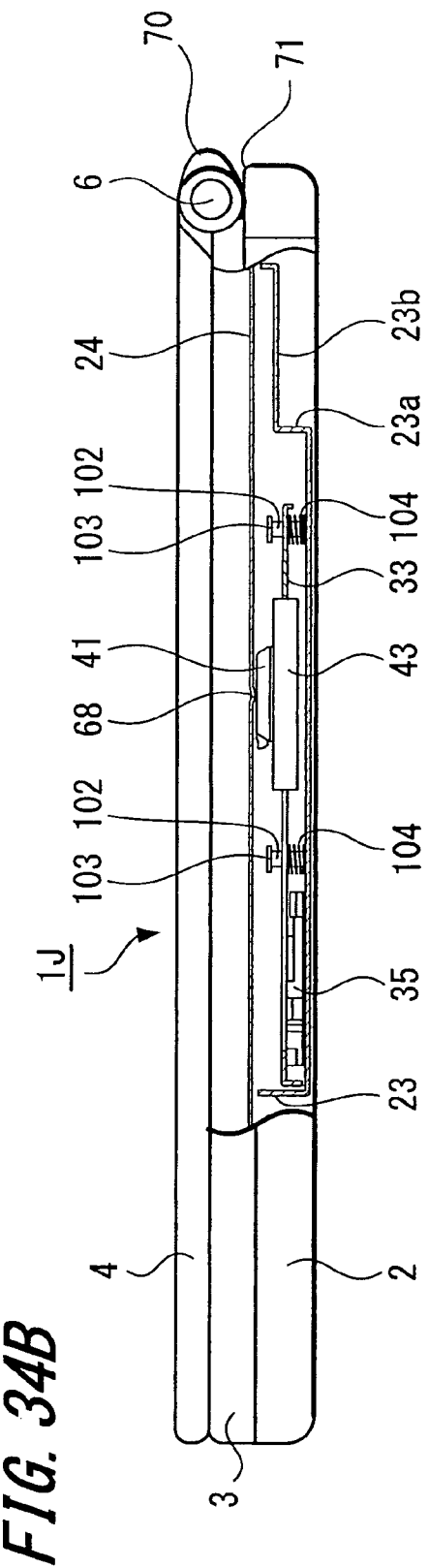
FIG. 34A
FIG. 34B

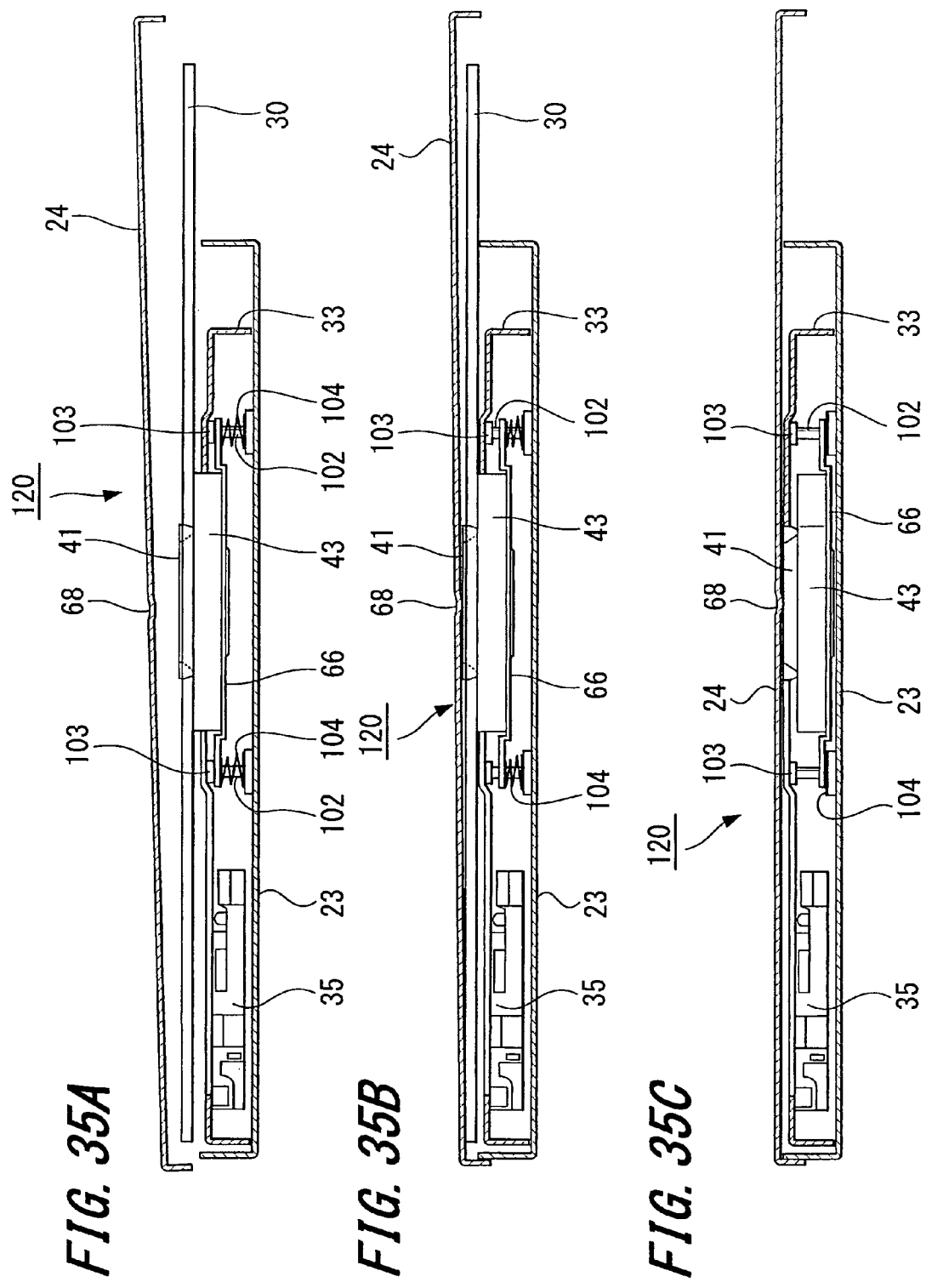

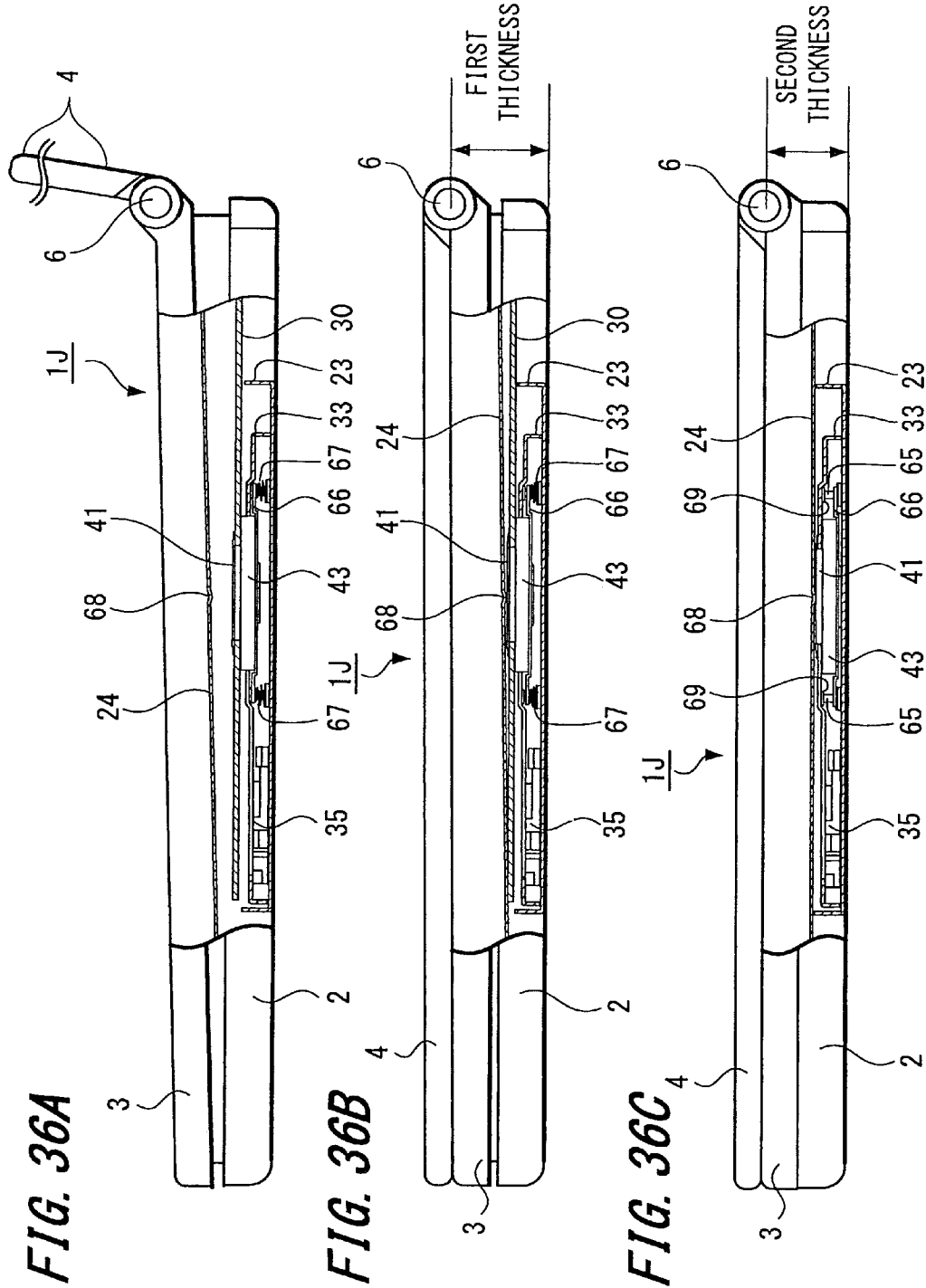

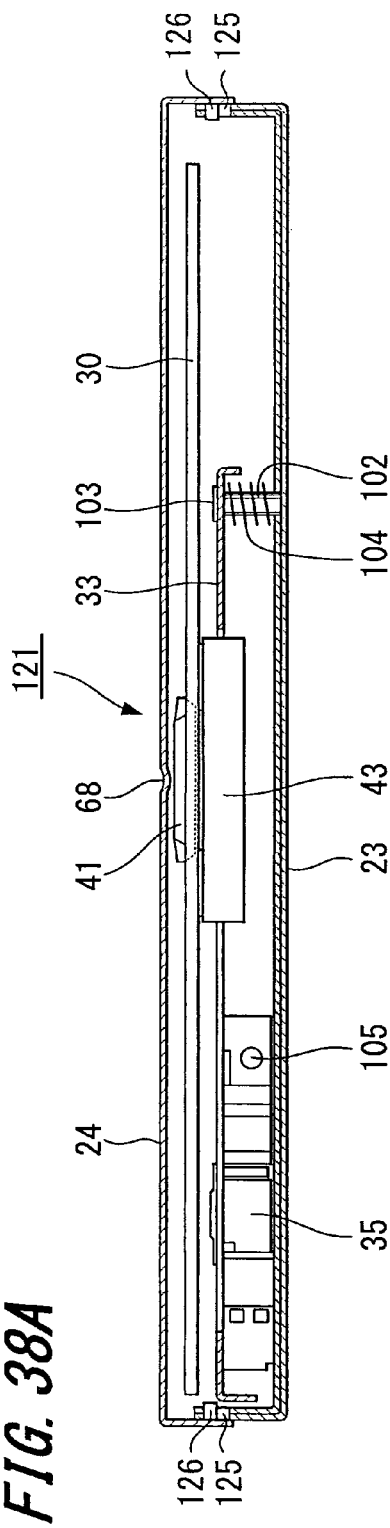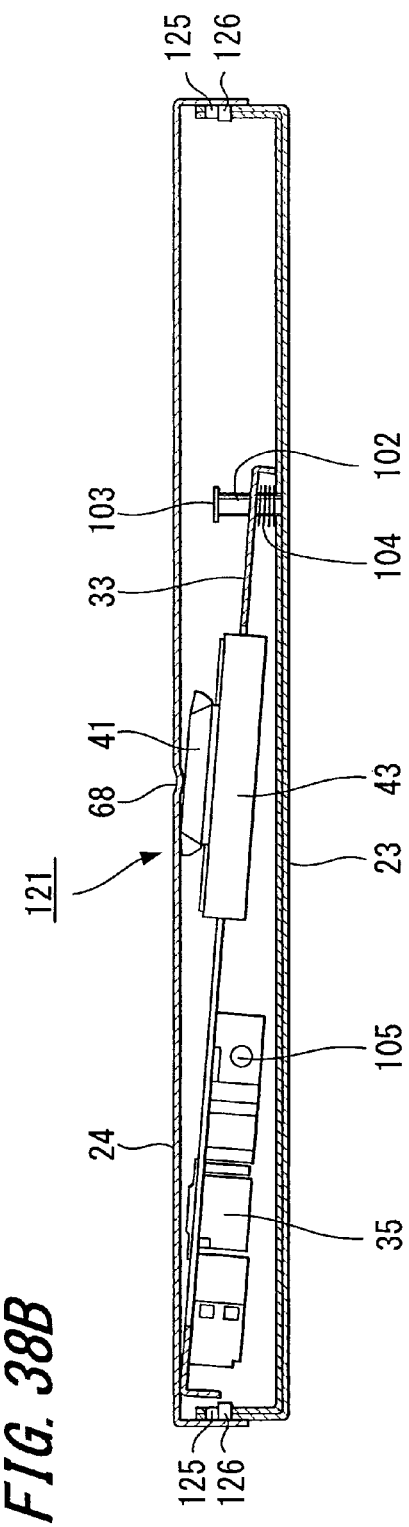
FIG. 38A
FIG. 38B

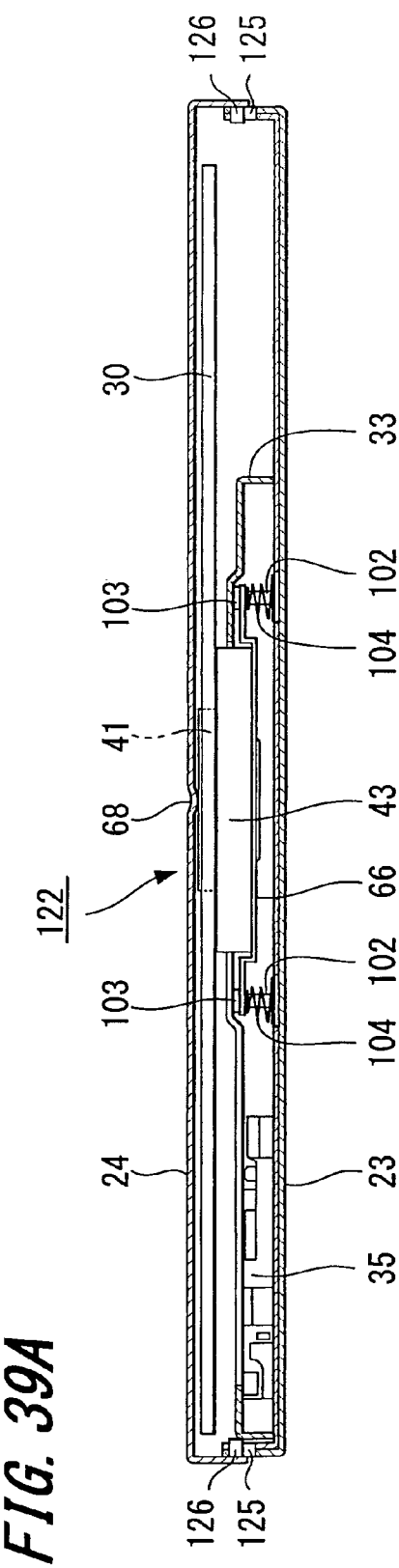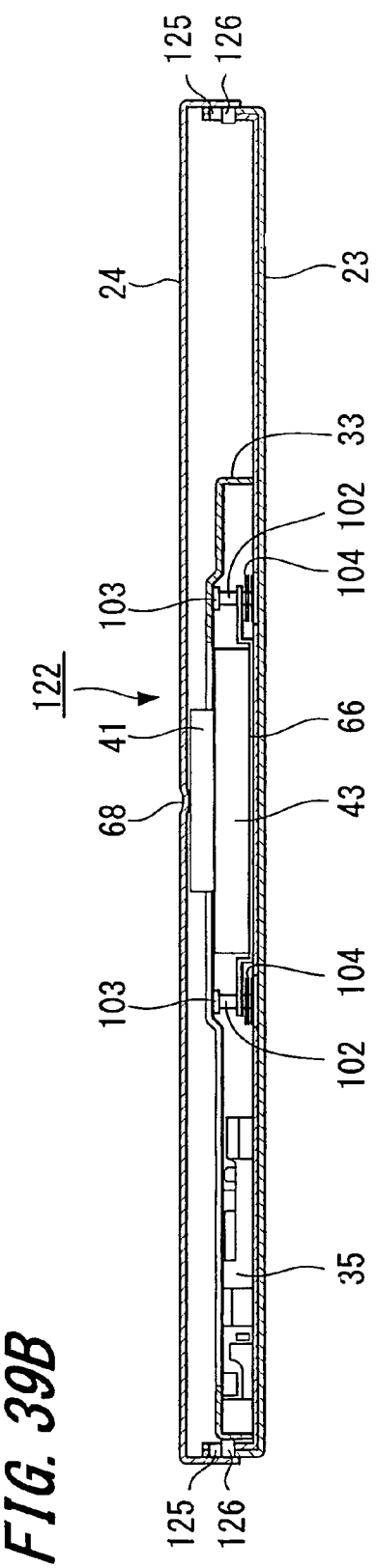

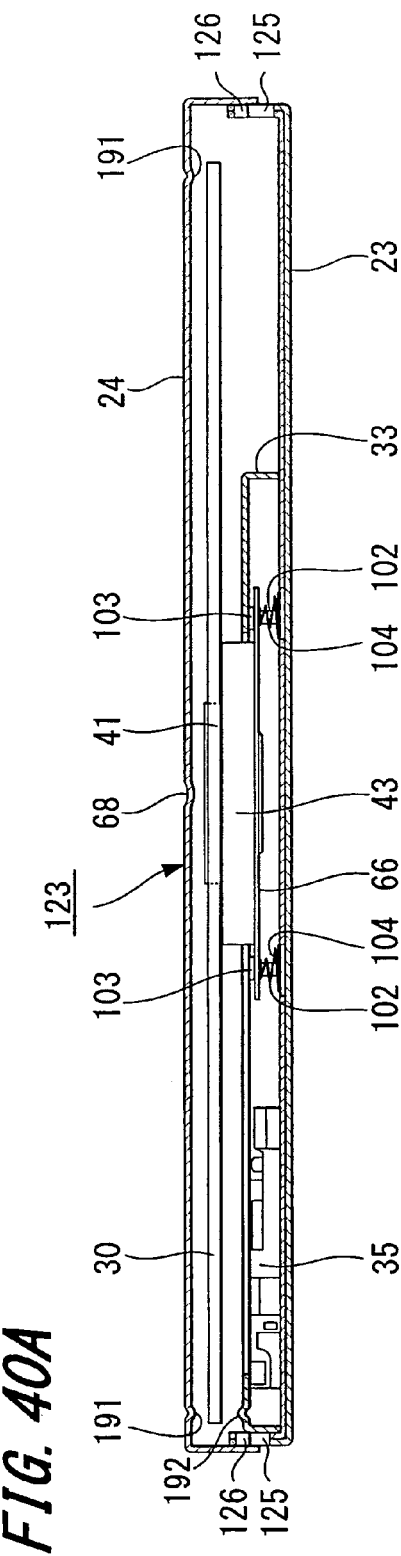
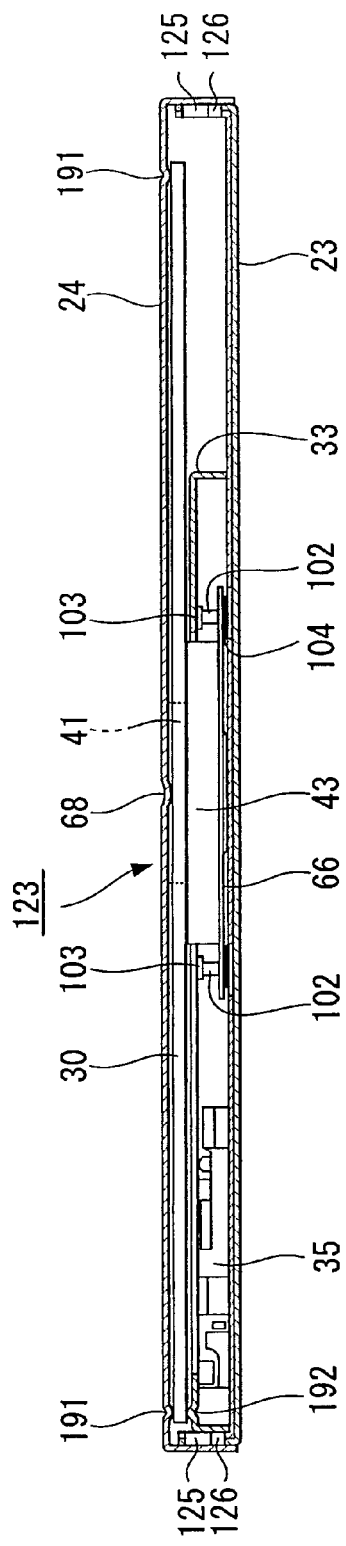
FIG. 40A
FIG. 40B

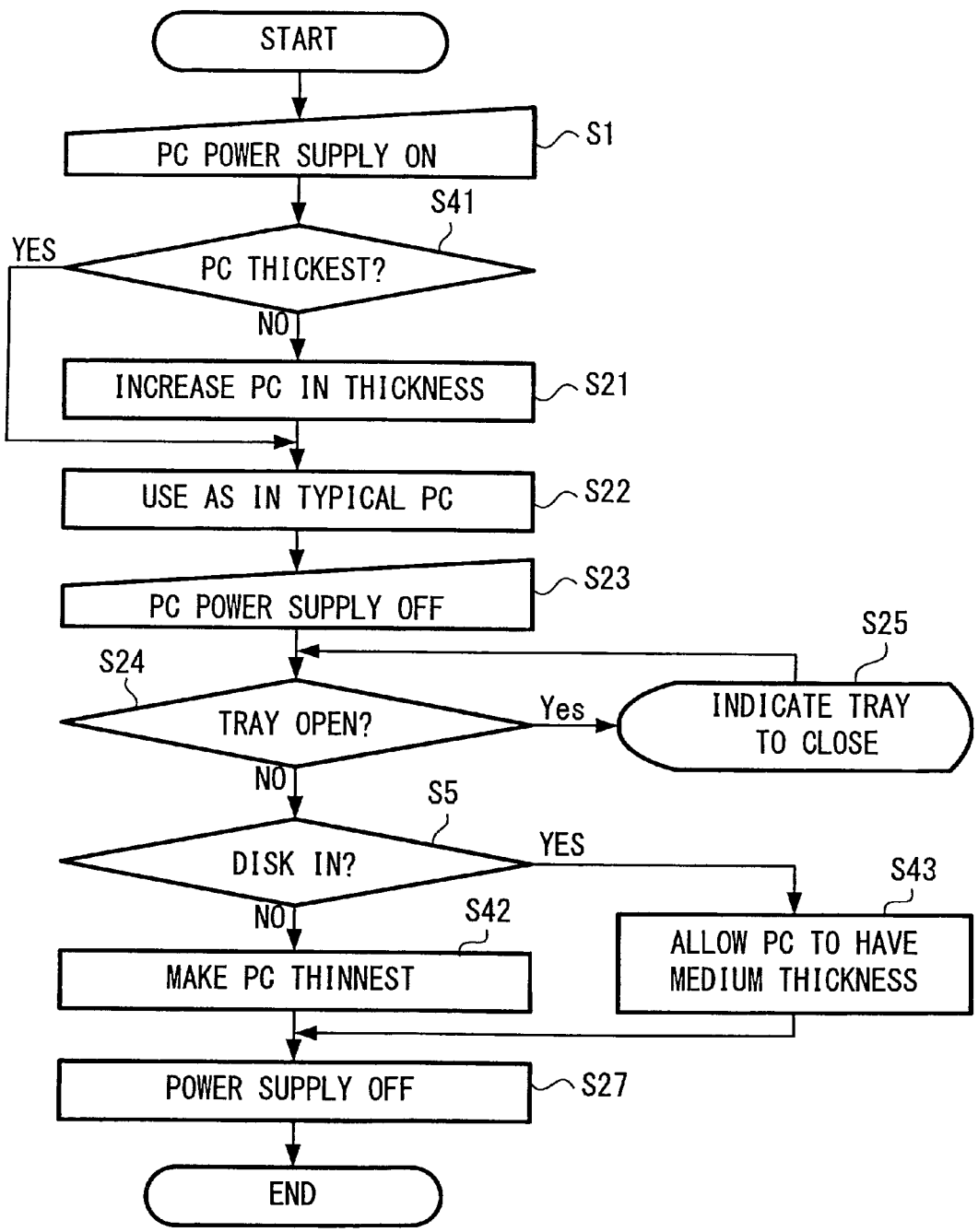

INFORMATION PROCESSING DEVICE AND DISK DRIVE DEVICE

CROSS REFERENCES TO RELATED APPLICATIONS

The present invention contains subject matter related to Japanese Patent Application JP 2007-113194 filed in the Japanese Patent Office on Apr. 23, 2007, the entire contents of which being incorporated herein by reference.

BACKGROUND OF THE INVENTION

1. Field of the Invention

The present invention relates to an information processing device rotationally driving a disk-shaped recording medium to record and/or reproduce an information signal using a pickup part and performing information processing based on the recording and/or reproduction, and to a disk drive device suitably used in the information processing device.

2. Description of the Related Art

Generally, optical disks such as CDs (Compact Disks) and DVDs (Digital Versatile Disks), magneto-optical disks such as MDs (Mini Disks) or magnetic disks such as FDs (Floppy Disks) are widely known as disk-shaped recording media. Various information processing devices are provided to record and reproduce an information signal using the disk-shaped recording media. In particular, information processing devices and disk drive devices using optical disks as disk-shaped recording media are often used in order to increase a storage capacity and a processing speed, for example.

Typical examples of such information processing devices include laptop computers (laptops). The laptops are widely used as mobile information processing devices but are strongly demanded to be thinner. Accordingly, disk drive devices mounted in laptops or the like are also highly strongly demanded to be thinner. A thinned disk drive device mounted in a current laptop or the like has a standard thickness of about 12.7 mm, and a thinnest disk drive device having a thickness of 9.5 mm is also provided in the market.

Japanese Unexamined Patent Application Publication No. 2006-65989 discloses an example of such an information processing device of the related art. Japanese Unexamined Patent Application Publication No. 2006-65989 discloses an electronic device including a first unit having a keyboard; and a second unit connected to the first unit through a connection part, the second unit openable and closable relative to the first unit, and a program executed in the electronic device. The electronic device disclosed in Japanese Unexamined Patent Application Publication No. 2006-65989 "includes a first unit; and a second unit connected to the first unit through a connection part openably and closably supporting the second unit. The electronic device further includes a media drive having a storage medium mounted thereon or removed therefrom according to an operation and driving the mounted storage medium to access the storage medium; and an operation inhibition part setting or releasing an operation inhibition mode inhibiting an operation of the media drive and/or driving of the storage medium by the media drive according to an attitude of the second unit relative to the first unit."

In an electronic device having such a configuration, it is expected that "a storage medium is inhibited from being driven in an unstable attitude so that a storage medium or a media drive is prevented from being broken, and/or an operation drive is prevented from being accidentally operated so that a storage medium avoids being accidentally removed, dropped and broken".

Japanese Unexamined Patent Application Publication No. 2004-234802 discloses an example of a disk drive device of the related art. Japanese Unexamined Patent Application Publication No. 2004-234802 discloses a device for recording an information signal on and/or reproducing an information signal from a disk-shaped recording medium. The recording and/or reproduction device disclosed in Japanese Unexamined Patent Application Publication No. 2004-234802 "includes a pickup chassis, a cover member and a disk tray. The pickup chassis includes an optical pickup, a pickup moving mechanism and a disk rotary drive mechanism. The cover member has an opening to allow a pickup and a disk table to face a recording surface of a disk-shaped recording medium and is connected to the pickup chassis to form part of a storage recess in which the disk-shaped recording medium is stored. The disk tray has the approximately arc-shaped storage recess in which the disk-shaped recording medium is stored, and the storage recess has an opening to allow the cover member to face the recording surface of the disk-shaped recording medium and is connected to the pickup chassis to close the opening with the cover member. The pickup chassis, the cover member and the disk tray are formed by members having different coefficients of linear expansion, respectively. The disk tray is provided on an outer periphery of the storage recess and has a protrusion formed on a storage wall extending on the opening to maintain a clearance between the outer peripheral wall and the cover member closing the opening."

In a recording and/or reproduction device having such a configuration, "a disk tray, a pickup chassis and a cover member are formed by members having different coefficients of linear expansion, respectively, and a protrusion is formed on a lower edge of a main body of a storage wall of the disk tray". Therefore, it is expected that "even when each component is distorted by heat in an operation of recording of recording data on an optical disk or reproduction of recording data from an optical disk, the cover member is brought into contact with the protrusion, making it possible to prevent warping of the cover member toward the optical disk and slide contact between the cover member and the optical disk".

Japanese Unexamined Patent Application Publication No. 2003-242768 discloses another example of a disk drive device of the related art. Japanese Unexamined Patent Application Publication No. 2003-242768 discloses a whole device structure for providing a small and light optical storage device. The optical storage device disclosed in Japanese Unexamined Patent Application Publication No. 2003-242768 "includes a cartridge holder into which a cartridge storing an optical storage medium is inserted; an eject motor driven to eject the cartridge; and a drive base on which the cartridge holder is mounted, where the eject motor is placed on the drive base by making use of a space behind a part on which the cartridge holder is mounted."

According to an optical storage device having such a configuration, it is expected that "a compact optical storage device may be provided which is thin, small and light and has significantly improved assembling workability", for example.

A laptop is highly strongly demanded to be thinner, and a thickness of a disk drive device crucial for providing such a thinner laptop may be demanded to be less than 9.5 mm which may be an ultimate value. However, in a disk drive device, it may be necessary to ensure a clearance having an appropriate size in order to rotate a disk-shaped recording medium and record an information signal on and reproduce an information signal from the disk-shaped recording medium without contact with the disk-shaped recording medium. Further, it is difficult to commercially produce a disk drive device with a thickness of 9.5 mm or less because of a strength of a component based on a material used, a volume limit of an optical pickup, and an increased cost due to a reduced yield, for example. Therefore, it is difficult to provide a thinner laptop.

SUMMARY OF THE INVENTION

In the related art, a thin disk drive device having a thickness of 9.5 mm or less is highly demanded; however, it is difficult to commercially produce a disk drive device having a thickness of 9.5 mm or less because of necessity of ensuring a clearance, necessity of a material strength, a volume limit of an optical pickup, and an increased cost due to a reduced yield, for example. The present invention addresses the above-identified and other problems.

According to an embodiment of the present invention, there is provided an information processing device including an upper enclosure, a lower enclosure, a disk drive device and an enclosure moving mechanism. The upper enclosure is flat rectangular parallelepiped and has an input operation part for inputting an operation signal. The lower enclosure is flat rectangular parallelepiped and supports the upper enclosure with a varied attitude, and the upper enclosure may be superposed on the lower enclosure. The disk drive device is stored in the upper enclosure or the lower enclosure and has a disk mounting part on which a disk-shaped recording medium is detachably mounted. The disk drive device may record an information signal on and/or reproduce an information signal from the disk-shaped recording medium mounted on the disk mounting part and rotationally driven. The enclosure moving mechanism sets a disk storage region to have a first thickness with the upper enclosure allowed to have a distance from the lower enclosure when the disk drive device is used and sets the disk storage region to have a second thickness smaller than the first thickness with the upper enclosure allowed to come close to the lower enclosure to reduce the disk storage region when the disk drive device is not used.

According to an embodiment of the present invention, there is provided a disk drive device including a disk rotary driving part, a pickup part, a pickup moving part, a chassis, a first member, a second member, a position limitation member and an impelling member. The disk rotary driving part has a disk mounting part, on which a disk-shaped recording medium is detachably mounted, and rotates the disk mounting part. The pickup part records an information signal on and/or reproduces an information signal from the disk-shaped recording medium mounted on the disk mounting part and rotated. The pickup moving part moves the pickup part in a radial direction of the disk-shaped recording medium. The chassis supports the disk rotary driving part, the pickup part and the pickup moving part. The first member covers a side of the chassis having the disk mounting part. The second member covers a side of the chassis opposite to the disk mounting part and is movable relative to the first member. The position limitation member supports the disk rotary driving part to come close to and have a distance from the first member and limits movement of the disk rotary driving part to come close to the first member in a predetermined position. The impelling member impels the disk rotary driving part toward the first member.

In an information processing device or a disk drive device according to an embodiment of the present invention, the disk drive device may be shrunk to compress a clearance (space) in a disk mounting part of the disk drive device and the whole device may be thinner during carrying where the device is truly demanded to be thinner. On the other hand, it is possible to increase a thickness of the disk drive device and widen the clearance in the disk mounting part in order not to prevent rotation of a disk-shaped recording medium during usage (recording and reproduction) or during activation of the disk drive device where a thickness of the whole device is not important.

BRIEF DESCRIPTION OF THE DRAWINGS

FIG. 6 is a partial cross-sectional view showing a first example of an information processing device according to an embodiment of the present invention, where FIG. 6A describes a used state, FIG. 6B describes a carried state with an optical disk stored, and FIG. 6C describes a carried state without an optical disk.

FIG. 7 is a cross-sectional view showing a first example of a disk drive device according to an embodiment of the present invention with a lock mechanism, where FIG. 7A describes a used state, FIG. 7B describes a carried state with an optical disk stored, and FIG. 7C describes a carried state without an optical disk.

FIG. 12 is a view showing a fourth example of an information processing device according to an embodiment of the present invention combined with a first example of a lifting restraint mechanism, where FIG. 12A describes a used state and FIG. 12B describes a carried state.

FIG. 15 is a partial cross-sectional view showing a fifth example of an information processing device according to an embodiment of the present invention, where FIG. 15A describes a used state, FIG. 15B describes a carried state with an optical disk stored, and FIG. 15C describes a carried state without an optical disk.

FIG. 16 is a view showing a sixth example of an information processing device according to an embodiment of the present invention, where FIG. 16A describes a used state, FIG. 16B describes a carried state with an optical disk stored, and FIG. 16C describes a carried state without an optical disk.

FIG. 17 is a view showing an example of an enclosure moving mechanism in accordance with an information processing device according to an embodiment of the present invention, where FIG. 17A describes a rack-and-pinion mechanism and FIG. 17B describes a mechanism of a gear and a cam member.

FIG. 18 is a view showing an example of a lock mechanism in accordance with an information processing device according to an embodiment of the present invention, where FIG. 18A describes a state before locking and FIG. 18B describes a locked state.

FIG. 21 is a view showing a second example of a disk drive device according to an embodiment of the present invention, where FIG. 21A describes a used state and FIG. 21B describes a carried state with an optical disk stored.

FIG. 22 is a partial cross-sectional view showing an eighth example of an information processing device according to an embodiment of the present invention, where FIG. 22A describes a used state with an optical disk and FIG. 22B describes a carried state with an optical disk stored.

FIG. 23 is a cross-sectional view showing a third example of a disk drive device according to an embodiment of the present invention, where FIG. 23A describes a used state with an optical disk and FIG. 23B describes a carried state with an optical disk.

FIG. 25 shows a fourth example of a disk drive device according to an embodiment of the present invention, where

FIG. 26 is a partial cross-sectional view showing a ninth example of an information processing device according to an embodiment of the present invention, where FIG. 26A describes a used state with an optical disk and FIG. 26B describes a carried state without an optical disk.

FIG. 27 is a partial cross-sectional view showing a tenth example of an information processing device according to an embodiment of the present invention, where FIG. 27A describes a used state with an optical disk and FIG. 27B describes a carried state without an optical disk.

FIG. 30 is a cross-sectional view showing a fifth example of a disk drive device according to an embodiment of the present invention, where FIG. 30A describes a used state with an optical disk and FIG. 30B describes a carried state without an optical disk.

FIG. 31 is a partial cross-sectional view showing an eleventh example of an information processing device according to an embodiment of the present invention, where FIG. 31A describes a used state with an optical disk and FIG. 31B describes a carried state without an optical disk.

FIG. 33 is a view showing a sixth example of a disk drive device according to an embodiment of the present invention, where FIG. 33A describes a used state with an optical disk and FIG. 33B describes a carried state without an optical disk.

FIG. 34 is a partial cross-sectional view showing a twelfth example of an information processing device according to an embodiment of the present invention, where FIG. 34A describes a used state with a disk drive device lifted and FIG. 34B describes a carried state with a disk drive device lowered.

FIG. 35 is a view showing a seventh example of a disk drive device according to an embodiment of the present invention, where FIG. 35A describes a used state with an optical disk, FIG. 35B describes a carried state with an optical disk, and FIG. 35C describes a carried state without an optical disk.

FIG. 36 is a partial cross-sectional view showing a thirteenth example of an information processing device according to an embodiment of the present invention, where FIG. 36A describes a used state with an optical disk, FIG. 36B describes a carried state with an optical disk, and FIG. 36C describes a carried state without an optical disk.

FIG. 38 is a cross-sectional view showing an eighth example of a disk drive device according to an embodiment of the present invention, where FIG. 38A describes a used state with an optical disk and FIG. 38B describes a carried state without an optical disk.

FIG. 39 is a cross-sectional view showing a ninth example of a disk drive device according to an embodiment of the present invention, where FIG. 39A describes a used state with an optical disk and FIG. 39B describes a carried state without an optical disk.

FIG. 40 is a cross-sectional view showing a tenth example of a disk drive device according to an embodiment of the present invention, where FIG. 40A describes a used state with an optical disk and FIG. 40B describes a carried state without an optical disk.

FIG. 42 is a view showing a second example of an appearance configuration of an information processing device according to an embodiment of the present invention, where

FIG. 44 is a view showing a fourth example of an appearance configuration of an information processing device according to an embodiment of the present invention, where

FIG. 51 is a flow chart showing a sixth example of control processing suitably used in the control device shown in FIG. 45.

DESCRIPTION OF THE PREFERRED EMBODIMENTS

An information processing device and its disk drive device are realized with a simplified structure, where the information processing device has an upper enclosure, a lower enclosure, a disk drive device and an enclosure moving mechanism. The upper enclosure and the lower enclosure are reduced in thickness to make the disk drive device thinner when the device is not used. The upper enclosure and the lower enclosure are increased in thickness to widen a clearance in order not to prevent rotation of a disk-shaped recording medium when the disk drive device is used.

EXAMPLE 1

Figure 1:
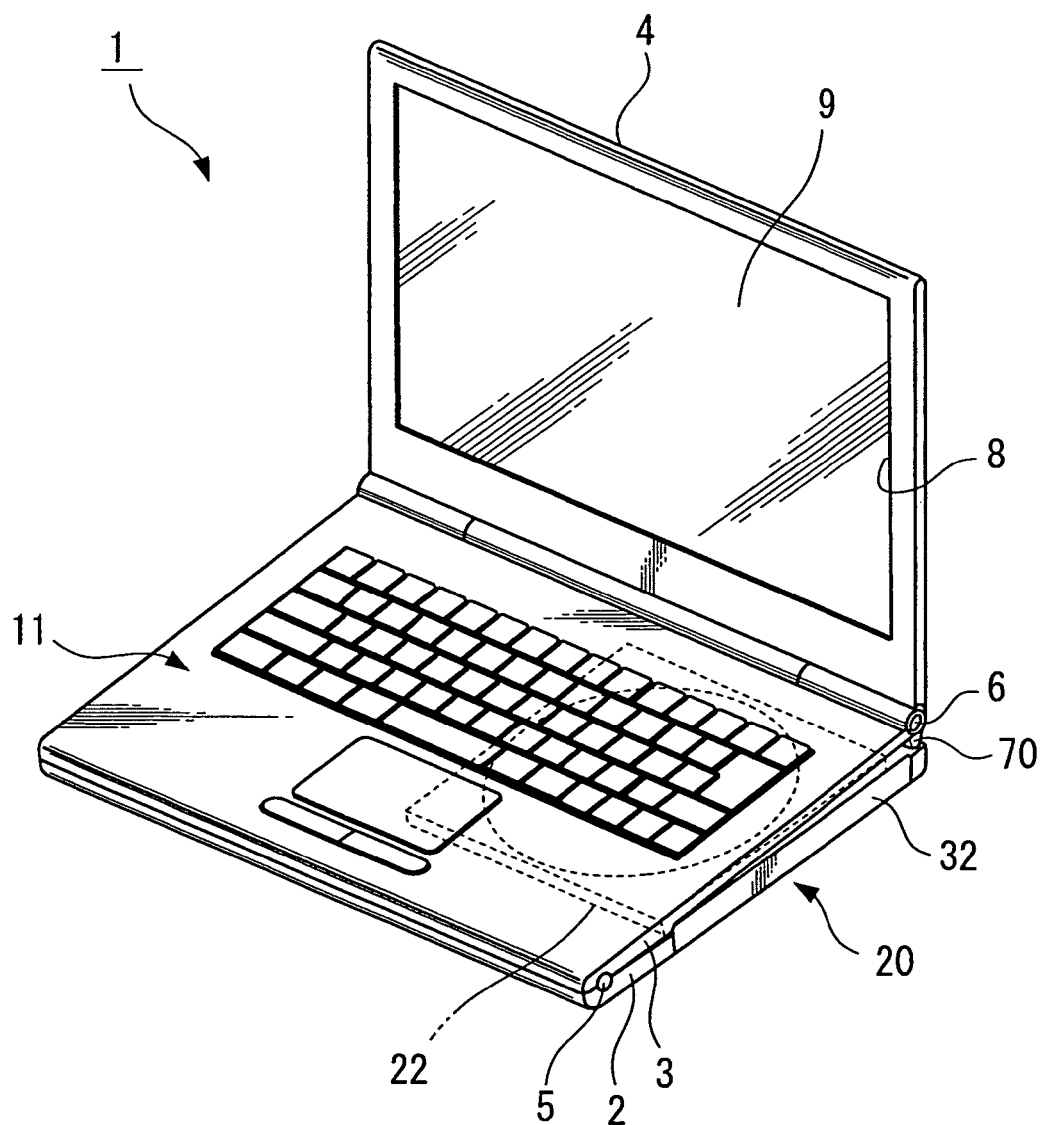
FIG. 1 is a perspective view showing a first example of an information processing device according to an embodiment of the present invention with a display enclosure opened.
Figure 2:
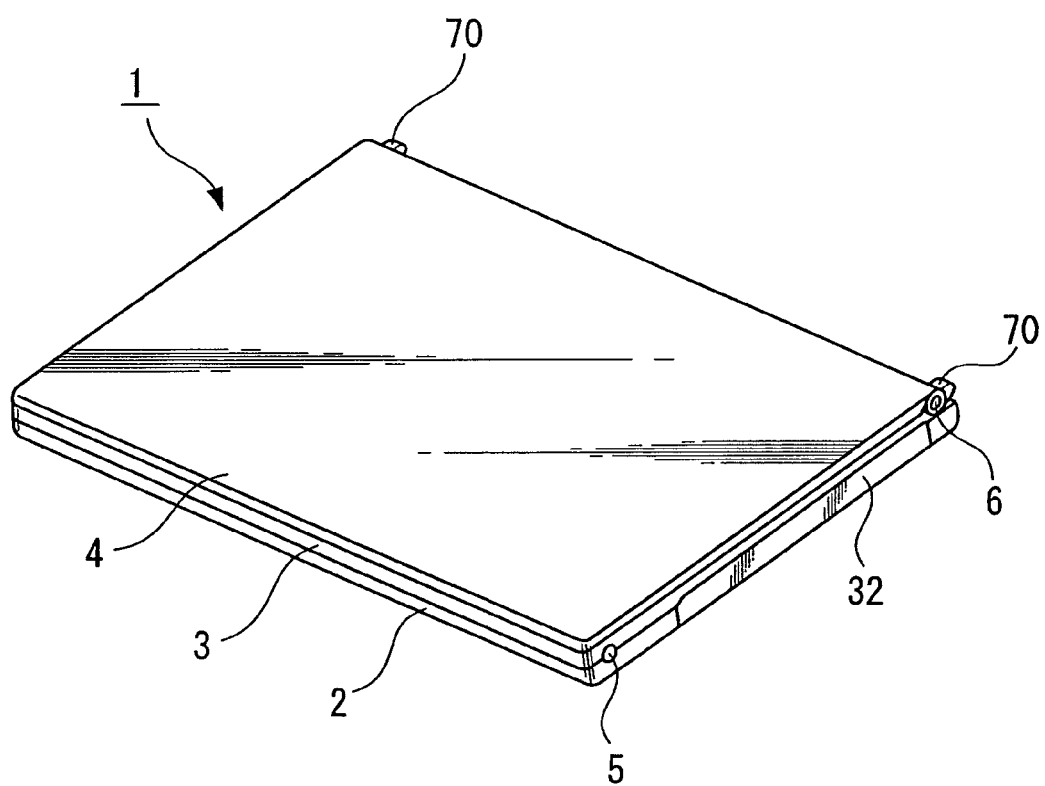
FIG. 2 is a perspective view showing a first example of an information processing device according to an embodiment of the present invention with a display enclosure closed.
Figure 3:
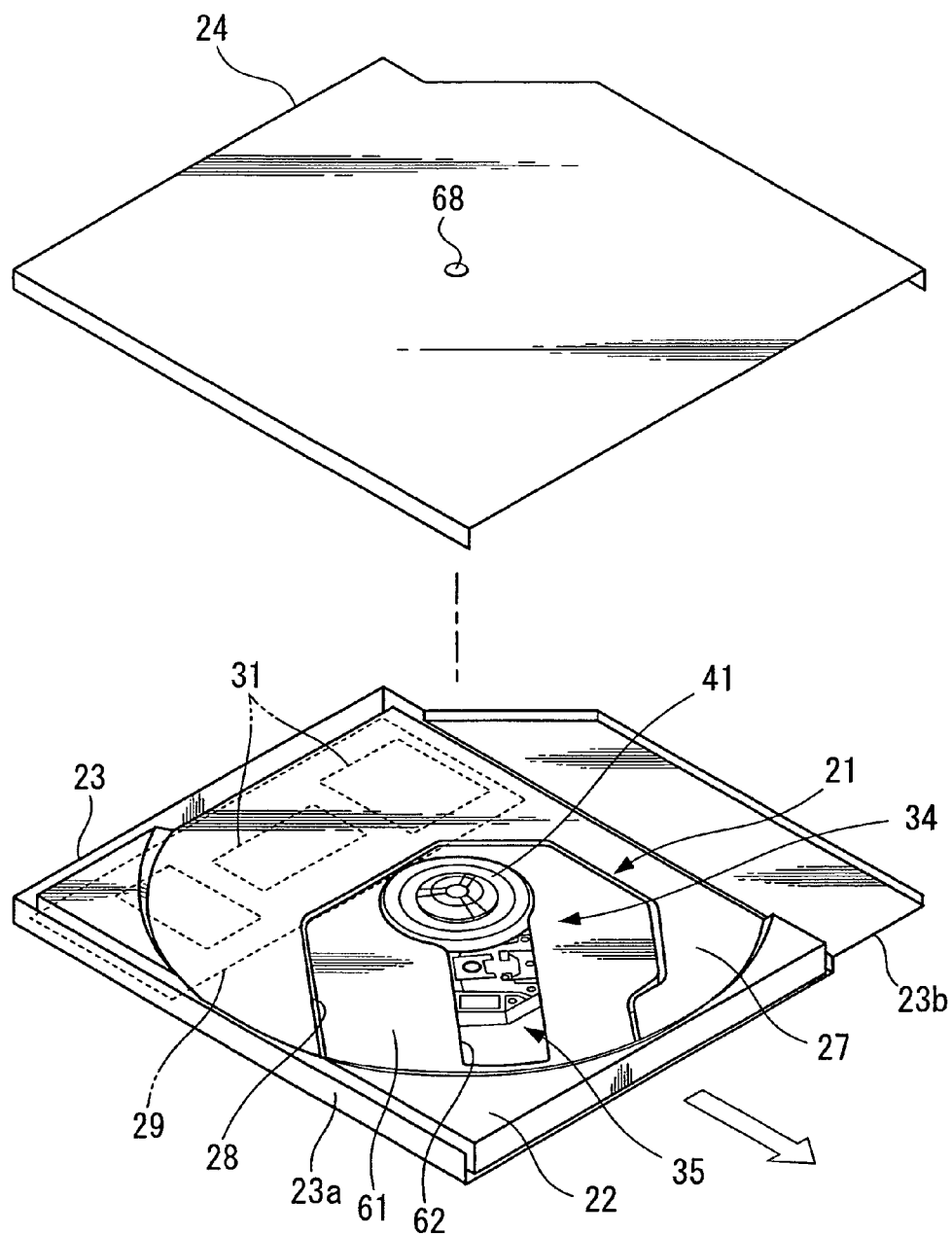
FIG. 3 is a perspective view showing a first example of a disk drive device according to an embodiment of the present invention.
Figure 4:
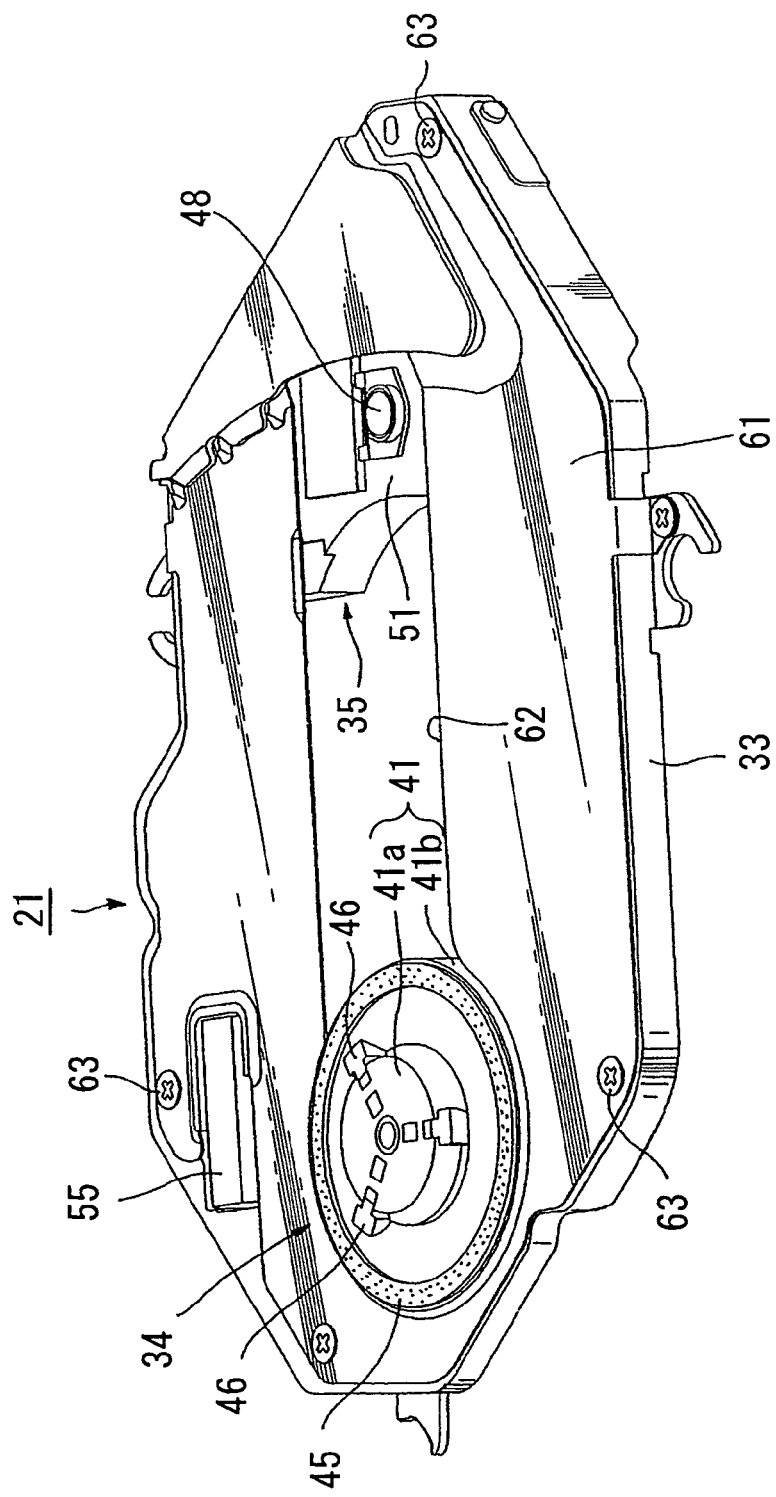
FIG. 4 is a perspective view showing a first example of a drive unit in accordance with a disk drive device according to an embodiment of the present invention.
Figure 5:
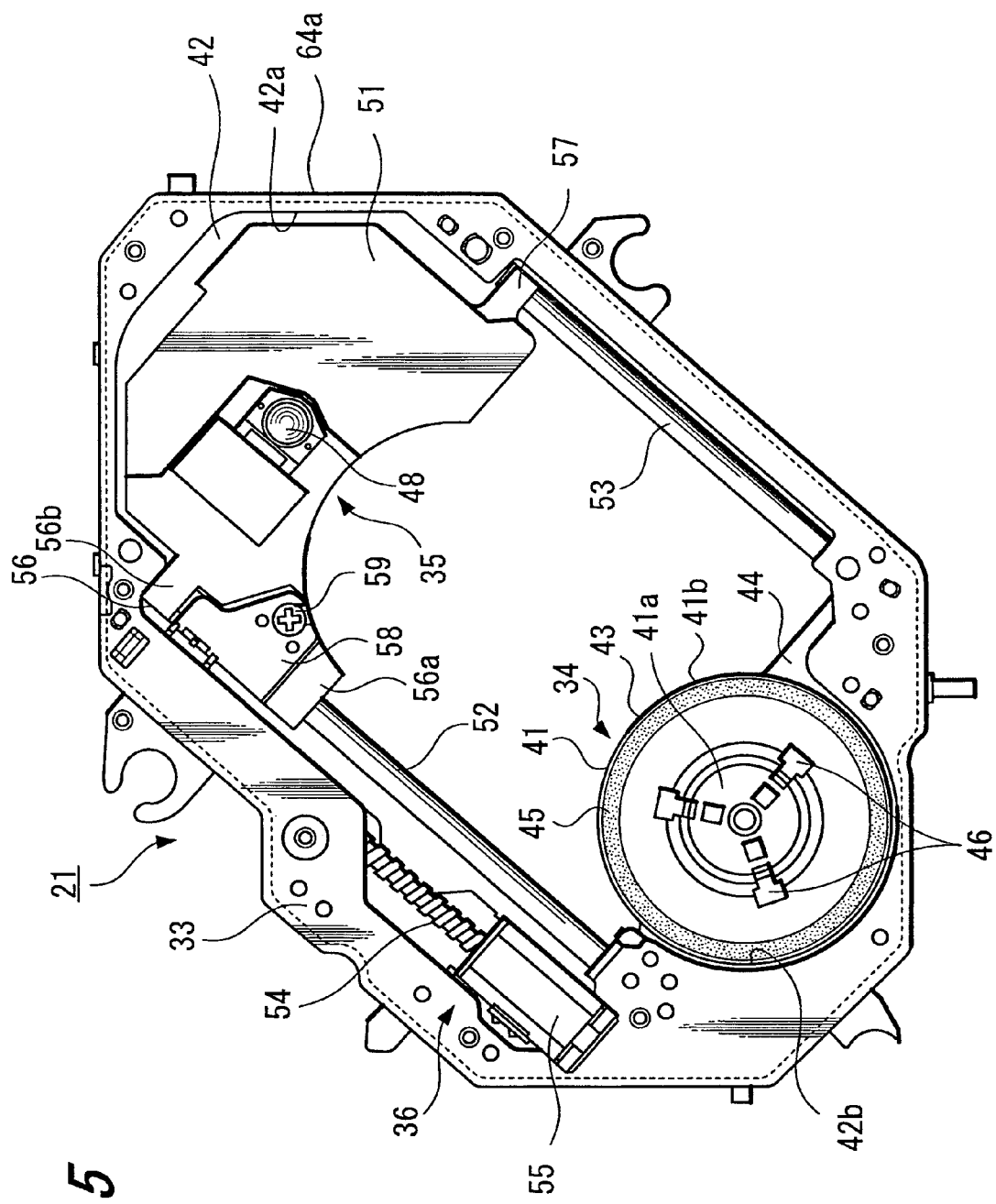
FIG. 5 is a plan view showing a first example of a drive unit in accordance with a disk drive device according to an embodiment of the present invention.
Figure 8A:
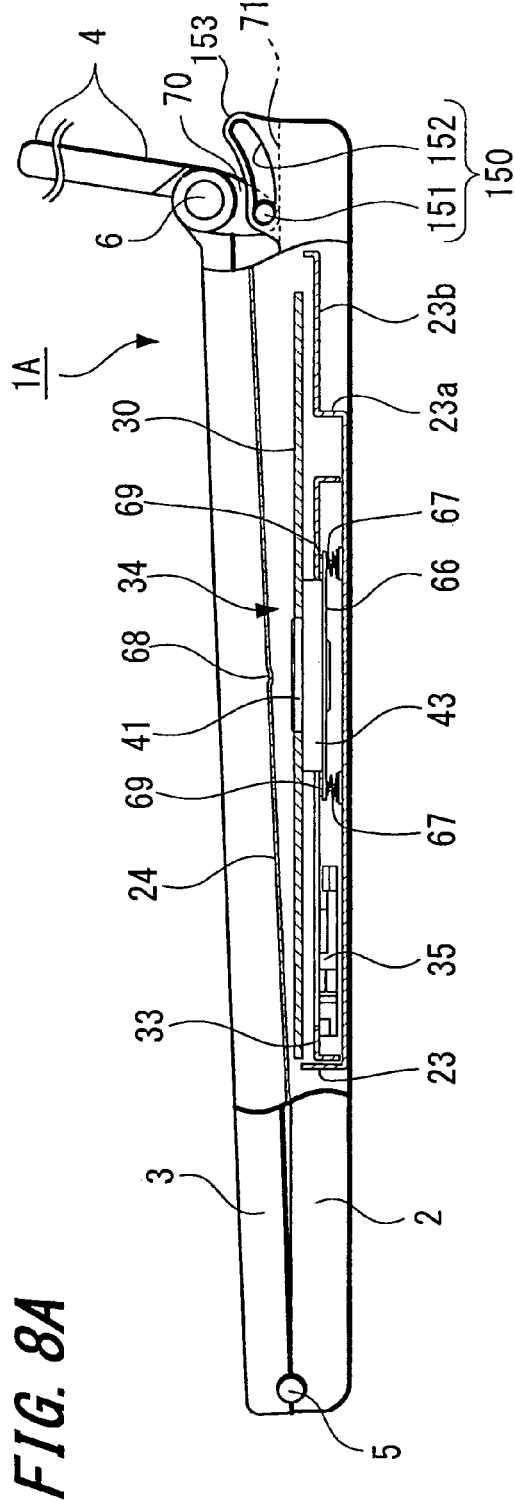
FIG. 8 is a partial cross-sectional view showing a second example of an information processing device according to an embodiment of the present invention, where FIG. 8A describes a used state and FIG. 8B describes a carried state without an optical disk.
Figure 8B:
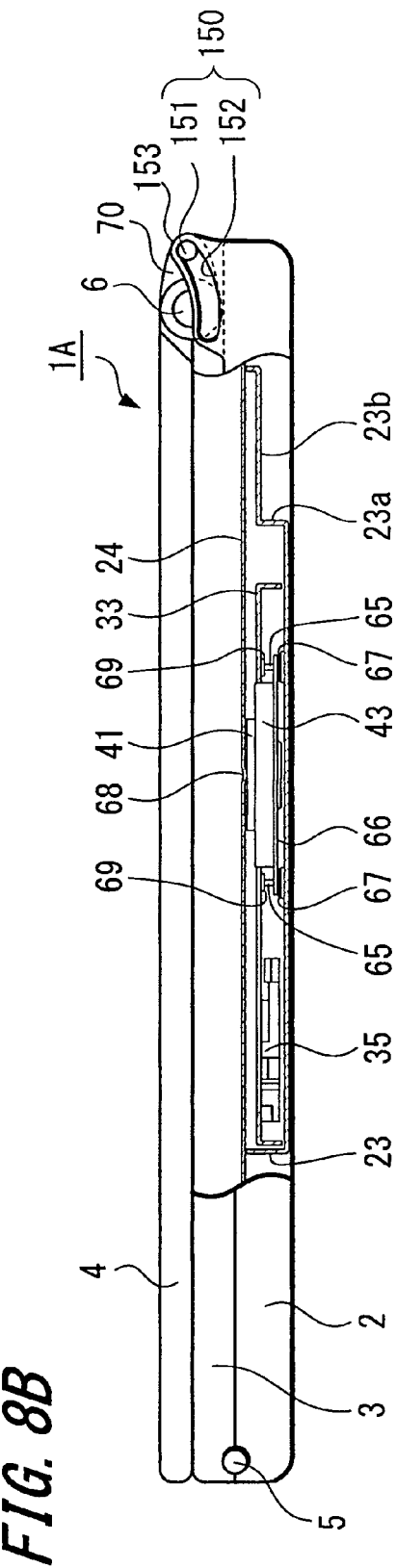

FIGS. 1 to 51 show examples of embodiments of the present invention. FIG. 1 is a perspective view of a laptop computer showing a first example of an information processing device according to an embodiment of the present invention. FIG. 2 is a perspective view of the same laptop with a display surface closed. FIG. 3 is a perspective view showing a first example of a disk drive device according to an embodiment of the present invention. FIG. 4 is a perspective view showing a drive unit in accordance with a disk drive device according to an embodiment of the present invention. FIG. 5 is a plan view of the same drive unit. FIGS. 6A, 6B and 6C are views describing a first example of an information processing device according to an embodiment of the present invention. FIGS. 7A, 7B and 7C are views describing an example of a cover lock mechanism preventing approach of a top cover of a disk drive device according to an embodiment of the present invention. FIGS. 8A and 8B are views describing a first example of a lifting restraint mechanism in accordance with an information processing device according to an embodiment of the present invention.

Figure 9A:
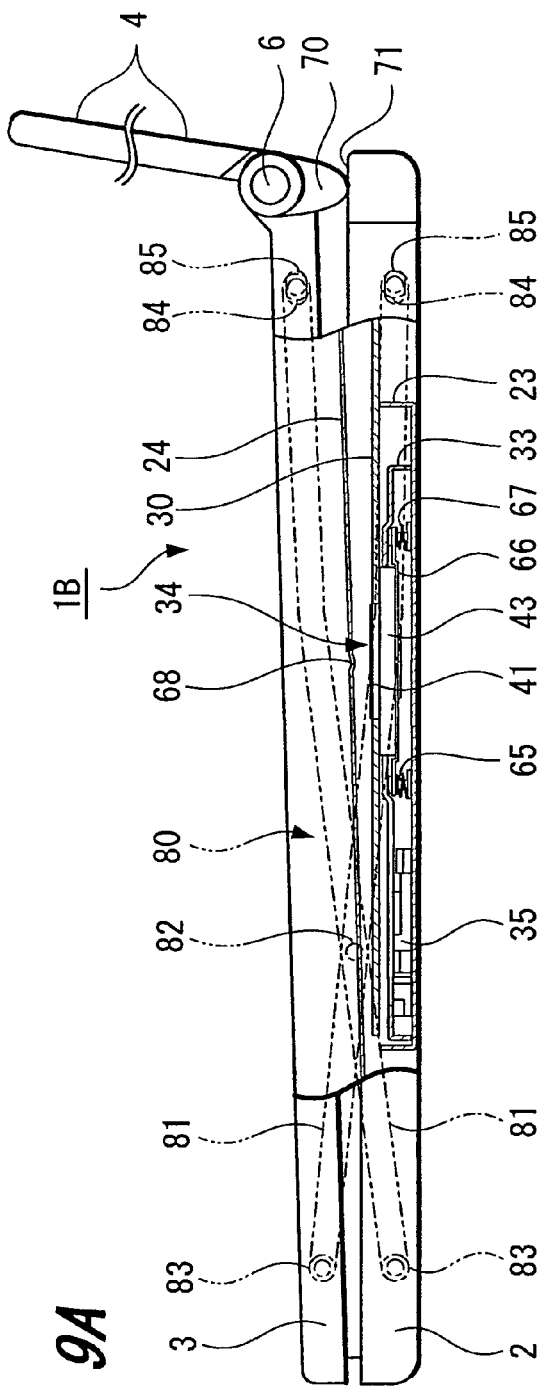
FIG. 9 is a partial cross-sectional view showing a third example of an information processing device according to an embodiment of the present invention, where FIG. 9A describes a used state and FIG. 9B describes a carried state without an optical disk.
Figure 9B:
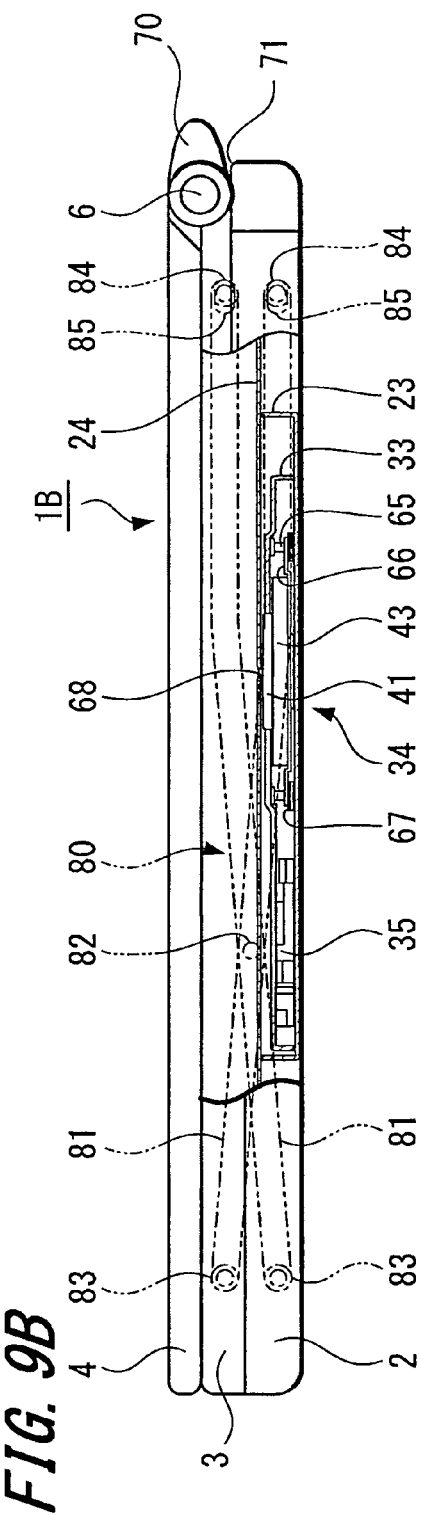
Figure 10A:
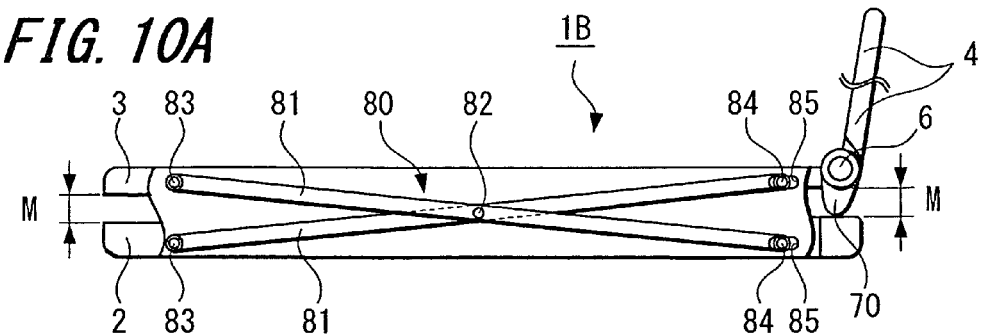
FIG. 10 is a view showing a first example of an enclosure moving mechanism (parallel moving pantograph mechanism) in accordance with an information processing device according to an embodiment of the present invention, where FIG. 10A describes a used state and FIG. 10B describes a carried state without an optical disk.
Figure 10B:
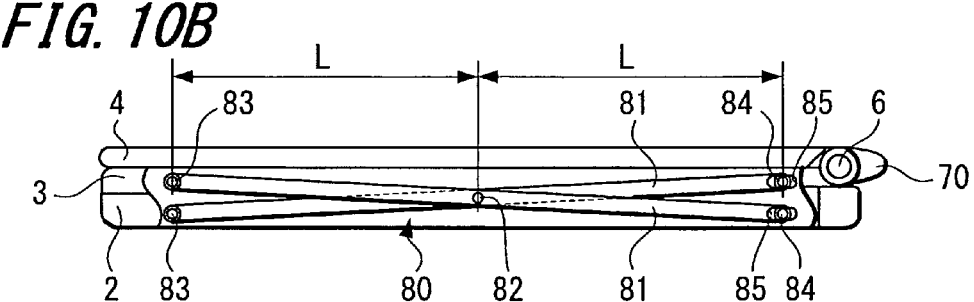
Figure 11A:
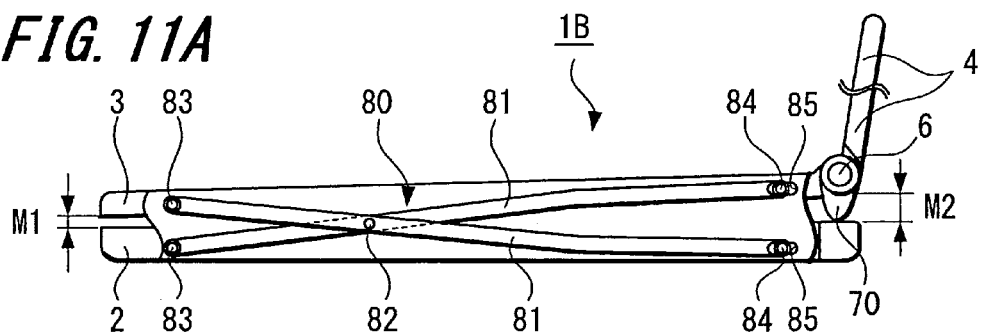
FIG. 11 is a view showing a second example of an enclosure moving mechanism (inclined moving pantograph mechanism) in accordance with an information processing device according to an embodiment of the present invention, where FIG. 11A describes a used state and FIG. 11B describes a carried state without an optical disk.
Figure 11B:
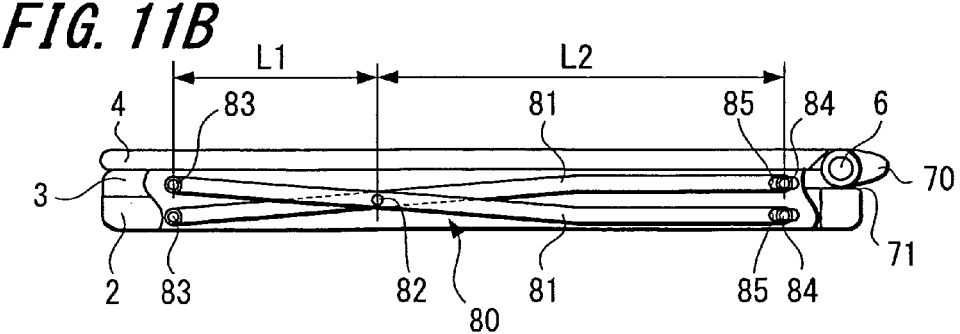
Figure 13A:
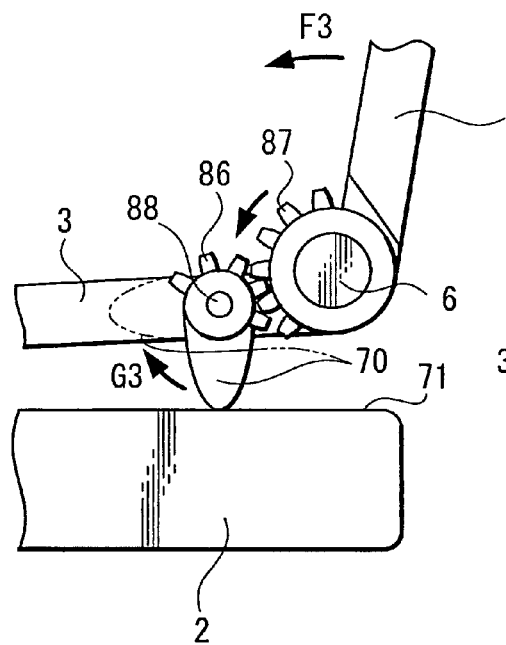
FIG. 13 is a view showing a main part of a third example of an enclosure moving mechanism (a combined mechanism of a gear and a cam) in accordance with an information processing device according to an embodiment of the present invention, where FIG. 13A describes a used state and FIG. 13B describes a carried state.
Figure 13B:
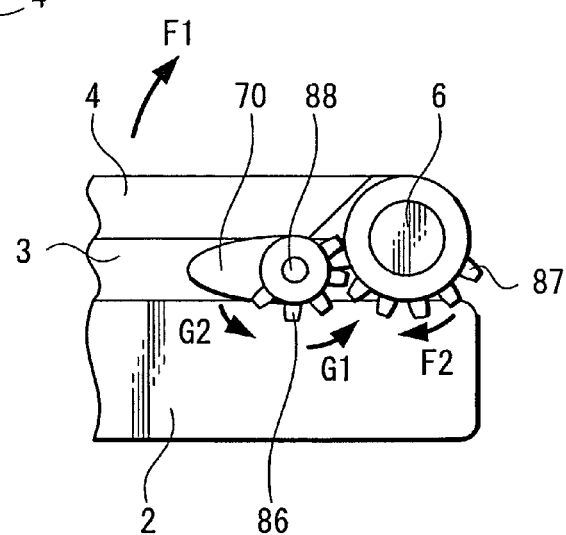
Figure 14A:
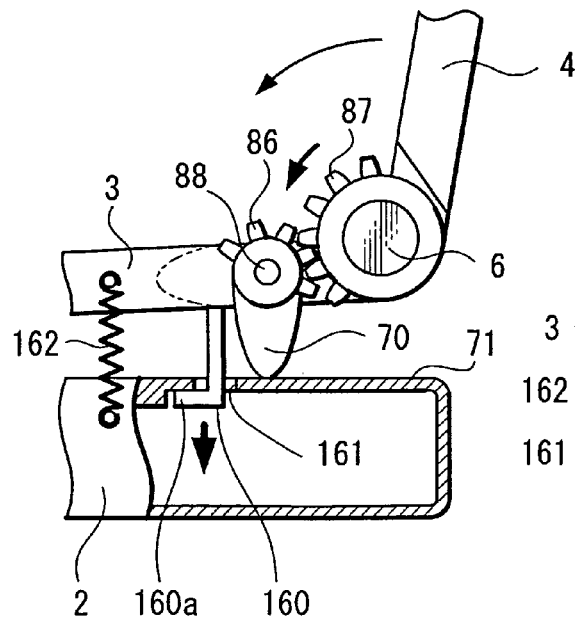
FIG. 14 is a view showing a main part of a third example of an enclosure moving mechanism in accordance with an information processing device according to an embodiment of the present invention combined with a second example of a lifting restraint mechanism (hook mechanism), where FIG. 14A describes a used state and FIG. 14B describes a carried state.
Figure 14B:
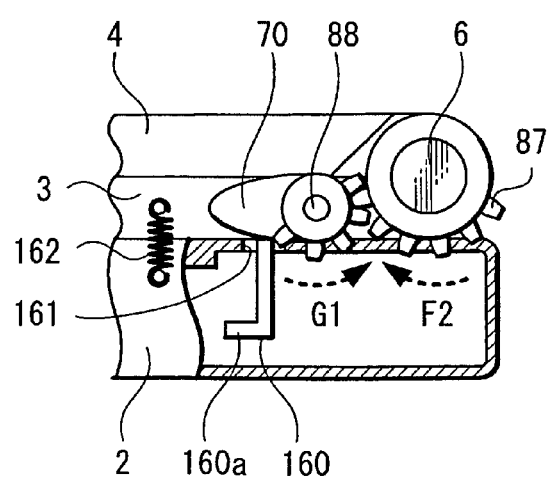

FIGS. 9A and 9B are views describing a third example of an information processing device according to an embodiment of the present invention using a pantograph mechanism as an enclosure moving mechanism. FIGS. 10A and 10B are views describing a first example where a pantograph mechanism is used as an enclosure moving mechanism. FIGS. 11A and 11B are views describing a second example where a pantograph mechanism is used as an enclosure moving mechanism. FIGS. 12A and 12B are views describing an example where a first example of a lifting restraint mechanism is applied to the information processing device shown in FIG. 9. FIGS. 13A and 13B are views describing an example where a combined mechanism of a cam and a gear is used as an enclosure moving mechanism. FIGS. 14A and 14B are views describing a combined enclosure moving mechanism of a cam and a gear combined with a hook-type second example of a lifting restraint mechanism. FIGS. 15A, 15B and 15C are views describing an action of an information processing device according to an embodiment of the present invention in which an upper enclosure is inclined and moved.

Figure 19A:
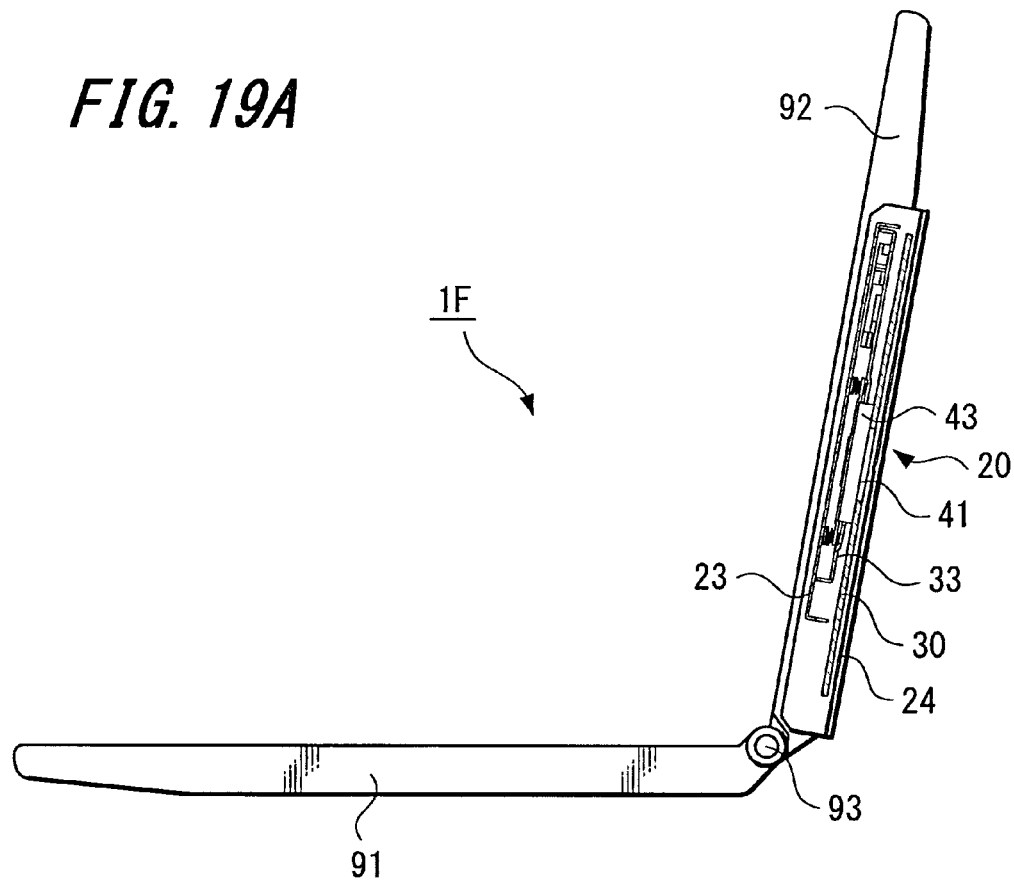
FIG. 19 is a view showing a seventh example of an information processing device according to an embodiment of the present invention, where FIG. 19A describes a used state with an optical disk stored and FIG. 19B describes a carried state without an optical disk.
Figure 19B:
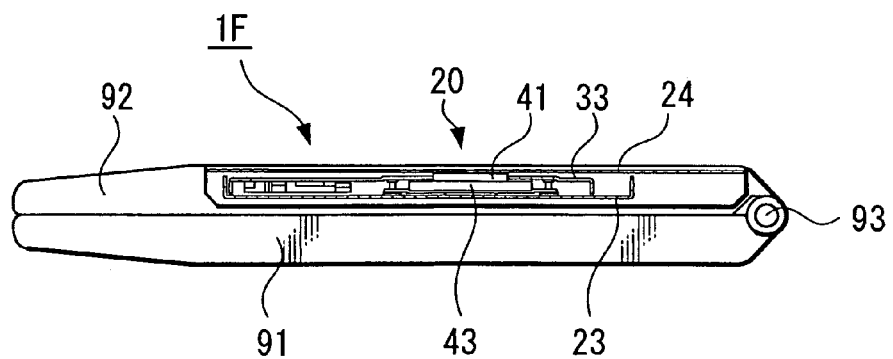
Figure 20:
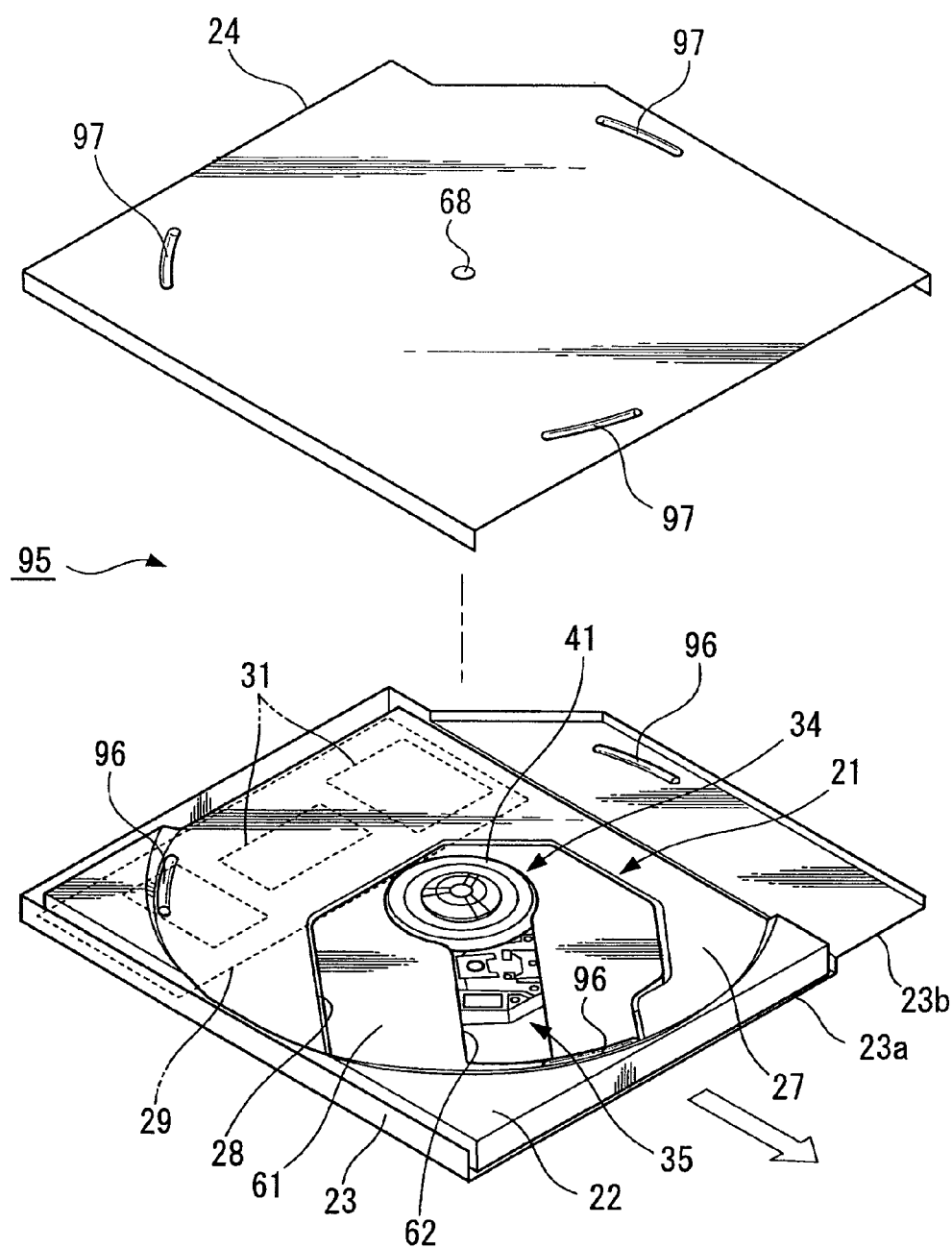
FIG. 20 is a perspective view showing a second example of a disk drive device according to an embodiment of the present invention.
Figure 24:
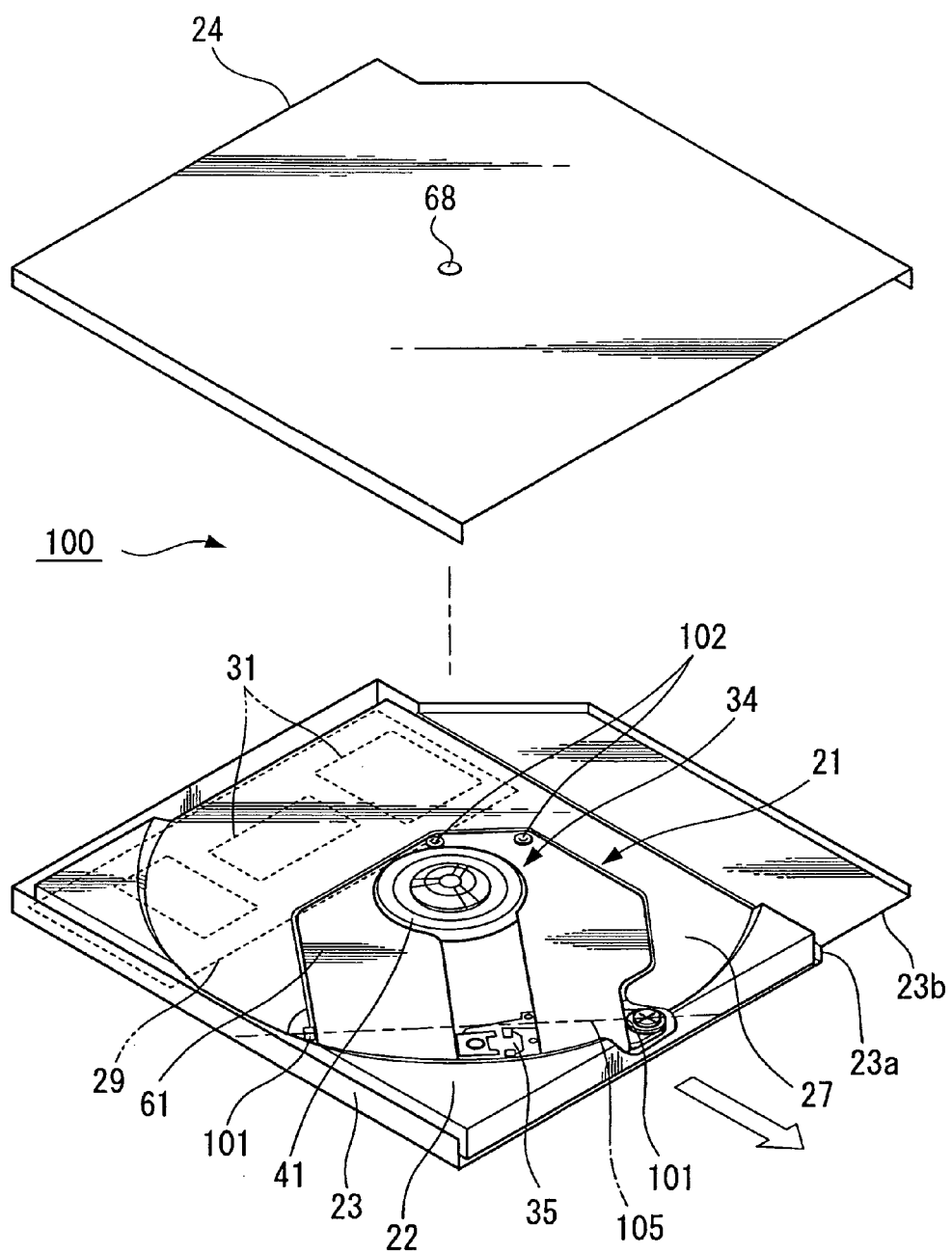
FIG. 24 is a perspective view showing a fourth example of a disk drive device according to an embodiment of the present invention.
Figure 25A:
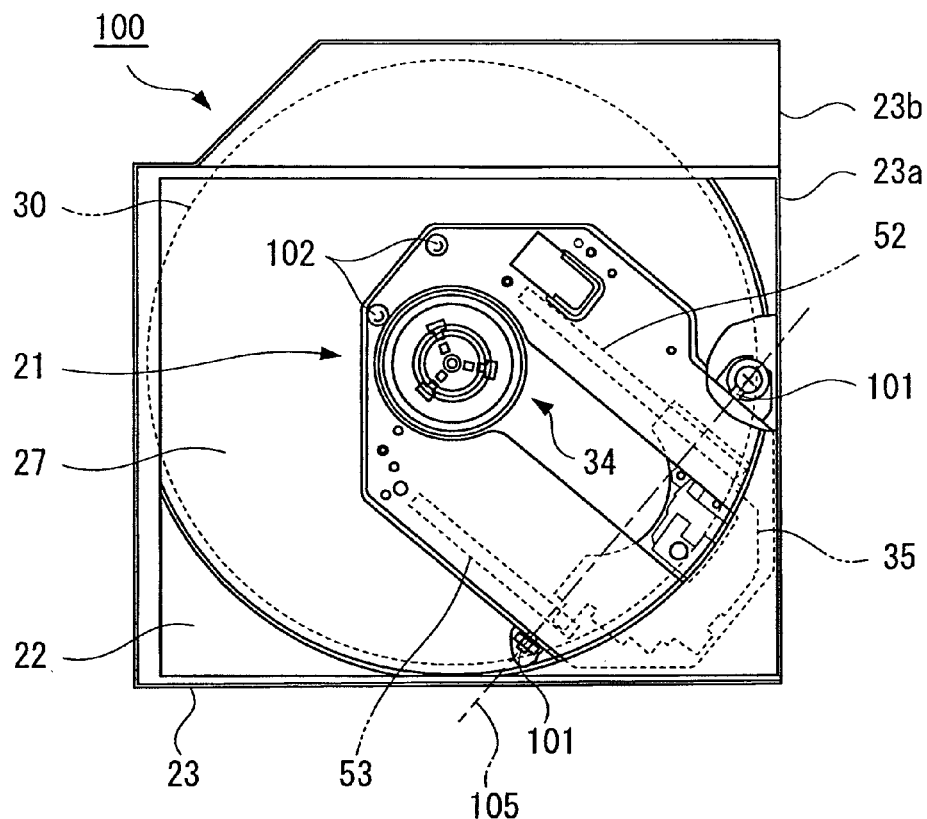
FIG. 25A is a plan view.

FIGS. 16A, 16B and 16C are views describing a sixth example of an information processing device according to an embodiment of the present invention. FIGS. 17A, 17B and 17C are views describing a transmission mechanism in accordance with a sixth example of an information processing device according to an embodiment of the present invention. FIGS. 18A and 18B are views describing an example of an enclosure lock mechanism in accordance with an information processing device according to an embodiment of the present invention. FIGS. 19A and 19B are views describing a seventh example of an information processing device according to an embodiment of the present invention. FIG. 20 is a perspective view showing a second example of a disk drive device according to an embodiment of the present invention. FIGS. 21A and 21B are cross-sectional views describing the second example. FIGS. 22A and 22B are views describing an eighth example of an information processing device according to an embodiment of the present invention. FIGS. 23A and 23B are views describing a modification of a second example of a disk drive device according to an embodiment of the present invention. FIG. 24 is a perspective view showing a fourth example of a disk drive device according to an embodiment of the present invention. FIG. 25A is a plan view of the fourth example and 25B and 25C are cross-sectional views describing a main part of the fourth example. FIGS. 26A and 26B are views describing a ninth example of an information processing device according to an embodiment of the present invention. FIGS. 27A and 27B are views describing a tenth example of an information processing device according to an embodiment of the present invention.

Figure 28:
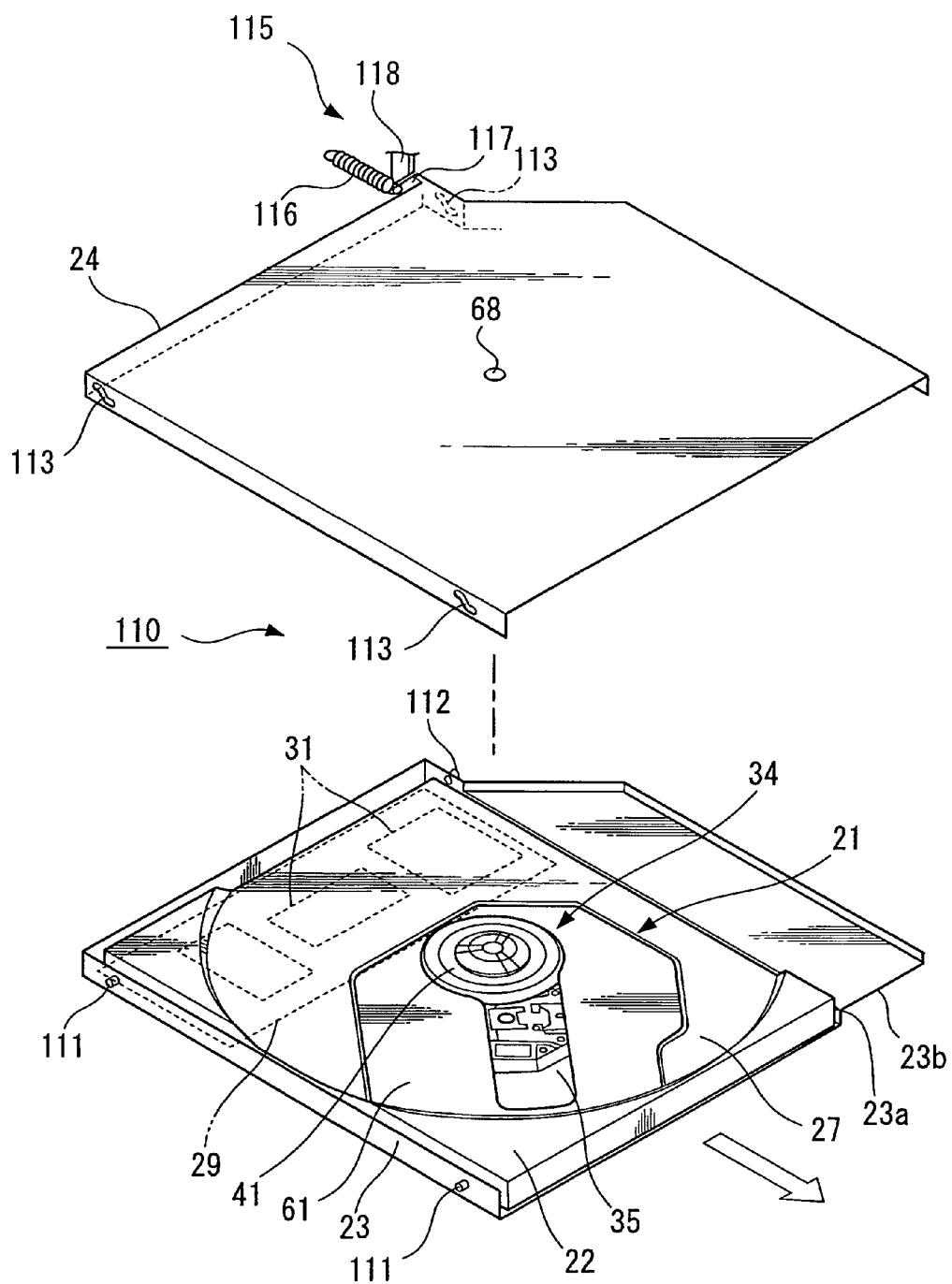
FIG. 28 is a perspective view showing a fifth example of a disk drive device according to an embodiment of the present invention.
Figure 29A:
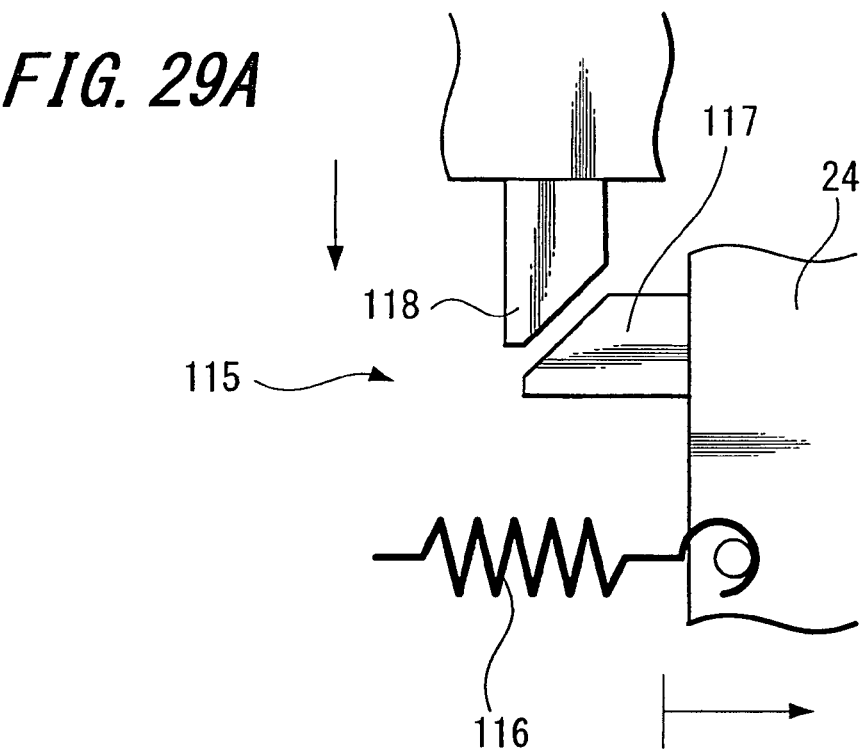
FIG. 29 is a view showing a main part of a fifth example of a disk drive device according to an embodiment of the present invention, where FIG. 29A describes a state before a moving direction conversion mechanism is activated and FIG. 29B describes a state after a moving direction conversion mechanism is activated.
Figure 29B:
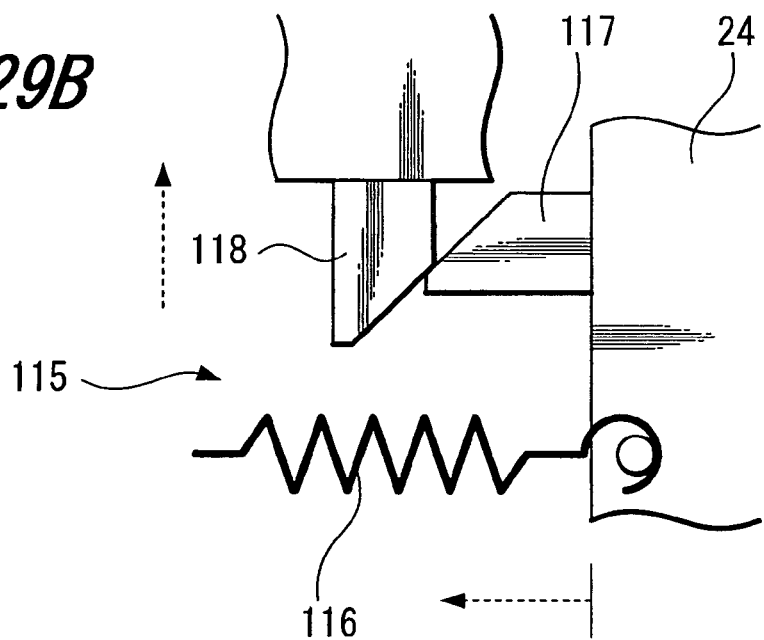
Figure 32:
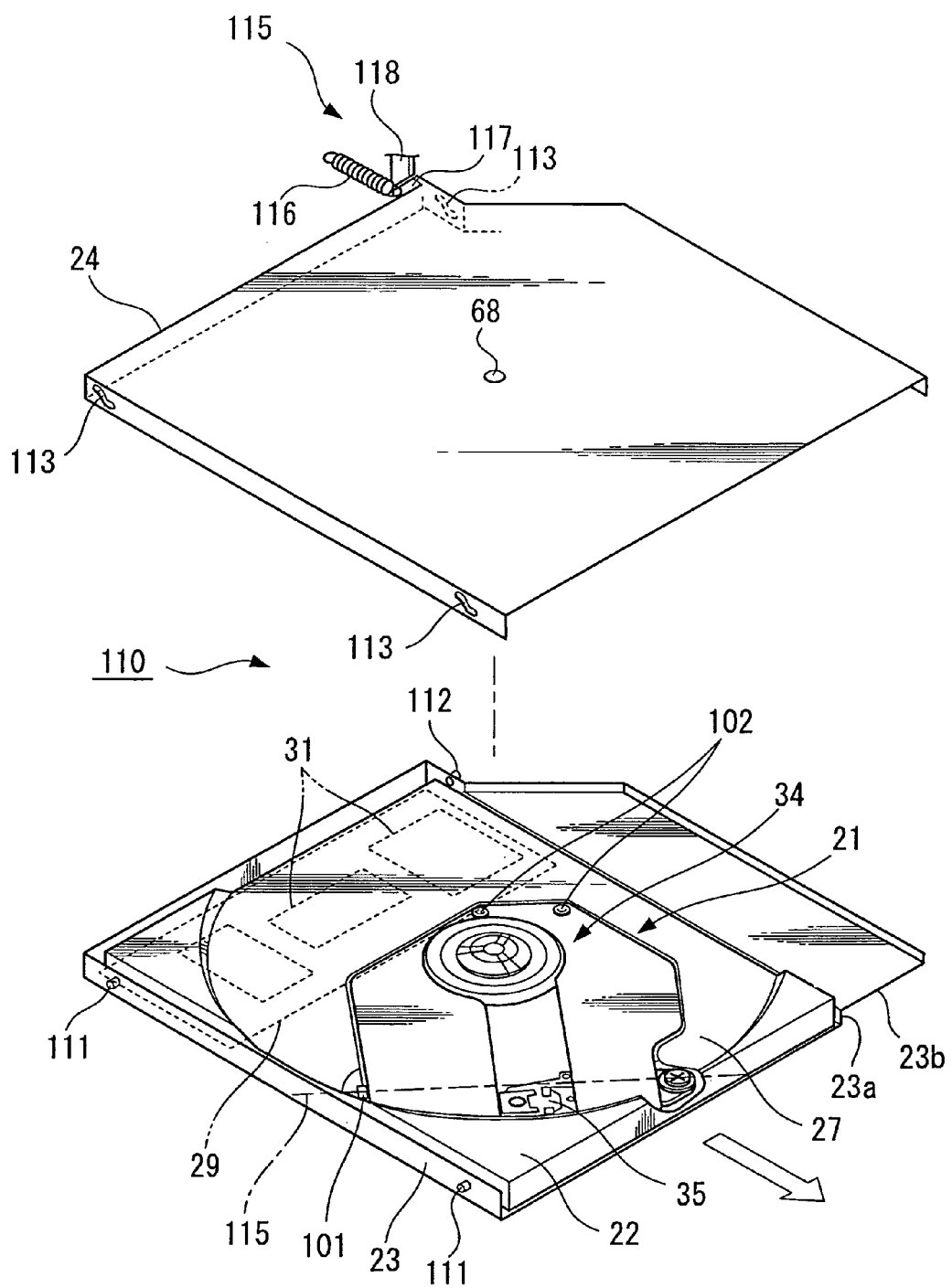
FIG. 32 is a perspective view showing a sixth example of a disk drive device according to an embodiment of the present invention.
Figure 37:
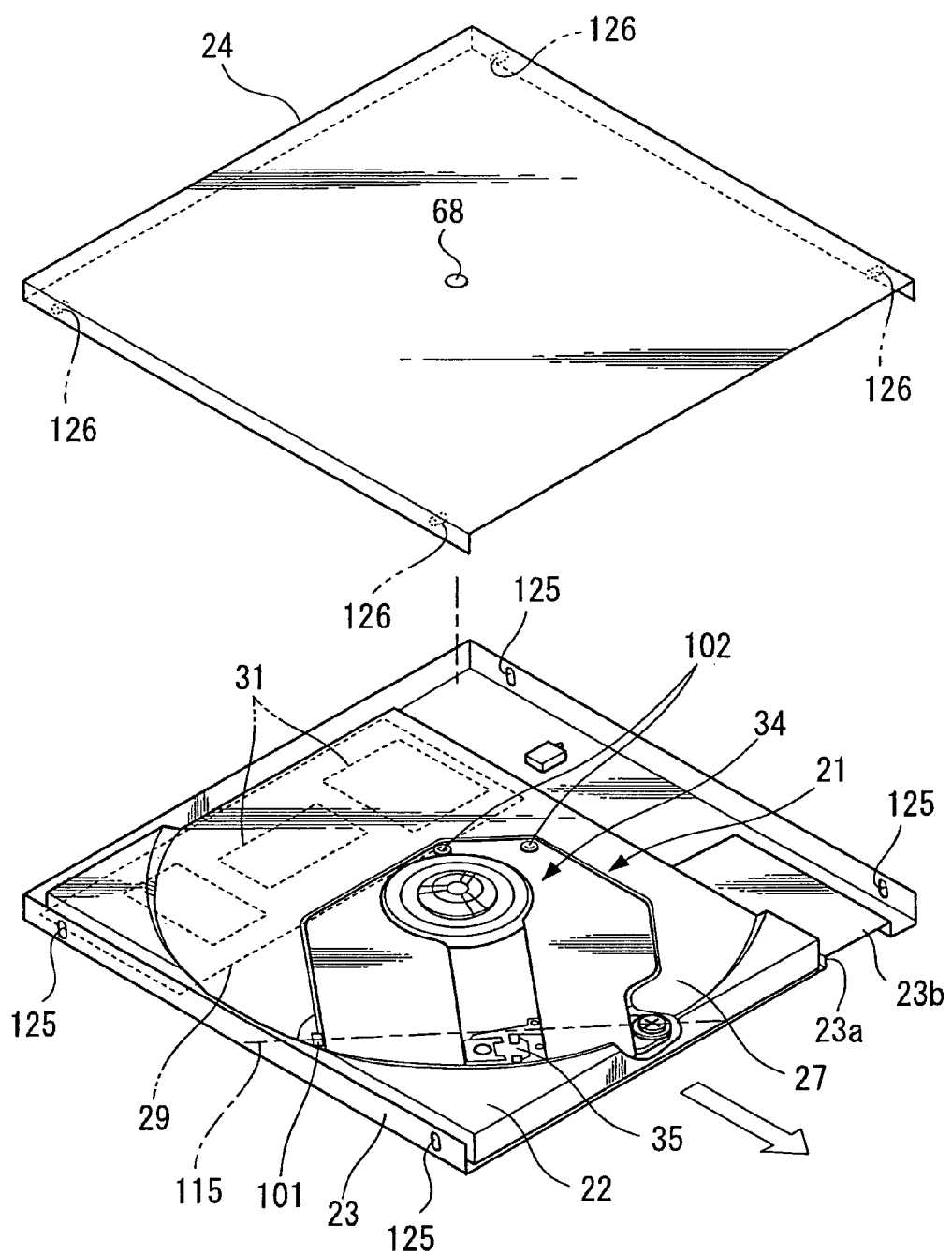
FIG. 37 is a perspective view showing an eighth example of a disk drive device according to an embodiment of the present invention.

FIG. 28 is a perspective view showing a fifth example of a disk drive device according to an embodiment of the present invention. FIG. 29 is an enlarged view describing a main part of FIG. 28. FIGS. 30A and 30B are cross-sectional views of the main part. FIGS. 31A and 31B are views describing an eleventh example of an information processing device according to an embodiment of the present invention. FIG. 32 is a perspective view showing a sixth example of a disk drive device according to an embodiment of the present invention. FIGS. 33A and 33B are cross-sectional views describing the sixth example. FIGS. 34A and 34B are views describing a twelfth example of an information processing device according to an embodiment of the present invention. FIGS. 35A, 35B and 35C are views describing a seventh example of a disk drive device according to an embodiment of the present invention. FIGS. 36A, 36B and 36C are views describing a thirteenth example of an information processing device according to an embodiment of the present invention. FIG. 37 is a perspective view showing an eighth example of a disk drive device according to an embodiment of the present invention. FIGS. 38A and 38B are cross-sectional views describing a first example of a lifting mechanism in accordance with an eighth example of a disk drive device according to an embodiment of the present invention. FIGS. 39A and 39B are cross-sectional views describing a second example of a lifting mechanism in accordance with a ninth example of a disk drive device according to an embodiment of the present invention. FIGS. 40A and 40B are cross-sectional views describing a first example of a disk holding mechanism in accordance with a tenth example of a disk drive device according to an embodiment of the present invention.

Figure 41A:
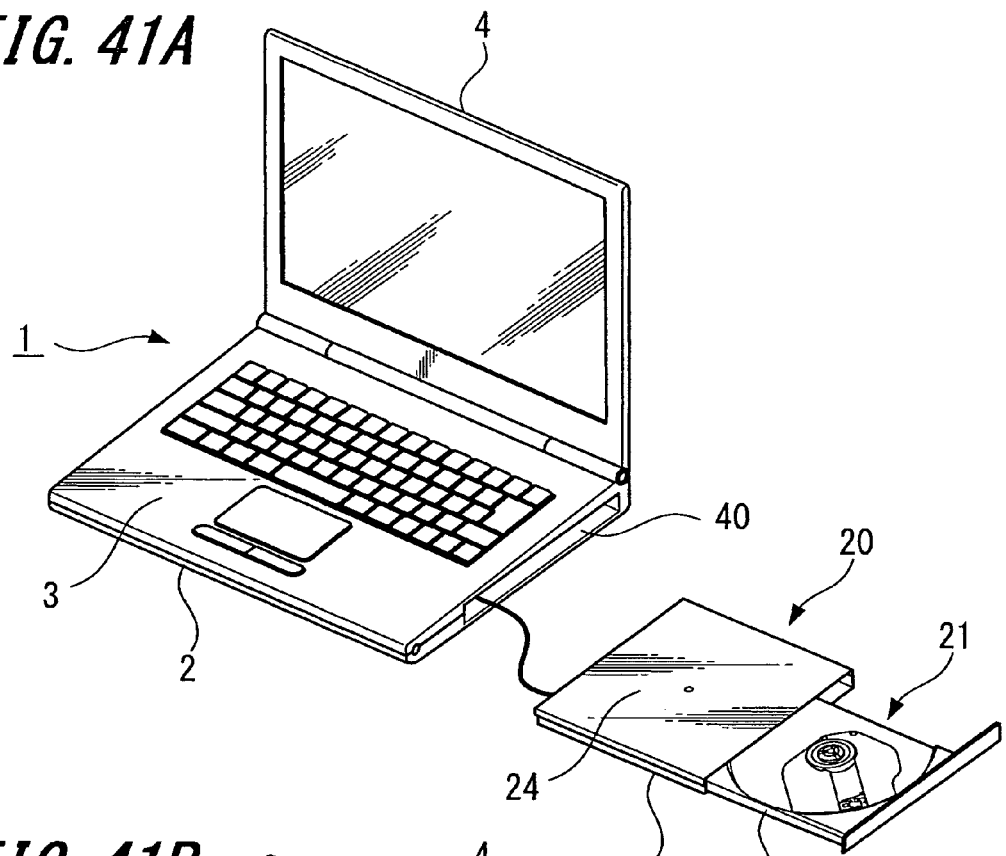
FIG. 41 is a view showing a first example of an appearance configuration of an information processing device according to an embodiment of the present invention, where FIG. 41A describes a used state with a disk drive device and a disk tray pulled out and FIG. 41B describes a carried state with a disk drive device removed.
Figure 41B:
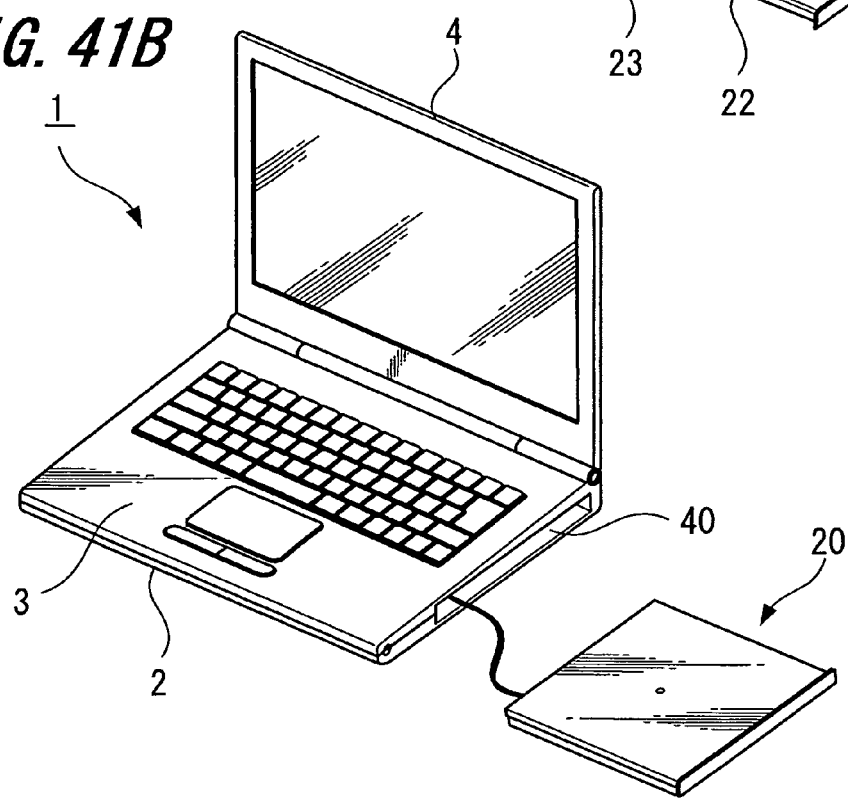
Figure 42A:
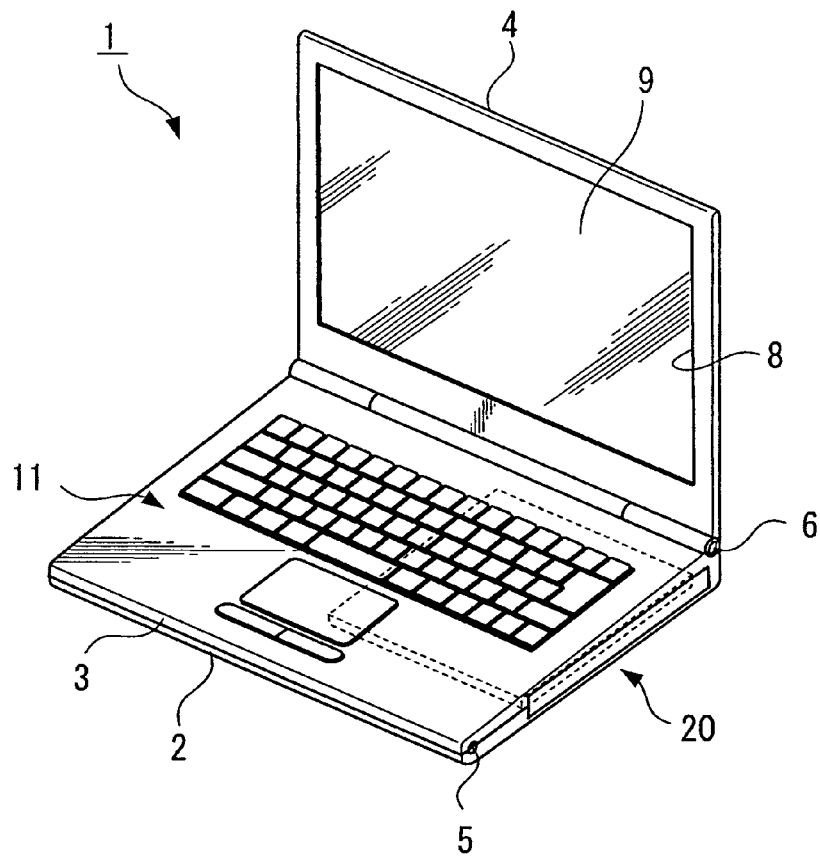
FIG. 42A is a front view with a display enclosure opened and FIG. 42B is a front view with a display enclosure closed.
Figure 42B:
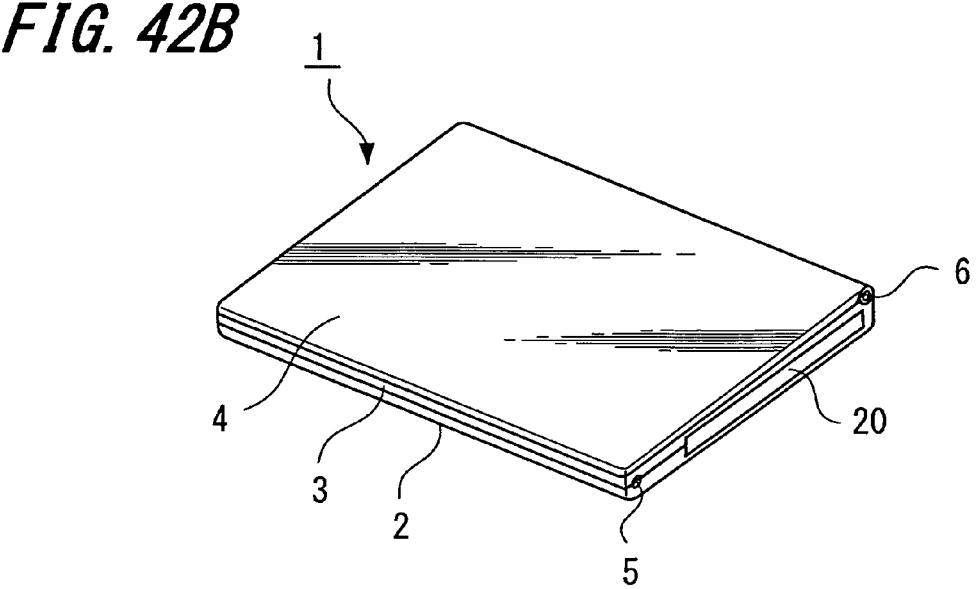
Figure 43A:
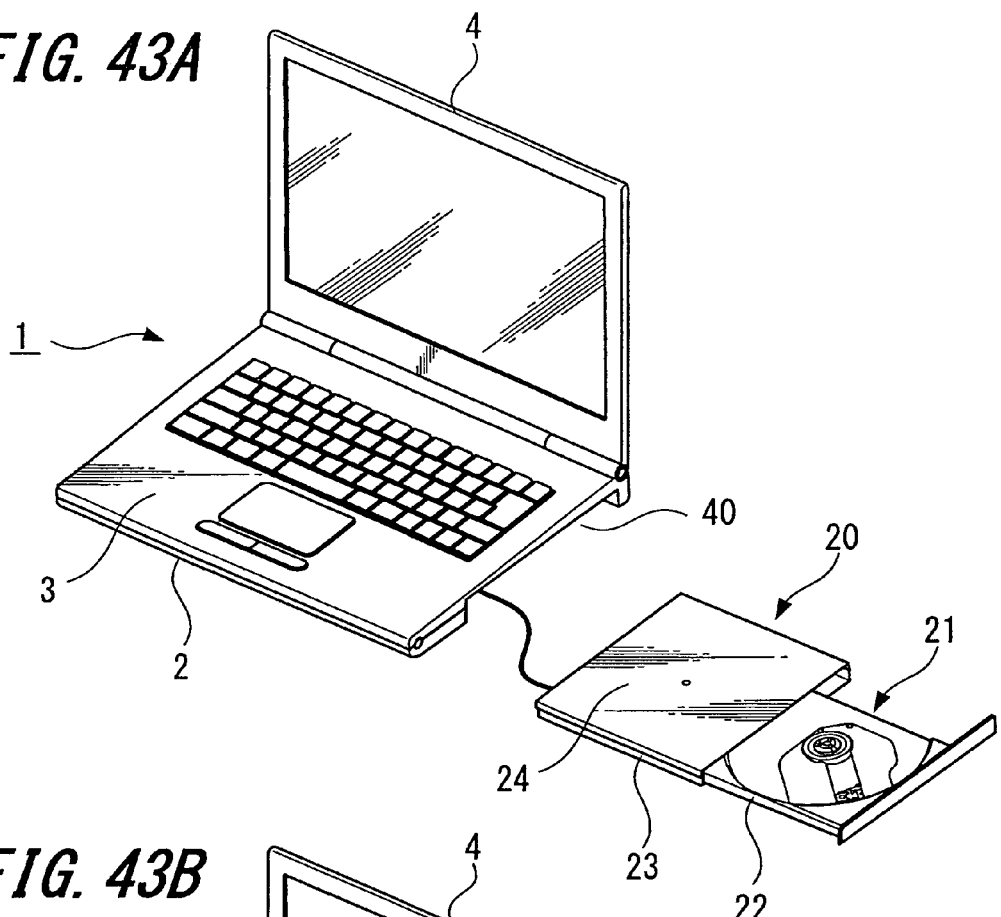
FIG. 43 is a view showing a third example of an appearance configuration of an information processing device according to an embodiment of the present invention, where FIG. 43A describes a used state with a disk drive device and a disk tray pulled out and FIG. 43B describes a carried state with a disk drive device removed.
Figure 43B:
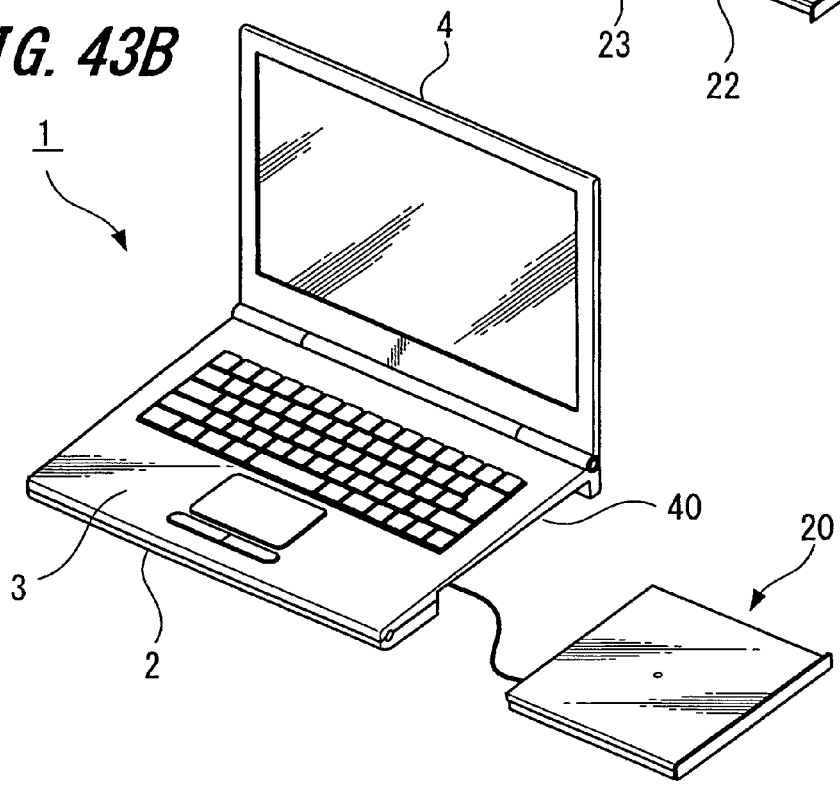
Figure 44A:
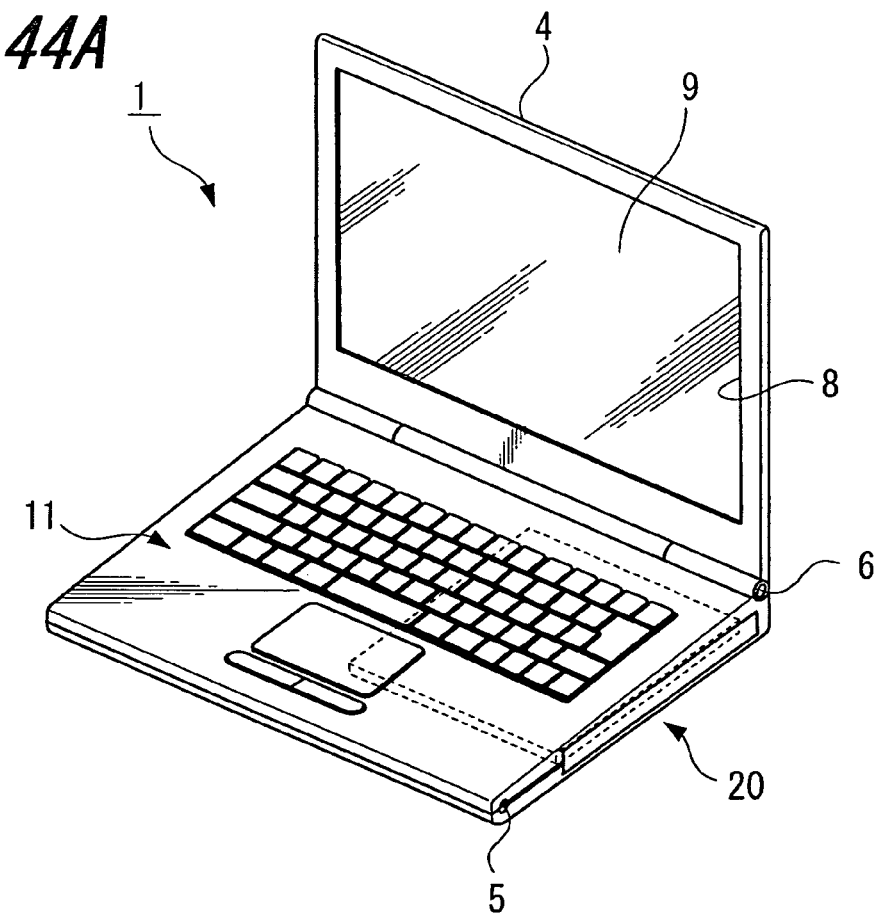
FIG. 44A is a front view with a display enclosure opened and FIG. 44B is a bottom view with a display enclosure closed.
Figure 44B:
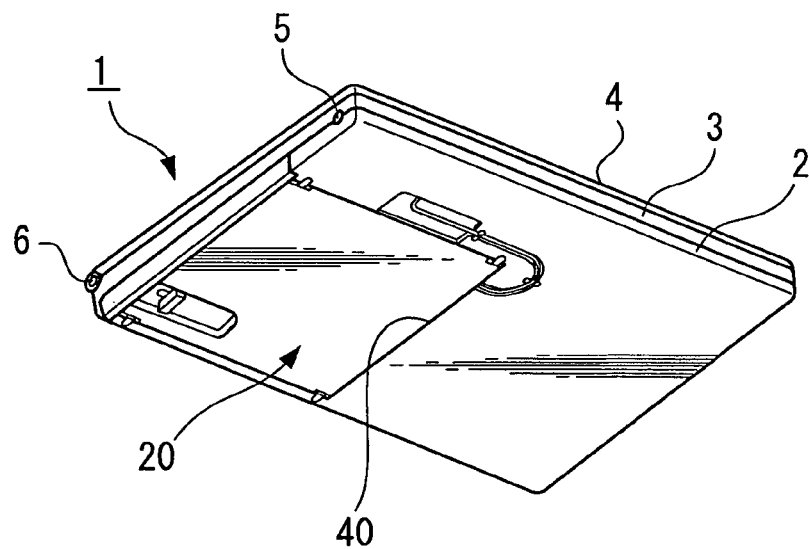
Figure 45:
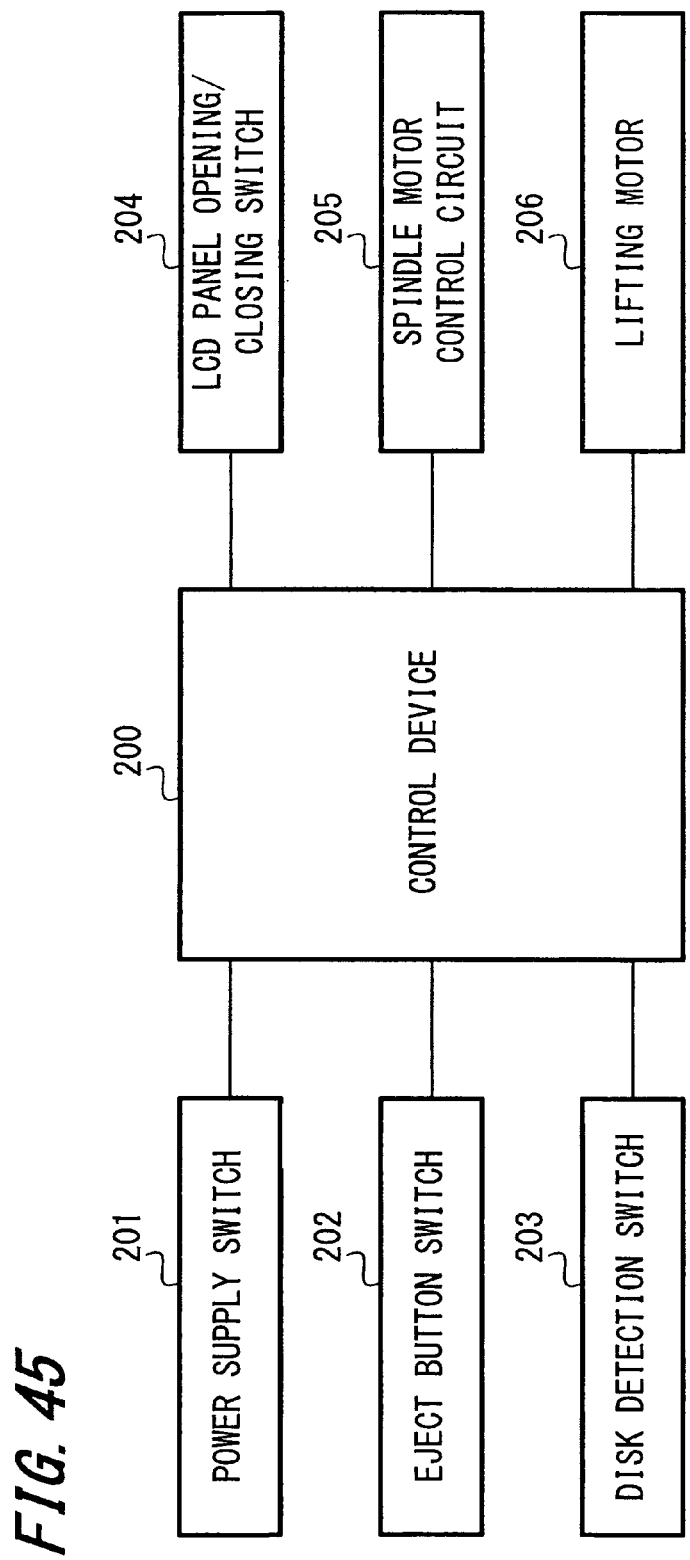
FIG. 45 is a block diagram schematically describing a configuration of a control device in accordance with an information processing device according to an embodiment of the present invention.
Figure 46:
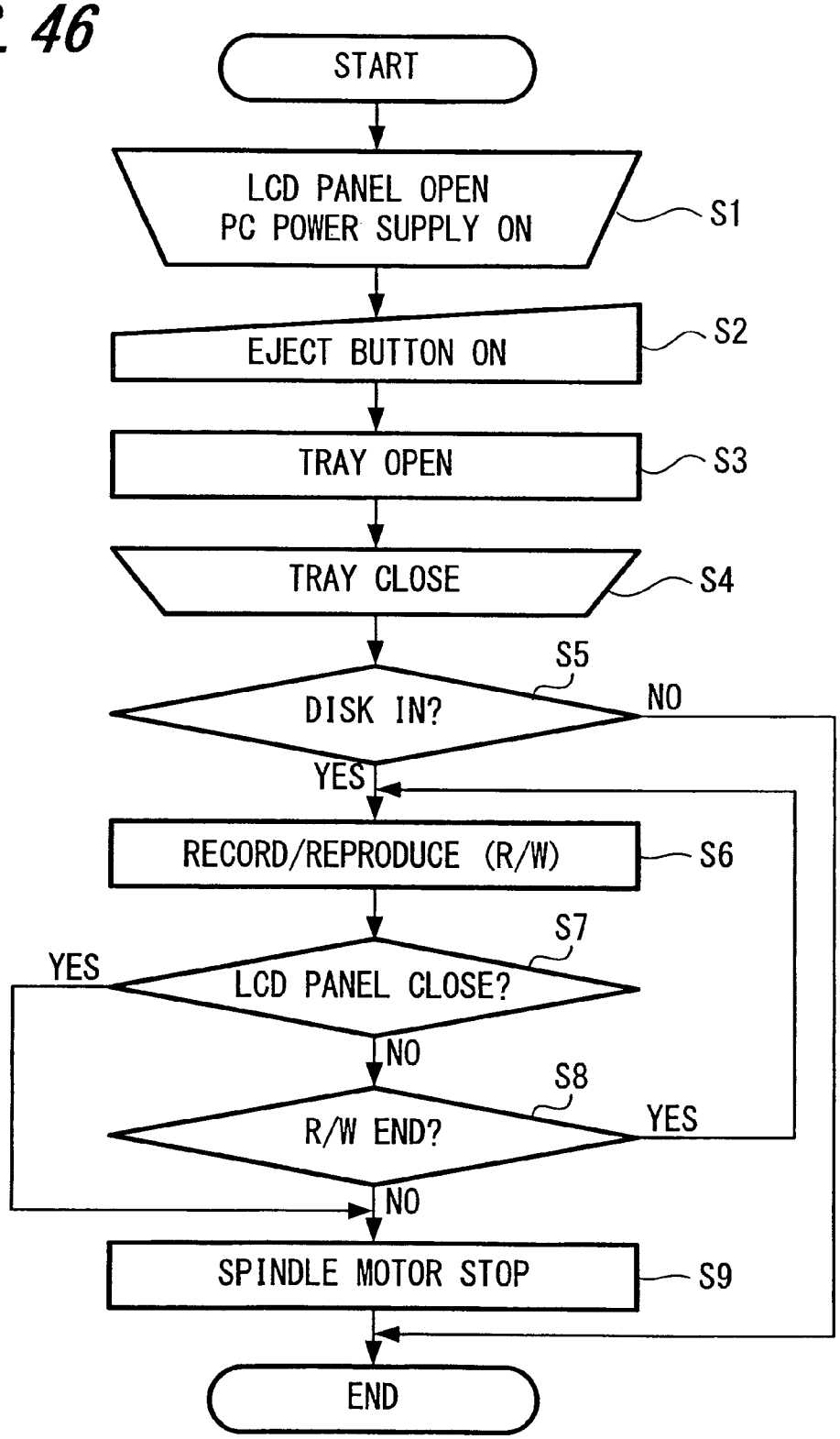
FIG. 46 is a flow chart showing a first example of control processing suitably used in the control device shown in FIG. 45.
Figure 47:
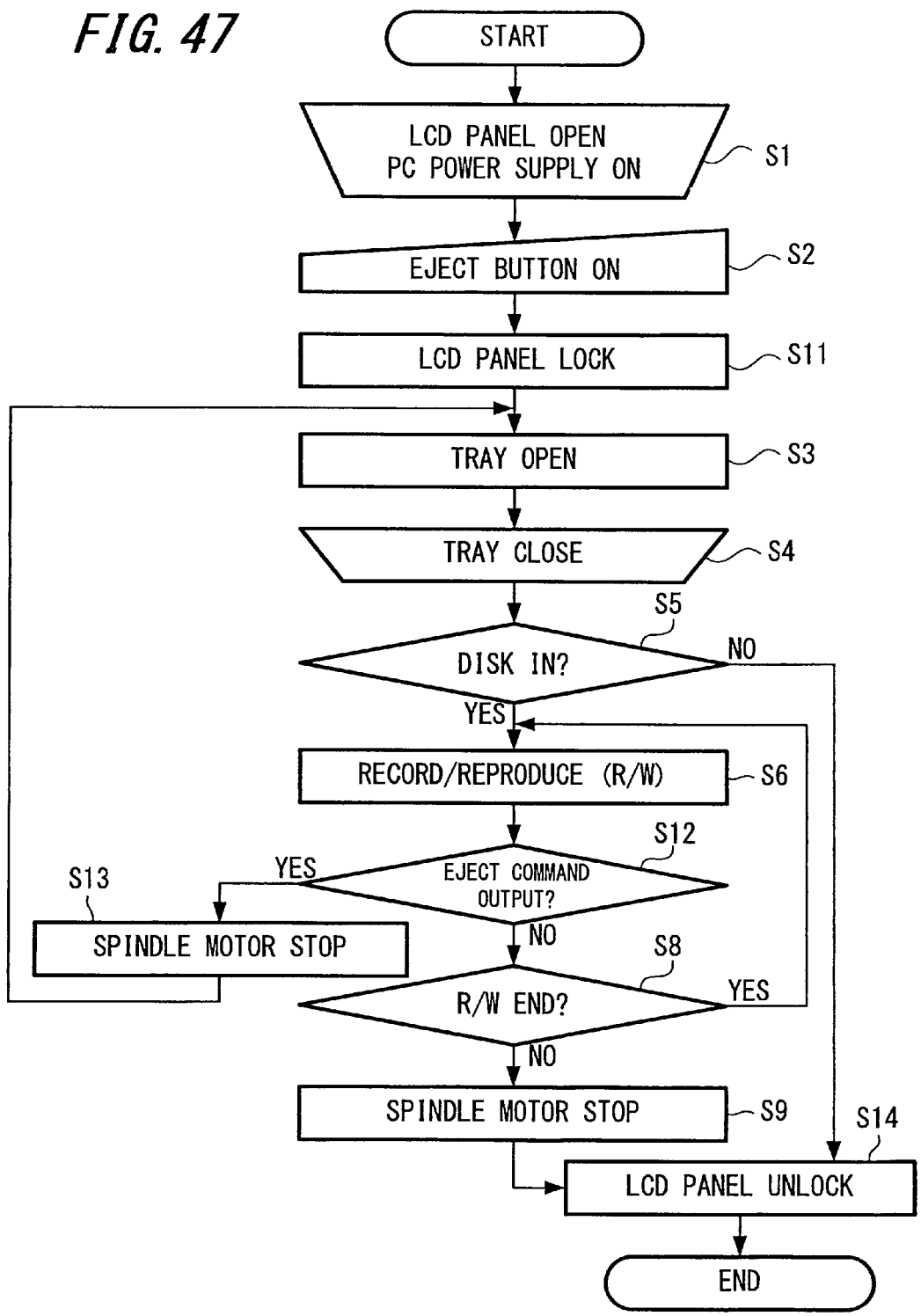
FIG. 47 is a flow chart showing a second example of control processing suitably used in the control device shown in FIG. 45.
Figure 48:
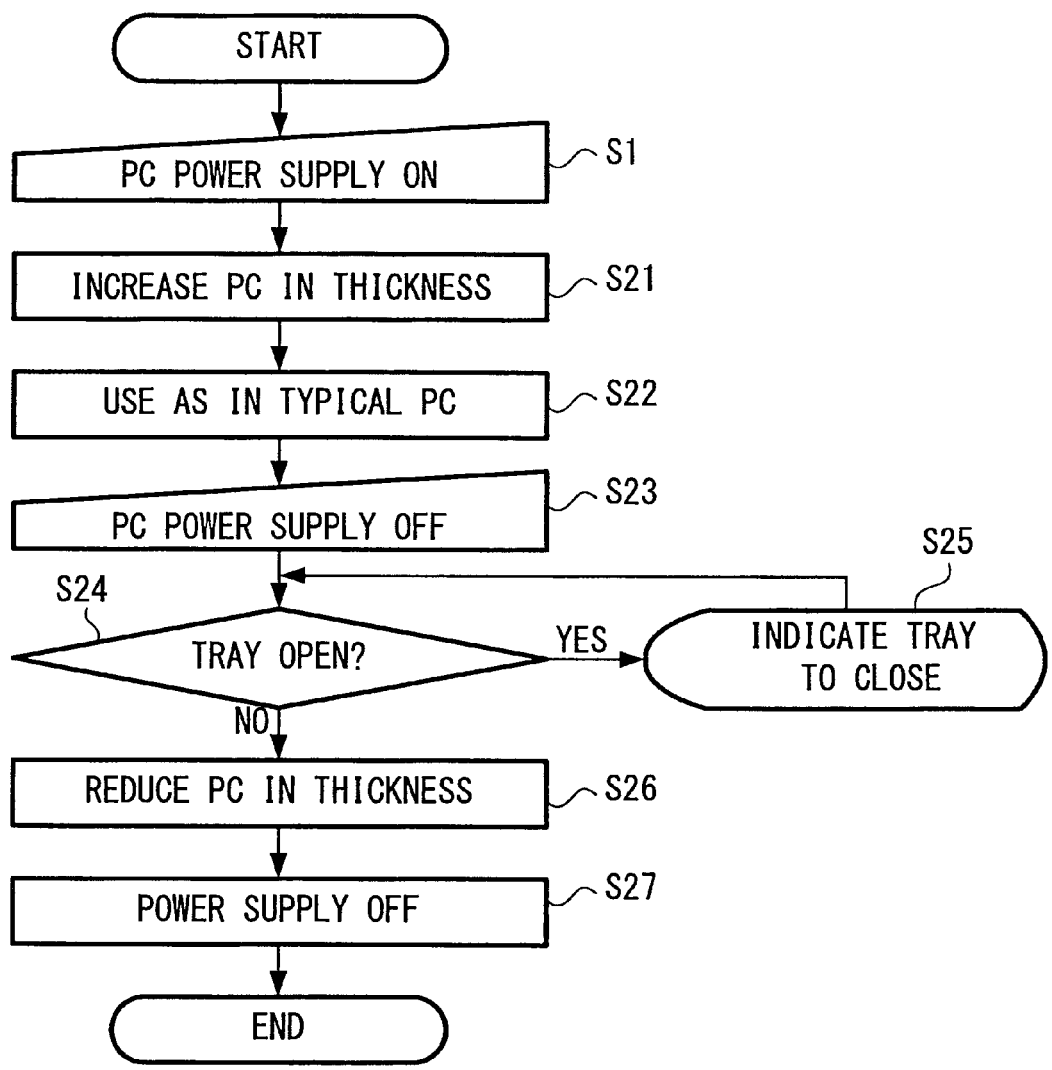
FIG. 48 is a flow chart showing a third example of control processing suitably used in the control device shown in FIG. 45.
Figure 49:
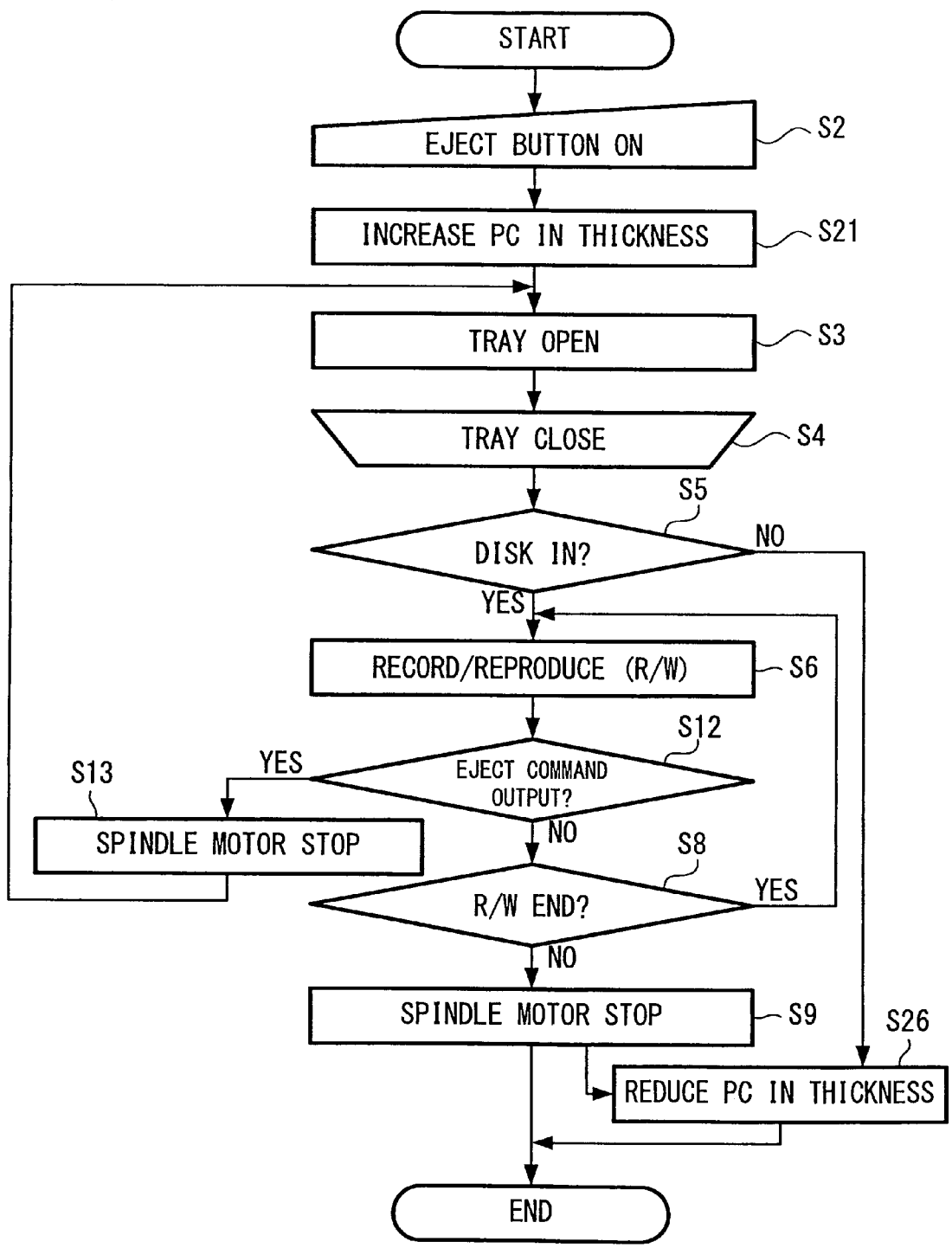
FIG. 49 is a flow chart showing a fourth example of control processing suitably used in the control device shown in FIG. 45.
Figure 50:
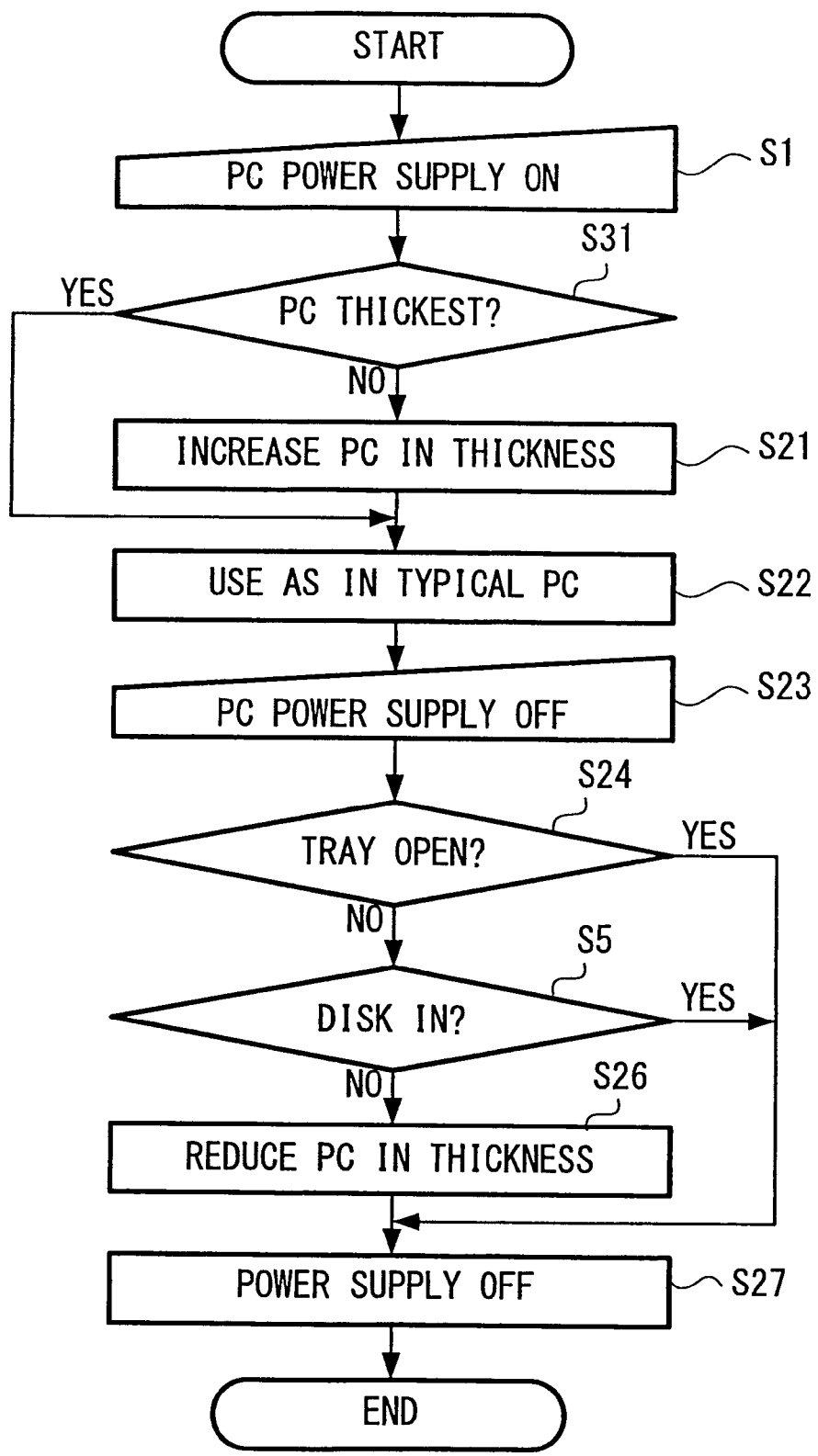
FIG. 50 is a flow chart showing a fifth example of control processing suitably used in the control device shown in FIG. 45.

FIGS. 41A and 41B are views describing a laptop showing a fourteenth example of an information processing device according to an embodiment of the present invention from which a disk drive device is removed. FIGS. 42A and 42B are perspective views showing an appearance of the same laptop. FIGS. 43A and 43B are views describing a laptop showing a fifteenth example of an information processing device according to an embodiment of the present invention from which a disk drive device is removed. FIGS. 44A and 44B are perspective views showing an appearance of the same laptop. FIG. 45 is a block diagram schematically describing a configuration of a control device in accordance with an information processing device according to an embodiment of the present invention. FIG. 46 is a flow chart showing a first example of control processing by the control device of FIG. 46. FIG. 47 is a flow chart showing a second example of the same control processing. FIG. 48 is a flow chart showing a third example of the same control processing. FIG. 49 is a flow chart showing a fourth example of the same control processing. FIG. 50 is a flow chart showing a fifth example of the same control processing. FIG. 51 is a flow chart showing a sixth example of the same control processing.

A laptop computer (hereinafter called "laptop") shown as a first example of an information processing device according to an embodiment of the present invention will be described with reference to FIGS. 1 and 2. The laptop 1 includes a flat rectangular parallelepiped lower enclosure 2, a flat rectangular parallelepiped upper enclosure 3 and a flat rectangular parallelepiped display enclosure 4. The three enclosures 2, 3 and 4 each have a space with a predetermined size and may be superposed and stacked on each other. Specifically, the upper enclosure 3 is stacked on the lower enclosure 2, and the display enclosure 4 may be stacked on the upper enclosure 3.

The three enclosures 2 to 4 of the laptop 1 shown in this example are rotatably connected to each other by a hinge mechanism, respectively. Specifically, the lower enclosure 2 is rotatably connected to the upper enclosure 3 by a first hinge 5, and the upper enclosure 3 is rotatably connected to the display enclosure 4 by a second hinge 6.

The first hinge 5 is placed on a front side close to an operator, and the second hinge 6 is placed on a rear side remote from the operator. That is, the first hinge 5 is formed by a combination (not shown) of a first lower hinge provided transversely extending in an upper front center part of the lower enclosure 2; left and right first upper hinges provided transversely extending in a lower front part of the upper enclosure 3 and holding the first lower hinge; and a first hinge shaft penetrating the first upper and lower hinges opposed to each other on an identical axis. The lower enclosure 2 is rotatably connected to the upper enclosure 3 on a front edge of the laptop 1 by the first hinge 5. Accordingly, a rear part of the upper enclosure 3 may be vertically rotated, and an inclination angle of the upper enclosure 3 relative to the lower enclosure 2 may be changed by vertically rotating the rear part.

The second hinge 6 is formed by a combination (not shown) of a second lower hinge provided transversely extending in a rear center part of the upper enclosure 3; left and right second upper hinges provided transversely extending on a rear side of the display enclosure 4 and holding the second lower hinge; and a second hinge shaft penetrating the second upper and lower hinges opposed to each other on an identical axis. The upper enclosure 3 is rotatably connected to the display enclosure 4 on a rear edge of the laptop 1 by the second hinge 6. Accordingly, a front part of the display enclosure 4 may be vertically rotated, and an inclination angle of the display enclosure 4 relative to the upper enclosure 3 may be changed by vertically rotating the front part.

FIG. 1 shows a state where the display enclosure 4 is rotated upward at 90° or more. In this state, an inner surface of the display enclosure 4 and an upper surface of the upper enclosure 3 are exposed. The laptop 1 is used in this state to input or process information, for example. FIG. 2 shows a state where the display enclosure 4 is rotated forward at 90° or more. In this state, the display enclosure 4 is superposed on the upper enclosure 3 and the upper surface of the upper enclosure 3 is covered with the display enclosure 4. The laptop 1 is stored or carried in this state, for example.

As shown in FIG. 1, an opening 8 is provided on the inner surface of the display enclosure 4 with a small edging remaining on its periphery. The opening 8 of the display enclosure 4 faces a flat panel display 9 such as a liquid crystal display, an organic EL display or a surface-conduction electron-emitter display which is a display stored in the opening 8. There are provided within the flat panel display 9 a backlight (not shown) applying light to a rear surface of the flat panel display 9; and a wiring board (not shown) on which a control device is mounted to control a screen of the flat panel display 9, so that various types of information, images and the like may be displayed on a display surface.

An input operation part 11 including a key input mechanism having many keys, a touch panel input mechanism or the like is provided on the upper surface of the upper enclosure 3 opposite to the opening 8 of the display enclosure 4. An upper cover 12 is provided on a lower surface of the upper enclosure 3 to cover a lower part of the input operation part 11. An upper surface of the lower enclosure 2 has a large opening in which there are stored a disk drive device 20 described next; a wiring board (not shown) on which a control device is mounted to control the disk drive device 20, other devices and equipment and the like; and a battery power supply supplying power to the disk drive device 20, the control device and the like.

The laptop 1 includes the disk drive device 20 inserted and withdrawn in a tray system. As shown in FIG. 3, the disk drive device 20 includes a drive unit 21 rotationally driving a disk-shaped recording medium to record (write) and reproduce (read) an information signal; a disk tray 22 on which the drive unit 21 is mounted; a tray chassis 23 movably supporting the disk tray 22; and a top cover 24 covering an upper surface of the tray chassis 23 including the drive unit 21. The lower enclosure 2 has a tray storage part for storing the disk drive device 20. The tray storage part has an opening on one side surface of the lower enclosure 2, and part of the disk tray 22 may significantly protrude from the opening.

The tray chassis 23 is formed of a flat enclosure with openings on an upper surface and a front surface, respectively, and has a rectangular parallelepiped main body 23a in which the disk tray 22 is stored; and an extended portion 23b formed continuously with one side of the main body 23a. The extended portion 23b is provided to avoid interference with an optical disk mounted on the disk tray 22. The top cover 24 is formed of a flat enclosure having openings on a lower surface and a front surface, respectively, and has a size and a shape corresponding to a size and a shape of the tray chassis 23. The top cover 24 is used as a cover opposed to the tray chassis 23, and is provided so that openings on front surfaces of the tray chassis 23 and the top cover 24 face the opening of the tray storage part. The tray chassis 23 is fixed to a lower surface of the lower enclosure 2 by a fixing mechanism such as screwing or caulking. The top cover 24 is directly attached to the upper enclosure 3 or is attached to the upper cover 12.

The disk tray 22 is formed of a flat plate-like member having an space in which the drive unit 21 may be moved within a predetermined range. There is provided on an upper surface of the disk tray 22 a recess 27 for horizontally mounting and storing an optical disk showing a specific example of a disk-shaped recording medium. The recess 27 has a fitting hole 28 in which the drive unit 21 is fitted. The fitting hole 28 is formed as an opening having a shape approximately similar to that of the drive unit 21 which corresponds to a plane shape of the drive unit 21 and is slightly larger than the plane shape.

A turntable 41 of the drive unit 21 fitted in the fitting hole 28 is placed in a position biased to the extended portion 23b on a rear portion in a longitudinal direction of the disk tray 22 and one side in a crosswise direction of the disk tray 22. The recess 27 is formed as a round recess having a rotation center of the turntable as a center. Therefore, the recess 27 has a plane shape lacking one side part and a portion of a rear part. The extended portion 23b is provided in the tray chassis 23 in order to avoid interference with an optical disk stored in the recess 27. The extended portion 23b is provided so that the disk tray 22 may be moved to the back with an optical disk stored in the recess 27 to store the whole optical disk in the lower enclosure 2.

A control substrate 29 on which a control device is mounted to control driving of the disk drive device 20 is attached to part of the space formed on a lower surface of the disk tray 22. Electronic components 31 such as a microcomputer (MPU), a semiconductor integrated circuit (IC) and a capacitor are mounted on the control substrate 29. The control device is formed of MPU, IC and others mounted on the control substrate 29. The disk tray 22 is movably stored in a tray case formed by the tray chassis 23 and the top cover 24. The disk tray 22 may be pulled out from the opening in a predetermined amount by a tray transfer mechanism (not shown).

The tray transfer mechanism may be formed by a coil spring and its lock member, for example. Specifically, the coil spring is placed between the disk tray 22 and the tray chassis 23 and is locked by the lock member. That is, the disk tray 22 is stored in the tray case with the coil spring compressed, and a compressed state of the coil spring is ensured by the lock member. The coil spring locked by the lock member is unlocked so that the disk tray 22 may be moved by a spring force of the coil spring and may protrude from the opening in a predetermined amount.

Further, the tray transfer mechanism is not limited to such a mechanism in this example and may obviously be another moving mechanism. For example, the tray transfer mechanism may also be formed by providing a rack in the disk tray 22 and providing a pinion meshed with the rack and a motor rotationally driving the pinion. In this case, it is possible to determine a moving direction of the disk tray 22 according to a rotation direction of the motor and determine an amount of movement of the disk tray 22 according to an amount of rotation of the motor. The laptop 1 shown in FIG. 1 has an opening of the tray case on a right side surface of the lower enclosure 2. The opening is openably closed by a cover 32 attached to a front surface of the disk tray 22.

The drive unit 21 has a configuration as shown in FIGS. 4 and 5. The drive unit 21 includes a base member 33 movably supported by the tray chassis 23; a disk rotary drive mechanism 34 attached to the base member 33; an optical pickup 35; and a pickup moving mechanism 36. Not only optical disks, obviously, but also various recording disks such as magneto-optical disks and magnetic disks may be used as disk-shaped recording media for the drive unit 21.

Further, the optical disks may be not only reproduction-only optical disks such as CDs, CD-ROMs and DVD-ROMs, obviously, but also various optical disks in which recording may be performed once or many times such as CD-RWS, DVD-Rs and DVD-RWS. Examples of disk recording and/or reproduction devices corresponding to these disk-shaped recording media include optical disk recording devices, optical disk reproduction devices, optical disk recording/reproduction devices, optical disk imaging devices, magneto-optical disk recording devices, magneto-optical disk reproduction devices, magneto-optical disk imaging devices, magnetic disk recording devices, magnetic disk reproduction devices and magnetic disk recording/reproduction devices.

An optical disk or the like used in the drive unit 21 is not limited to a disk-shaped recording medium having a diameter of 12 cm and may obviously be a disk-shaped recording medium having a diameter of 8 cm or a disk-shaped recording medium having another size. Further, the drive unit 21 may be formed to correspond to a plurality of types of optical disks differing in diameter, for example, both an optical disk having a diameter of 12 cm and an optical disk having a diameter of 8 cm.

As shown in FIGS. 4 and 5, the disk rotary drive mechanism 34 of the drive unit 21 has the turntable 41 as a disk mounting part. An optical disk is mounted on the turntable 41. The turntable 41 of the disk rotary drive mechanism 34 is rotationally driven to rotate the optical disk at a predetermined velocity (for example, a constant linear velocity). The optical pickup 35 writes new information on an optical disk mounted on the turntable 41 and rotationally driven, by irradiating an information recording surface of the optical disk with an optical beam, or reads information previously recorded on the information recording surface by reading reflected light of an irradiated optical beam.

The pickup moving mechanism 36 moves the optical pickup 35 to outside in a radial direction of an information recording surface of an optical disk mounted on the turntable 41 and rotationally driven. The optical pickup 35 performs an operation of recording and/or reproduction of an information signal when moved to outside in the radial direction. The disk rotary drive mechanism 34, the optical pickup 35 and the pickup moving mechanism 36 are mounted on the base member 33. The base member 33 is attached to and within the tray chassis 23 to have a varied attitude or to be movable in parallel relative to the tray chassis 23.

The base member 33 is formed by punching a sheet metal into a predetermined shape and bending a periphery of the shape slightly downward. As shown in FIG. 5, a plane shape of the base member 33 is formed as a horizontally long and approximately octagonal frame as a whole by providing large chamfers on four corners of a rectangle and providing a large opening 42 inside. The opening 42 has a pickup opening 42a exposing an upper part of the optical pickup 35; and a table opening 42b facing the turntable 41 of the disk rotary drive mechanism 34 upward. The pickup opening 42a is formed as a large approximate rectangle so as to expose the whole upper part of the optical pickup 35. The approximately semicircular table opening 42b is placed on one side in a longitudinal direction of the pickup opening 42a.

The disk rotary drive mechanism 34 is placed in the table opening 42b. As shown in FIG. 5, the disk rotary drive mechanism 34 has a spindle motor 43 having the turntable 41 on which an optical disk is detachably mounted; and a support plate 44 fixing the spindle motor 43 and supporting the motor on the base member 33. The turntable 41 is mounted on and provided integrally with a rotation part of the spindle motor 43, and is rotatably supported by a fixed part of the spindle motor 43 fixed to the support plate 44. The support plate 44 supporting the spindle motor 43 is screwed and attached to a lower surface of the base member 33 so that a mounting part 41b of the turntable 41 protrudes slightly upward from the table opening 42b of the base member 33.

The turntable 41 has a fitting part 41a formed of a columnar projection fitted in a central hole of an optical disk; and a mounting part 41b on which a periphery of the central hole of the optical disk is mounted. The fitting part 41a is formed integrally with the mounting part 41b. A ring-shaped cushioning material 45 is attached to the mounting part 41b to cushion contact with an optical disk. A plurality of (three in this example) locking pawls 46 engaged with a central hole of an optical disk are placed in the fitting part 41a at equal intervals in a circumferential direction. Each of the locking pawls 46 is impelled by an elastic member (not shown) such as a coil spring, and tips of the locking pawls 46 protrude toward outside in a radial direction from an outer periphery of the fitting part 41a, respectively. The locking pawls 46 form a chucking mechanism. All the locking pawls 46 are engaged with the central hole to hold an optical disk on the turntable 41.

The optical pickup 35 may approach and depart from the disk rotary drive mechanism 34 within a predetermined range. The optical pickup 35 has a semiconductor laser as a light source emitting an optical beam; and a photodetector including a light receiving element receiving a returned optical beam. The optical pickup 35 emits an optical beam from the semiconductor laser, focuses the optical beam using an objective lens 48 to irradiate an information recording surface of an optical disk with the beam, and receives a returned optical beam reflected on the information recording surface using the photodetector. Accordingly, an information signal may be written on or read from the information recording surface of the optical disk.

The optical pickup 35 has an objective lens drive mechanism such as a biaxial actuator displacing and driving the objective lens 48 in an optical axis direction (hereinafter referred to as "focusing direction") and a direction perpendicular to a recording track of an optical disk (hereinafter referred to as "tracking direction"). Based on a detection signal from an optical disk detected by the photodetector, the objective lens drive mechanism focuses the objective lens 48 on an information recording surface while displacing the objective lens 48 in the focusing direction and the tracking direction. This makes it possible to control driving of a focus servo focusing the objective lens 48 on an information recording surface, a tracking servo allowing a spot of an optical beam focused by the objective lens 48 to follow a recording track, and the like. The optical pickup 35 is mounted on the base member 33 through the pickup moving mechanism 36 and may approach and depart from the turntable 41 within a predetermined range.

The pickup moving mechanism 36 has a pickup base 51, a pair of guide shafts 52 and 53, a feed screw shaft 54 and a drive motor 55. The pickup base 51 is formed of a flat block-shaped member in which a biaxial actuator, a photodetector and the like are stored, and is movably supported by the one pair of guide shafts 52 and 53. The one pair of guide shafts 52 and 53 is placed on one side of the turntable 41 on the lower surface of the base member 33 so that the guide shafts 52 and 53 are parallel to each other at a predetermined interval between them. Both ends of each of the guide shafts 52 and 53 are supported by bearings in two of four places in the base member 33, respectively. Each of the bearings is formed of a bearing piece provided in the base member 33 and a holding plate as a separate member. The holding plate is screwed to hold the guide shaft between the bearing piece and the holding plate, so that the one pair of guide shafts 52 and 53 is fastened and fixed to the base member 33.

The pickup base 51 has a first bearing 56 and a second bearing 57 protruding in both outside directions perpendicular to axial directions of the one pair of guide shafts 52 and 53. The first bearing 56 is formed of a front bearing 56a and a rear bearing 56b each having a bearing hole into which the first guide shaft 52 is slidably inserted. The front and rear bearings 56a and 56b are coplanarly placed at a predetermined interval between them in the axial direction of the first guide shaft 52. A rack member 58 having an engaging part engaged with a screw groove of the feed screw shaft 54 is placed between the front and rear bearings 56a and 56b. The rack member 58 is screwed to the pickup base 51 using a fixing screw 59.

A guide groove having a side opening is provided in the second bearing 57. The second guide shaft 53 is slidably inserted into the guide groove. The second guide shaft 53 penetrating the second bearing 57 and the first guide shaft 52 penetrating the front and rear bearings 56a and 56b of the first bearing 56 slidably support the pickup base 51. The feed screw shaft 54 is placed approximately parallel to the first guide shaft 52 at a predetermined interval between the feed screw shaft 54 and the first guide shaft 52. The feed screw shaft 54 is a rotating shaft of the drive motor 55. The drive motor 55 is fixed to the base member 33 by an attachment bracket (not shown). A tip of the feed screw shaft 54 is rotatably supported by the attachment bracket. The attachment bracket is screwed to the base member 33 so that the feed screw shaft 54 and the drive motor 55 are attached to the base member 33.

One end of a flexible wiring board (not shown) is connected to the pickup base 51. The flexible wiring board electrically connects the optical pickup 35 held by the base member 33 with a power supply side connector (not shown) outside the drive unit 21 and is a highly flexible wiring member. The flexible wiring board has a first connection part attached to the pickup base 51; and a second connection part connected to the power supply side connector. The flexible wiring board has a wiring circuit group formed to have many wiring circuits, and the wiring circuits are each connected between the first connection part and the second connection part.

As shown in FIG. 4, a base cover 61 is attached to an upper surface of the base member 33. The base cover 61 has a shape approximately corresponding to the plane shape of the base member 33. The base cover 61 has an opening 62 to expose the turntable 41 and the objective lens 48 of the optical pickup 35. The opening 62 extends in a moving direction of the optical pickup 35, and is formed as a long hole continuous between a position where the optical pickup 35 is most remote from the turntable 41 and the table opening 42b where the turntable 41 is exposed. The base cover 61 is fastened and fixed to the upper surface of the base member 33 using a plurality of (six in this example) fixing screws 63.

The disk drive device 20 having such a configuration is attached to the three enclosures 2 to 4 to have a relation as shown in FIGS. 6A to 6C. FIG. 6A is a partial cross-sectional view describing a used state of the laptop 1 where an optical disk 30 is mounted on the turntable 41 of the disk rotary drive mechanism 34 in the drive unit 21 and the display enclosure 4 is rotated at about 100° upward. FIG. 6B is a partial cross-sectional view describing a state where the display enclosure 4 is completely fallen forward to close the display surface with the optical disk 30 mounted on the turntable 41. FIG. 6C is a partial cross-sectional view describing a state where the display enclosure 4 is completely fallen forward to close the display surface with the optical disk 30 removed from the turntable 41.

Specifically, FIG. 6A shows a state where the laptop 1 is used (operated); in this case, a rear surface of the upper enclosure 3 is raised to enlarge a disk storage region so that the optical disk 30 is rotatable. On the other hand, FIGS. 6B and 6C show a non-used state of the laptop 1, and the laptop 1 is carried in a state shown in FIG. 6B or 6C. The laptop 1 is preferably as thin as possible, because the laptop 1 is more conveniently carried as it is thinner. Accordingly, in this example, when the laptop 1 is not used, the top cover 24 is allowed to approach the tray chassis 23 as close as possible in order to reduce the disk storage region so that the optical disk 30 is not rotatable.

Therefore, in the first example, the base member 33 is fixed to and supported by the tray chassis 23 and, on the other hand, the disk rotary drive mechanism 34 having the turntable 41 and the spindle motor 43 is parallel-movably supported, so that the disk rotary drive mechanism 34 may be moved relative to the base member 33. Specifically, the base member 33 is fixed by a plurality of support shafts 65, 65 vertically provided in the tray chassis 23. A stopper member 69 limiting movement of the disk rotary drive mechanism 34 is provided on each of the support shafts 65. The stopper member 69 functions as a height determination member to determine a height position of the disk rotary drive mechanism 34. The optical pickup 35 is supported by the base member 33 through the pickup moving mechanism (not shown).

The disk rotary drive mechanism 34 is mounted on a sheet metal motor base 66 larger than the spindle motor 43. The motor base 66 has guide holes as many as the support shafts 65 in positions corresponding to the support shafts 65, respectively. The support shafts 65 are slidably inserted into the guide holes, respectively. Conical coil springs 67 showing a specific example of an impelling member are mounted on the support shafts 65, respectively. One end of each of the conical coil springs 67 is seated on the motor base 66, and the other end is seated on the tray chassis 23. The disk rotary drive mechanism 34 is continuously impelled in a direction away from the tray chassis 23 by a spring force of the plurality of conical coil springs 67.

The top cover 24 is placed in the direction away from the tray chassis 23. A pressing projection 68 as a pressing part brought into contact with the turntable 41 of the disk rotary drive mechanism 34 is provided in a position in the top cover 24 corresponding to a rotation center of the disk rotary drive mechanism 34. As shown in FIGS. 6B and 6C, the pressing projection 68 presses down the disk rotary drive mechanism 34 against a spring force of the conical coil springs 67 with the display enclosure 4 closed and the upper enclosure 3 superposed on the lower enclosure 2. Accordingly, the disk storage region is reduced so that the optical disk 30 is not rotatable.

As shown in FIGS. 1 and 6, the display enclosure 4 has a cam member 70 showing a first example of an enclosure moving mechanism. The cam member 70 is rotated integrally with the display enclosure 4 to raise the rear part of the upper enclosure 3 and enlarge the disk storage region as a disk mounting part on which the optical disk 30 is mounted. The cam member 70 may have a shape to allow an attitude of the upper enclosure 3 to be easily changed in association with a rotation operation of the display enclosure 4, and may be a circular arc cam, a disk cam or a tangent cam, for example. A cam receiving part 71 that may endure slide contact with the cam member 70 is provided in a position in the lower enclosure 2 corresponding to the cam member 70.

In this example, the cam members 70 are formed to be identical in size and shape in two places on both transverse ends. This is because a transverse force balance in opening and closing the display enclosure 4 should be taken into consideration. The cam member 70 according to an embodiment of the present invention may not be limited to this example. For example, the cam member 70 may be provided in one place in a longitudinal center in a lower part of the display enclosure 4; alternatively, the cam members 70 may be provided in three or more places at suitable intervals among them in a longitudinal direction.

ABS (acrylonitrile-butadiene-styrene resin), for example, is suitably used as a material for the disk tray 22, but may be not only another engineering plastic, obviously, but also a metal such as an aluminum alloy used as the material. A material used for the tray chassis 23 and the top cover 24 is suitably a metal such as a stainless steel plate or a steel plate, for example, but may be an engineering plastic such as ABS (acrylonitrile-butadiene-styrene resin).

When raising a front edge of the display enclosure 4 in a state shown in FIG. 6B, the display enclosure 4 is rotated around the second hinge 6 as a rotation center. Here, parts of the cam members 70 brought into contact with the cam receiving part 71 of the lower enclosure 2 are gradually shifted toward tips of the cam members 70 in accordance with an increase in an amount of rotation of the display enclosure 4. Due to a change in the contact positions of the cam members 70, the upper enclosure 3 is rotated around the first hinge 5 as a rotation center and the rear part of the upper enclosure 3 is gradually raised. The display enclosure 4 is rotated toward a state shown in FIG. 6A where the laptop 1 is used.

In the used state shown in FIG. 6A, rear sides of the upper enclosure 3 and the lower enclosure 2 are opened with the first hinge 5 placed forward as a rotation center. Here, the disk drive device 20 is placed in a position sufficiently remote from the first hinge 5, and there is a small opening angle between the upper enclosure 3 and the lower enclosure 2. Therefore, in the position of the drive unit 21, the same effect may be achieved as in a case where the upper enclosure 3 is moved approximately parallel to the lower enclosure 2.

Accordingly, rigidity may be increased while ensuring mechanism simplicity by using the hinge mechanism. Moreover, since the upper enclosure 3 having a keyboard is sloped, the input operation part 11 may be adapted to hands of a user.

In carried states shown in FIGS. 6B and 6C, the flat panel display 9 stored in the display enclosure 4 is closed and brought in close contact with the upper enclosure 3, and the upper enclosure 3 is also brought in close contact with the lower enclosure 2. The turntable 41 and the spindle motor 43 are impelled downward by the pressing projection 68 provided in the top cover 24 and are pressed down against an impelling force of the conical coil springs 67. Here, a minimum clearance of 0 mm or more is set between the top cover 24 and the optical disk 30. A minimum clearance is also set between the tray chassis 23 with the optical pickup 35 and the optical disk 30.

In this example, in the used state shown in FIG. 6A, the upper enclosure 3 and the lower enclosure 2 are opened relative to each other and the top cover 24 and the tray chassis 23 are similarly opened, so that a pressing force of the pressing projection 68 toward the turntable 41 and the spindle motor 43 is released. As a result, the spindle motor 43 and the like are impelled toward the top cover 24 by a spring force of the conical coil springs 67. Accordingly, the disk rotary drive mechanism 34 is positioned in a height direction by the stopper members 69. As a result, the clearance between the tray chassis 23 with the optical pickup 35 and the optical disk 30 is enlarged to a clearance large enough to endure rotation of the optical disk 30.

After the height position of the disk rotary drive mechanism 34 is restrained by the stopper members 69, the clearance between the top cover 24 and the optical disk 30 is also enlarged to a clearance large enough to endure rotation of the optical disk 30, because the top cover 24 is away from the tray chassis 23. The laptop 1 may be thinner by further reducing a design margin on condition that total inspection and adjustment of components are performed. A thickness of an enclosure is increased in this manner only when an optical disk is used or when an information apparatus is used, so that the apparatus may have a necessary thickness ensured during use and at the same time may be thinnest for carrying the apparatus during non-use.

Here, the disk storage region may be narrowed due to misuse when an optical disk is used. In such a case, a clearance between the optical disk 30 and the disk drive device 20 is narrowed to a region not large enough to endure rotation of the optical disk 30, so that troubles may be caused such as generation of noise and damage to the optical disk 30. Methods shown in FIGS. 7A to 7C may be used to prevent this, for example. As shown in FIGS. 7A to 7C, a cover lock mechanism 75 for the disk drive device 20 is provided.

The cover lock mechanism 75 locks the top cover 24 and has a lock member 76 capable of supporting the top cover 24 at a plurality of heights (two heights in this example); and a driving part (not shown) moving the lock member 76 forward and backward. The driving part is formed of a rack 76a provided in the lock member 76; a pinion meshed with the rack 76a; and a motor rotationally driving the pinion, for example. The lock member 76 has a first support part 77a supporting the top cover 24 at a first height; and a second support part 77b set in a position higher than the first support part 77a. By operation of the driving part, the lock member 76 may be in a first position shown in FIG. 7A and closest to the optical disk 30; a second position shown in FIG. 7B and slightly remote from the optical disk 30; or a third position shown in FIG. 7C and most remote from the optical disk 30.

By operation of the cover lock mechanism 75, a tip 24a of the top cover 24 is placed in the second support part 77b of the lock member 76 when the lock member 76 is placed in the first position shown in FIG. 7A. In this state, the tip 24a of the top cover 24 is brought into contact with the second support part 77b, making it possible to prevent the top cover 24 from further approaching the optical disk 30. When the lock member 76 is moved to the second position shown in FIG. 7B, the tip 24a of the top cover 24a is placed in the second support part 77b of the lock member 76. In this state, the tip 24a of the top cover 24 is brought into contact with the first support part 77a, making it possible to ensure a minimum clearance preventing the top cover 24 from coming into contact with the optical disk 30.

Further, when the lock member 76 is moved to the third position shown in FIG. 7C, the tip 24a of the top cover 24 is placed in a part away from the lock member 76. In this state, the tip 24a of the top cover 24 is not brought into contact with the lock member 76, so that the top cover 24 may be brought into contact with and superposed on the tray chassis 23. In this case, the upper enclosure 3 may be prevented from being accidentally opened from the top cover 24 in a closed state by providing a hook 3a in the upper enclosure 3 and providing an engaging part 76b corresponding to the hook 3a in the lock member 76 as shown in the figure, for example. The lock member 76 may obviously be moved by another power mechanism. For example, an operation lever may be provided in the lock member 76 so that a position of the lock member 76 may be switched among the above three positions by a manual operation of a user.

As described above, the aforementioned inconvenience may be prevented by providing a cover lock mechanism that prevents the thickness of the disk drive device 20 from being reduced when an optical disk is rotated. A cylinder, a solenoid or the like may be used instead of the above combination of a motor and a rack. A detection switch may also be provided to detect an operation of reducing the disk drive device 20 in thickness when an optical disk is rotated. It is possible to provide a brake device stopping the spindle motor immediately when the operation of thickness reduction is detected. Alternatively, it is possible to allow control of reversing the spindle motor when the same operation is detected.

FIGS. 8A and 8B show a first example of a lifting restraint mechanism in accordance with an information processing device according to an embodiment of the present invention. The lifting restraint mechanism 150 prevents the upper enclosure 3 from being unnecessarily away from the lower enclosure 2 on rear sides of the enclosures. In the laptop 1 shown in FIG. 6A to 6C, the upper enclosure 3 is rotatably connected to the lower enclosure 2 by the first hinge 5 and is therefore may theoretically be rotated at about 360°. Since the laptop 1 is inconveniently used if rotation in such a range is allowed, it is preferable to restrain an amount of rotation of the upper enclosure 3 relative to the lower enclosure 2 within a certain range. The lifting restraint mechanism 150 limits the amount of rotation of the upper enclosure 3 relative to the lower enclosure 2.

The lifting restraint mechanism 150 in the first example is formed of a guide pin 151; and a guide groove 152 restraining movement of the guide pin 151. The first example with the lifting restraint mechanism 150 applied to an information processing device is a laptop 1A shown in FIGS. 8A and 8B. Therefore, in FIGS. 8A and 8B, repeated description of the same parts as shown in FIGS. 6A to 6C is omitted by attaching the same reference symbols.

The guide pin 151 is provided protruding sideward on a tip of the cam member 70 rotatably supported by the upper enclosure 3. On the other hand, the guide groove 152 is provided in a bearing wall 153 vertically provided on the upper surface of the lower enclosure 2. A track of the guide groove 152 is formed to be identical to a track of the guide pin 151 with a cam surface of the cam member 70 sliding and constantly brought into contact with the cam receiving part 71 when the cam member 70 is rotated around the second hinge 6 as a center. In this case, the track of the guide groove 152 is an arc-shaped long hole. The lifting restraint mechanism 150 is provided with such a configuration, making it possible to prevent the upper enclosure 3 from being moved away significantly and ensuring a suitable use form.

FIGS. 9 to 11 show first and second examples of an enclosure moving mechanism according to an embodiment of the present invention. The enclosure moving mechanism shown as the first and second examples is formed by two pantographs 80, 80 and the cam member 70. The disk drive device 20 and the cam member 70 of a laptop 1B are the same as described above; therefore, their description is omitted.

The pantograph 80 has two lever members 81, 81 with an equal length. The two lever members 81, 81 are crossed and crossing parts of the lever members are rotatably connected to each other by a rotation pin 82. Tips of the lever members 81 are rotatably connected to the lower enclosure 2 and the upper enclosure 3 by rotating shafts 83, respectively. Sliding shafts 84 are provided on rear ends of the lever members 81, respectively. The sliding shafts 84 are slidably engaged with long holes 85 provided in the lower enclosure 2 and the upper enclosure 3, respectively.

In FIGS. 10A and 10B, a length L between the rotation pin 82 and the rotating shaft 83 is equal to a length L between the rotation pin 82 and the sliding shaft 84 in each of the pantographs 80. In the laptop 1B, the pantographs 80 are longitudinally symmetrical to each other at equal intervals from the rotation pin 82 as a center, so that a line connecting the upper rotating shaft 83 to the upper sliding shaft 84 in the pantographs 80 is maintained to be parallel to a line connecting the lower rotating shaft 83 to the lower sliding shaft 84 and is vertically moved. Therefore, an amount of lifting of the upper enclosure 3 is equally an amount M on front and rear ends of the upper enclosure 3.

In FIGS. 11A and 11B, a length L2 between the rotation pin 82 and the sliding shaft 84 is longer than a length L1 between the rotation pin 82 and the rotating shaft 83 in each of the pantographs 80 (L1<L2). In the laptop 1B, since front sides of the pantographs 80 relative to the rotation pin 82 as a center are shorter and rear sides of the pantographs 80 relative to the rotation pin 82 are longer, a line connecting the upper rotating shaft 83 to the upper sliding shaft 84 in the pantographs 80 is turned to be inclined to a line connecting the lower rotating shaft 83 to the lower sliding shaft 84 and is vertically moved while being inclined. Here, as a ratio of the length L1 to the length L2 is larger, an inclination angle of the upper enclosure 3 is larger.

The two pantographs 80 having such a configuration are placed on left and right sides of the lower enclosure 2 and the upper enclosure 3. The upper enclosure 3 is supported liftably relative to the lower enclosure 2 through the two pantographs 80. The pantograph function is combined with the cam member 70, so that the upper enclosure 3 may be lifted in association with a rotation operation of the display enclosure 4. Moreover, the upper enclosure 3 may be vertically moved parallel to the lower enclosure 2 by setting a length between a fulcrum and a front end equal to a length between the fulcrum and a rear end in the pantograph 80. Alternatively, the upper enclosure 3 may be lifted while changing its attitude by setting the length between the fulcrum and the front end differing from the length between the fulcrum and the rear end in the pantograph 80.

FIG. 9A shows a used state of the disk drive device 20 where the optical disk 30 is mounted on a disk mounting part of the laptop 1B. FIG. 9B shows a non-used state of the disk drive device 20 where the optical disk 30 is not mounted on the disk mounting part. In the non-used state of FIG. 9B, the disk drive device 20 in a thinnest state has an inner clearance reduced so that the optical disk 30 may not be placed in the disk drive device 20. As a result, the disk storage region may have a clearance as thin as possible. Therefore, the laptop 1B may be thinnest, and the whole device may be reduced in size and thus more conveniently carried, for example.

FIGS. 12A and 12B show a laptop 1C in which the lifting restraint mechanism 150 in accordance with a first example of a lifting restraint mechanism in an information processing device according to an embodiment of the present invention is applied to the laptop 1B shown in FIGS. 9A and 9B. The lifting restraint mechanism 150 is configured as in the aforementioned example. The guide pin 151 is provided in the cam member 70 supported by the upper enclosure 3, and the guide groove 152 is provided on the bearing wall 153 provided in the lower enclosure 2.

An amount of rotation of the upper enclosure 3 relative to the lower enclosure 2 may be limited within a predetermined range by applying the lifting restraint mechanism 150 to the laptop 1C having a pantograph enclosure moving mechanism in this manner. In particular, in the pantograph enclosure moving mechanism, when the upper enclosure 3 is freely moved without limitations, the upper enclosure 3 is not constant in height and attitude and therefore a position and an inclination angle of the input operation part 11 are changed, disadvantageously. However, the upper enclosure 3 may be maintained to have a predetermined height and a predetermined attitude by providing the lifting restraint mechanism 150 as in this example. Therefore, it is possible to prevent the upper enclosure 3 from being significantly away from the lower enclosure 2 and ensure a suitable use form of the upper enclosure 3 and the like.

FIGS. 13A and 13B show a third example of an enclosure moving mechanism according to an embodiment of the present invention. The enclosure moving mechanism shown as the third example is formed of the cam member 70 and two gears 86 and 87. The cam member 70 is rotatably supported by the upper enclosure 3 through a pivot 88. The first gear 86 is formed integrally with a bottom of the cam member 70. The cam member 70 is pivotally supported to be rotatable around a rotation center of the first gear 86 as a center. Gear teeth are provided in an about half portion in a circumferential direction of the first gear 86. The second gear 87 is meshed with the first gear 86 and fixed to the display enclosure 4. Gear teeth are provided in an about one-third portion in a circumferential direction of the second gear 87. The second gear 87 may be rotated integrally with the display enclosure 4 around the second hinge 6 as a center.

FIG. 13A shows a main part of a laptop in a used state where the display enclosure 4 is raised. FIG. 13B shows a main part of a laptop in a non-used state where the display enclosure 4 is folded. In the enclosure moving mechanism, when the display enclosure 4 in the state shown in FIG. 13B is rotated in an F1 direction, the second gear 87 formed integrally with the display enclosure 4 is rotated in an F2 direction. Accordingly, the first gear 86 meshed with the second gear 87 is rotated in a G1 direction, and the cam member 70 formed integrally with the first gear 86 is rotated in a G2 direction. Therefore, the cam member 70 slides on a surface of the cam receiving part 71 and is rotated in a counterclockwise direction in the figure. As a result, an attitude of the cam member 70 is changed as shown in FIG. 13A, in which a rear side of the upper enclosure 3 is raised and the upper enclosure 3 is maintained to be inclined with the rear side elevated.

On the other hand, when the display enclosure 4 in the state shown in FIG. 13A is rotated in an F3 direction, the cam member 70 is rotated in a G3 direction through rotation of the second gear 87 formed integrally with the display enclosure 4 and rotation of the first gear 86 meshed with the second gear 87. Accordingly, the cam member 70 slides on a surface of the cam receiving part 71 in an inverse direction and is rotated in a clockwise direction in the figure. As a result, the cam member 70 is changed as shown in FIG. 13B, in which the upper enclosure 3 is superposed on the lower enclosure 2 and the display enclosure 4 is superposed on the upper enclosure 3.

An enclosure moving mechanism according to an embodiment of the present invention is not limited to each of the aforementioned examples. A link mechanism linked with an opening/closing operation of the flat panel display 9 to lift an upper enclosure or a rack-and-pinion mechanism may be used as another example. Specifically, a plurality of guide shafts are provided in the lower enclosure 2 to liftably support the upper enclosure 3, and the upper enclosure 3 is lifted by a link mechanism or a rack-and-pinion mechanism. In this case, the link mechanism or the rack-and-pinion mechanism may be manually operated by a user or automatically operated by a motor or the like.

FIGS. 14A and 14B show a case where a second example of a lifting restraint mechanism in an information processing device according to an embodiment of the present invention is applied to a laptop including the enclosure moving mechanism shown in FIGS. 13A and 13B. The enclosure moving mechanism shown in this example has the same configuration as in the enclosure moving mechanism formed of the cam member 70 and the two gears 86 and 87 which is described in the above example. A lifting restraint mechanism 160 is provided integrally with the enclosure moving mechanism. The lifting restraint mechanism 160 is formed of an L-shaped hook member and has one end fixed to the lower surface of the upper enclosure 3. The hook member 160 protrudes downward from the lower surface of the upper enclosure 3. A stopper pawl 160*a* protruding sideward is provided at a lower end of the hook member 160.

The hook member 160 penetrates a hole 161 provided in the lower enclosure 2 and intrudes into a space in the lower enclosure 2. A tension coil spring 162 forms a bridge between the lower enclosure 2 and the upper enclosure 3. The upper enclosure 3 is impelled toward the lower enclosure 2 by a spring force of the tension coil spring 162. The upper enclosure 3 is lifted against a spring force of the tension coil spring 162, so that the stopper pawl 160*a* of the hook member 160 is brought into contact with an inner surface of the hole 161 of the lower enclosure 2 in a predetermined height position. The stopper pawl 160*a* is brought into contact with the inner surface of the lower enclosure 2 in this manner to prevent the upper enclosure 3 from being lifted to above the predetermined height position and accordingly prevent the upper enclosure 3 from being unnecessarily away from the lower enclosure 2.

FIG. 15A shows a laptop 1D in a used state where the display enclosure 4 is raised. FIG. 15B shows the laptop 1D in a first non-used state where the display enclosure 4 is folded. Further, FIG. 15C shows the laptop 1D in a second non-used state. The laptop 1D is thinnest in the state shown in FIG. 15C. The laptop 1D is carried in this thinnest state, for example. In the first non-used state shown in FIG. 15B, the laptop 1D is slightly thicker with the optical disk 30 mounted on the turntable 41. In the used state shown in FIG. 15A, the disk storage region has a sufficient space ensured and the optical disk 30 may be rotationally driven without contact with the top cover 24 or the like.

FIGS. 16A to 16C, 17A, 17B, 18A and 18B are views showing a sixth example of an enclosure moving mechanism in accordance with an information processing device according to an embodiment of the present invention and an enclosure lock mechanism suitably used in the enclosure moving mechanism. The enclosure moving mechanism 170 of the fourth example is formed to automatically lift the upper enclosure 3 by driving of a motor. The enclosure moving mechanism 170 has an electric motor 171; an output gear 172 fixed to a rotating shaft of the electric motor 171; three intermediate gears 173 to 175; a driving gear 176; and a rack 177. The electric motor 171 is fixed to the lower enclosure 2, and the output gear 172 is attached to the rotation shaft protruding sideward from a side surface of the electric motor 171.

As shown in the enlarged view of FIG. 17A, the first intermediate gear 173 having a large diameter is meshed with the output gear 172, and the second intermediate gear 174 having a small diameter is provided integrally with the first intermediate gear 173. The third intermediate gear 175 having a large diameter is meshed with the first intermediate gear 173, and the driving gear 176 having a small diameter is provided integrally with the third intermediate gear 175. The driving gear 176 is meshed with the rack 177, and the rack 177 is fixed to the upper enclosure 3. The enclosure moving mechanism 170 has an operation switch (not shown) to operate the mechanism. An attitude of the upper enclosure 3 relative to the lower enclosure 2 may be changed as shown in FIGS. 16A to 16C upon an operation (such as an ON/OFF operation) of the operation switch.

FIG. 16A shows the laptop 1D in a used state where the display enclosure 4 is raised. FIG. 16B shows the laptop 1D in a first non-used state where the display enclosure 4 is folded. FIG. 16C shows the laptop 1D in a second non-used state. The used state shown in FIG. 16A corresponds to the state shown in FIG. 6A, the first non-used state shown in FIG. 16B corresponds to the state shown in FIG. 6B, and the second non-used state shown in FIG. 16C corresponds to the state shown in FIG. 6C.

The laptop 1D is thinnest when the enclosure moving mechanism 170 is in the state shown in FIG. 16C. The laptop 1D is carried in this state, for example. When the enclosure moving mechanism 170 in the state shown in FIG. 16C is operated by operating the operation switch, a rotation force of the electric motor 171 is transferred to the rack 177 from the output gear 172 through the first intermediate gear 173, the second intermediate gear 174, the third intermediate gear 175 and the driving gear 176. Accordingly, the rack 177 is lifted and the rear part of the upper enclosure 3 is raised at the same time, so that the enclosure moving mechanism 170 is in the state shown in FIG. 16B. Subsequently, the enclosure moving mechanism 170 is operated to be in the state shown in FIG. 16A where the rear part of the upper enclosure 3 is raised to the highest position.

In this case, the display enclosure 4 is independently opened and closed by a manual operation. This opening/closing operation may also be performed in association with an operation of the enclosure moving mechanism 170. As shown in FIG. 17B, the enclosure moving mechanism 170 may be variously realized by changing some or all of its components. In an enclosure moving mechanism 170A shown in FIG. 17B, a gear 178 and a cam member 179 are used instead of the rack 177. In this example, the gear 178 is rotated by the driving gear 176 so that the cam member 179 formed integrally with the gear 178 may be rotated to lift the upper enclosure 3 relative to the lower enclosure 2.

An enclosure lock mechanism 180 is provided in the enclosure moving mechanism 170, making it possible to mechanically lock the three enclosures 2 to 4 and firmly retain a predetermined attitude. The enclosure lock mechanism 180 has a solenoid 181; a stopper pin 182 moved forward and backward by the solenoid 181; and a lock member having a plurality of lock holes 183 with which the stopper pin 182 may be detachably engaged. The lock member in this example is the third intermediate gear 175, and three lock holes 183a, 183b and 183c are provided in the third intermediate gear 175. The three lock holes 183a to 183c are set in predetermined positions on an identical circumference having a rotation center of the third intermediate gear 175 as a center.

The stopper pin 182 is placed relative to the lock member (third intermediate gear) 175 in a place as shown in FIGS. 18A and 18B. FIG. 18A shows a non-operated state of the solenoid 181, where the stopper pin 182 is moved backward. FIG. 18B shows an operated state of the solenoid 181, where the stopper pin 182 is moved forward and engaged with any of the three lock holes 183a to 183c provided in the lock member 175.

Among the three lock holes 183a to 183c, the first lock hole 183a is opposed to the stopper pin 182 in the state shown in FIG. 16A. Here, the laptop 1D is locked in the second non-used state shown in. FIG. 16C by operating the solenoid 181. The second lock hole 183b is opposed to the stopper pin 182 in the state shown in FIG. 16B. Here, the laptop 1D is locked in the first non-used state shown in FIG. 16B by operating the solenoid 181. The third lock hole 183c is opposed to the stopper pin 182 in the state shown in FIG. 16C. Here, the laptop 1D is locked in the used state shown in FIG. 16A by operating the solenoid 181.

In the aforementioned examples, the laptop 1 (or any of the laptops 1A to 1D) may be carried in the following two ways.

In the first way, the optical disk 30 is removed from the disk drive device 20 to make the laptop 1 thinnest (the state shown in FIG. 6C or 16C). In this case, the laptop 1 may be carried in a thinnest state and may be in a form suitable for carrying where the laptop is truly demanded to be thin.

In the second way, the laptop 1 is carried with the optical disk 30 in the disk drive device 20 (the state shown in FIG. 6B or 16B). In this case, the laptop 1 is thicker with the optical disk 30 loaded. FIG. 6A shows a used state of the laptop 1, where the laptop 1 is sufficiently thicker than in the state shown in FIG. 6B and is in an inclined state convenient for use.

FIGS. 19A and 19B show a seventh example of an information processing device according to an embodiment of the present invention. The laptop 1F shown in this example includes a lower enclosure 91 and an upper enclosure 92. The upper enclosure 92 also functions as a display enclosure. The lower enclosure 91 is rotatably connected to the upper enclosure 92 by a hinge 93 placed on a rear surface. An input operation part (not shown) is provided on an upper surface of the lower enclosure 91. A flat panel display such as a liquid crystal display (not shown) is mounted on an inner surface of the upper enclosure 92.

The laptop 1F makes it possible to prevent rotation vibration occurring in the operation of the disk drive device 20 from being transmitted to a user. Therefore, unpleasant feeling due to vibration transmitted to the user is not caused. Further, since the disk drive device 20 having a large area may be eliminated from a main board (the lower enclosure and the upper enclosure), it is possible to reduce a front surface area of the information processing device and reduce the whole device in size.

FIGS. 20A and 20B show a second example of a disk drive device according to an embodiment of the present invention. The disk drive device 95 shown in this example has a holding part holding the optical disk 30, so that the holding part holds a non-recording region provided on an outer periphery of the optical disk 30 to correct a flatness of the optical disk 30 when the disk drive device 95 is made thin to compress a clearance in a disk storage region. In this example, even when the clearance in the disk storage region is minimized, the non-recording region provided on the outer periphery of the optical disk 30 is held from both sides, making it possible to prevent a member such as a top cover from being brought into contact with a recording region of the optical disk 30. Therefore, it is possible to surely prevent the recording region of the optical disk 30 from being damaged by the top cover or the like.

The second example of the disk drive device differs from the aforementioned example only in that first protrusions 96 and second protrusions 97 are provided as a holding part. Therefore, only parts different from those in the aforementioned example are described, and detailed description of the same parts is omitted by attaching the same reference symbols.

The holding part of the disk drive device 95 is formed by the first protrusions 96 and the second protrusions 97. The first protrusions 96 are provided on the tray chassis 23 that is a first member, and the second protrusions 97 are provided on the top cover 24 that is a second member. The first protrusions 96 are formed of three arc-shaped extending protrusions, one of which is provided in the recess 27 of the disk tray 22, another of which is provided in the base member 33, and the remaining one of which is provided in the extended portion 23b of the tray chassis 23. The three first protrusions 96 are placed at equal angle intervals in a circumferential direction on an identical circumference having, as a rotation center, a rotating shaft of the spindle motor 43 mounted on the drive unit 95. Each of the first protrusions 96 is formed protruding upward as a protrusion having a semicircular cross-section.

The second protrusions 97 are formed of three arc-shaped extending protrusions swelling to protrude downward. The three second protrusions 97 are placed at equal angle intervals in a circumferential direction on an identical circumference having, as a rotation center, a rotating shaft of the spindle motor 43 mounted on the drive unit 95.

FIGS. 21A and 21B are cross-sectional views showing the disk drive device 95 having such a configuration, where FIG. 21A shows a used state with the optical disk 30 mounted on the disk mounting part and FIG. 21B shows a carried (non-used) state with the optical disk 30 mounted on the disk mounting part. Since the other configuration is the same as in the aforementioned example, repeated description of the same parts is omitted by attaching the same reference symbols.

In the state shown in FIG. 21A, the top cover 24 is allowed to spring up in a direction away from the tray chassis 23 and the disk storage region is widely opened. In this state, the disk rotary drive mechanism 34 is significantly raised by a spring force of the conical coil springs 67, and the motor base 66 on which the spindle motor 43 is mounted is brought into contact with the stopper members 69 provided in the support shafts 65, so that the disk rotary drive mechanism 34 is positioned in a predetermined height position. Therefore, since the turntable 41 is in a highest position, a lower surface of the non-recording region of the optical disk 30 is significantly away from the first protrusion 96. Since the top cover 24 is allowed to spring up significantly, the second protrusions 97 provided in the top cover 24 are also significantly away from an upper surface of the non-recording region of the optical disk 30.

On the other hand, in the state shown in FIG. 21B, the top cover 24 approaches the tray chassis 23, and the disk storage region is closed and narrowed. In this state, the disk rotary drive mechanism 34 is pressed down against a spring force of the conical coil springs 67 by the pressing projection 68 provided in the top cover 24. Accordingly, the three second protrusions 97 provided in the top cover 24 are brought into contact with the upper surface of the non-recording region of the optical disk 30, and the lower surface of the non-recording region of the optical disk 30 is brought into contact with the three first protrusions 96 provided in the tray chassis 23 and the like.

As a result, the non-recording region provided on the outer periphery of the optical disk 30 mounted on the turntable 41 is held from its both surfaces by the first protrusions 96 and the second protrusions 97. This makes it possible to correct a flatness of the optical disk 30. Moreover, since the outer periphery of the optical disk 30 is held from the both surfaces, it is possible to prevent a member such as a top cover from being brought into contact with the recording region of the optical disk 30. Therefore, it is possible to surely prevent the recording region of the optical disk 30 from being damaged by the top cover or the like.

FIGS. 22A and 22B show an eighth example of a laptop in which the disk drive device 95 is incorporated. Specifically, FIG. 22A shows a used state of a laptop 1G where the display enclosure 4 is raised to expose the input operation part 11, and FIG. 22B shows a carried (non-used) state where the display enclosure 4 is closed. Since the other configuration is the same as in the aforementioned example, repeated description of the same parts is omitted by attaching the same reference symbols.

In the states shown in FIGS. 22A and 22B, an action of the laptop 1G is similar to an action of the disk drive device 95 shown in FIGS. 21A and 21B. That is, the laptop 1G and the disk drive device 95 may be reduced in thickness as a whole when carried. Even when they are made thinner with the optical disk 30 mounted on the disk mounting part, it is possible to prevent the disk drive device 95 from being brought into contact with the information recording surface of the optical disk 30 or damaging the surface. Moreover, such an advantageous effect may surely be obtained by an extremely simplified configuration including first and second protrusions holding the outer periphery of the optical disk 30.

FIG. 23A shows a modified example of the disk drive device 95 shown in FIG. 21. In this modified example, a first protrusion 96a and a second protrusion 97a hold the outer periphery of the optical disk 30. The first protrusion 96a or the second protrusion 97a may have a semicircular or triangular cross-section. In this example, the first protrusion 96a and the second protrusion 97a press an edge of the outer periphery of the optical disk 30 and do not press the information recording surface, so that information may be recorded with high reliability without breaking or damaging data. Moreover, warping of the optical disk 30 may be corrected by pressing the outer periphery of the optical disk.

FIG. 23B shows a structure without the first protrusion 96a and the second protrusion 97a. In this case, when the optical disk 30 is significantly warped, a part of the information recording surface near the outer periphery of the optical disk 30 is brought into contact with the top cover 24, the base member 33 or the like, and the optical disk is rotated in that contact state. Therefore, the information recording surface may be damaged. However, such damage may be avoided in the above example.

Figure 25B:
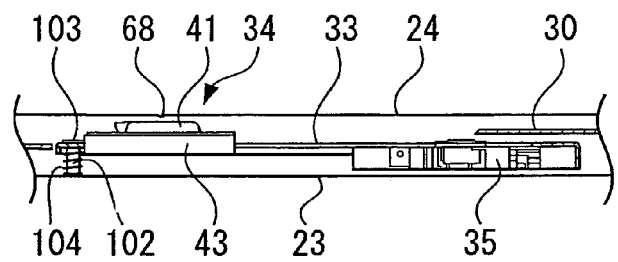
FIG. 25B is a view describing a state with a disk rotary drive mechanism horizontal.
Figure 25C:
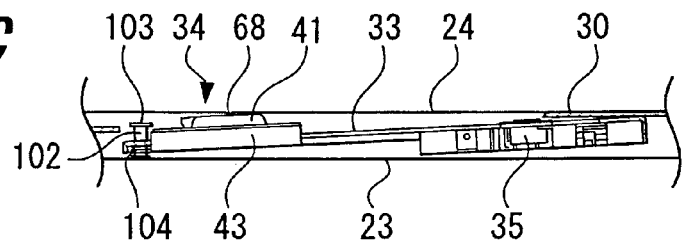
FIG. 25C is a view describing a state with a disk rotary drive mechanism inclined.

FIGS. 24 and 25A to 25C show a fourth example of a disk drive device according to an embodiment of the present invention. In the disk drive device 100 shown in this example, the spindle motor 43 is rigidly fixed to the drive unit 21, while the drive unit 21 is entirely movable (movable as inclined or parallel movable). FIG. 24 is a perspective view of the disk drive device 100. FIG. 25A is a plan view of the disk drive device 100. FIG. 25B is a view describing a state where the drive unit 21 is horizontally placed. FIG. 25C is a view describing a state where the drive unit 21 is inclined to lower the disk rotary drive mechanism 34. Repeated description of the same parts as in the aforementioned example is omitted by attaching the same reference symbols.

The spindle motor 43 is fixed to the base member 33 of the drive unit 21. Rotating shafts 101, 101 protruding outward are provided on both edges of the base member 33 on a side opposite to the spindle motor 43, respectively. The two rotating shafts 101, 101 are rotatably supported by the base member 33. Two guide shafts 102 vertically provided in the tray chassis 23 penetrate the base member 33 on the spindle motor 43 side thereof. Stoppers 103 limiting upward movement of the base member 33 are provided on upper ends of the guide shafts 102, respectively. Further, coil springs 104 showing a specific example of an impelling member are mounted in a compressed state on the guide shafts 102, respectively. The base member 33 is continuously impelled upward and maintained approximately horizontal by a spring force of the coil springs 104. The drive unit 21 is vertically rotated (moved as inclined) around a rotation center line 105 as a center.

FIGS. 26A and 26B show a ninth example of a laptop in which the disk drive device 100 is incorporated. Specifically, FIG. 26A shows a used state of a laptop 1H where the display enclosure 4 is raised to expose the input operation part 11, and FIG. 26B shows a carried (non-used) state where the display enclosure 4 is closed. Since the other configuration is the same as in the aforementioned example, repeated description of the same parts is omitted by attaching the same reference symbols.

In the states shown in FIGS. 26A and 26B, an action of the laptop 1H is similar to an action of the disk drive device 100 shown in FIGS. 24 and 25A to 25C. That is, the laptop 1H and the disk drive device 100 may be reduced in thickness as a whole when carried. Even when they are made thinner with the optical disk 30 mounted on the disk mounting part, it is possible to prevent the disk drive device 95 from being brought into contact with the information recording surface of the optical disk 30 or damaging the surface.

In FIGS. 27A and 27B, the drive unit 21 is parallel movable in a vertical direction. The three or more guide shafts 102 are vertically slidably inserted into the base member 33 of the drive unit 21. The three or more guide shafts 102 are placed surrounding the disk rotary drive mechanism 34 and vertically provided in the tray chassis 23, respectively. The guide shafts 102 are impelled upward by the coil springs 104 mounted on the guide shafts 102, respectively, and their upward movement is limited by the stoppers 103. The same advantageous effect may be obtained with such a configuration. In particular, according to the example shown in FIGS. 24 to 27, the spindle motor 43 in the drive unit 21 may have a simplified support structure, and assembly work may be simplified and performed highly precisely and inexpensively.

FIGS. 28 to 30A and 30B show a fifth example of a disk drive device according to an embodiment of the present invention. The disk drive device 110 shown in this example is formed so that the top cover 24 is parallel to the optical disk 30 when the laptop 1 is used (when the disk drive device is thick). FIG. 28 is a perspective view of the disk drive device 110. FIGS. 29A and 29B are views describing a moving direction conversion mechanism. FIG. 30A is a view describing a state where the optical disk 30 is mounted on the turntable 41. FIG. 30B is a view describing a state where the optical disk 30 is removed from the turntable 41. Repeated description of the same parts as in the aforementioned example is omitted by attaching the same reference symbols.

Guide pins 111 protruding sideward are provided in front and rear parts on one side surface of the tray chassis 23, respectively. A guide pin 112 similarly protruding sideward is provided in a rear part on the other side surface of the tray chassis 23. Guide grooves 113 with which the guide pins 111 and 112 are slidably engaged, respectively, are provided in three places in the top cover 24 corresponding to the guide pins 111 and 112. Each of the guide grooves 113 has a longitudinally extending upper horizontal part; an inclined part extending obliquely downward from a front edge of the upper horizontal part; and a lower horizontal part longitudinally extending from a front edge of the inclined part. The upper horizontal part and the lower horizontal part are parallel to each other at a predetermined interval between them in a longitudinal direction. The top cover 24 may be horizontally moved within a step between the horizontal parts with the top cover 24 maintained parallel to the tray chassis 23.

A moving direction conversion mechanism 115 is provided in a rear part of the top cover 24 in order to lift the top cover 24. As shown in FIG. 28, the moving direction conversion mechanism 115 is formed of a coil spring 116 showing a specific example of an impelling member pulling the top cover 24 rearward; a passive cam 117 provided in the rear part of the top cover 24; and an active cam 118 provided on the upper enclosure 3. A tip of the passive cam 117 is a cam having an inclination angle of about 450°. A tip of the active cam 118 brought into contact with the tip is also formed to have an equal inclination angle. The other configuration is the same as in the disk drive device of the aforementioned example.

The tray chassis 23 is fixed to the lower enclosure 2 and the top cover 24 is pulled rearward by the coil spring 116 in this manner, so that the three guide pins 111 and 112 are placed on front edges of the lower horizontal parts of the three guide grooves 113, respectively. Therefore, the top cover 24 is parallel to the tray chassis 23 in a position most remote from the tray chassis 23 (the state shown in FIG. 30A). Accordingly, in this state, the disk storage region is widest, and the optical disk 30 mounted on the turntable 41 is rotatable with sufficient clearances on its upper and lower surfaces, respectively.

When the moving direction conversion mechanism 115 is operated in the state shown in FIG. 30A to press down the active cam 118, the cam surface of the active cam 118 is brought into slide contact with the cam surface of the passive cam 117 to move the top cover 24 forward through the passive cam 117. Here, since the three guide pins 111 and 112 are guided to the three guide grooves 113 and moved in the same positions, the top cover 24 is maintained to be parallel to the tray chassis 23 and moved in a direction to approach the tray chassis 23. When the guide pins 111 and 112 are moved to the upper horizontal parts of the guide grooves 113, respectively, the top cover 24 approaches closest to the tray chassis 23 and the disk storage region is most narrowed.

Here, as in the aforementioned example, the disk rotary drive mechanism 34 is pressed down against a spring force of the conical coil springs by the pressing projection of the top cover 24. As a result, a laptop 1I is thinnest in the state shown in FIG. 30B. FIG. 31B shows a state where the laptop 1I is thinnest. FIG. 31A shows a state of the laptop 1I corresponding to FIG. 30A.

FIGS. 32, 33A and 33B show a first modified example of the disk drive device 110. In this example, the drive unit 21 is moved as inclined as shown in FIGS. 24 and 25A to 25C. An inclination mechanism in this example is described above and therefore its description is omitted here. In the examples shown in FIGS. 28 to 33A and 33B, the top cover 24 is parallel to the optical disk 30 when the disk drive device 110 is used, so that a pressure may be constant during disk rotation. As a result, it is possible to effectively suppress vibration generated in a direction perpendicular to a plane direction of the optical disk 30.

FIGS. 34A and 34B show a second modified example of the disk drive device 110. In this example, the upper enclosure 3 is moved parallel to the lower enclosure 2. The aforementioned pantograph mechanism may be used as its parallel moving mechanism. The same advantageous effect as in the aforementioned example may be obtained in this example.

FIGS. 35A, 35B and 35C show a seventh example of a disk drive device according to an embodiment of the present invention. The optical disk 30 is stored in a disk storage region of the disk drive device 120 shown in this example in two steps, making it possible to control a thinness of the disk drive device 120 stepwise.

FIGS. 35A and 36A show a used state of the disk drive device 120 and a laptop 1J (where the disk drive device is thick). In this state, the flat panel display is opened and the optical disk 30 is mounted on a disk mounting part. An enclosure is in a normal thickness step where the enclosure is thickest. FIGS. 35B and 36B show a first carried state of the disk drive device 120 and the laptop 1J. In this state, the flat panel display is closed, and the optical disk 30 is mounted on the disk mounting part and stored. Here, the enclosure is in a first thickness step where the enclosure has a medium thickness. FIGS. 35C and 36C show a second carried state of the disk drive device 120 and the laptop 1J. In this state, the flat panel display is closed and the optical disk 30 is not mounted on the disk mounting part. Here, the enclosure is in a second thickness step where the enclosure is thinnest.

According to this example, an information processing device during storage of an optical disk may be thinner than the information processing device during use by setting the first thickness as a medium thickness.

FIGS. 37, 38A, 38B, 39A, 39B, 40A and 40B show eighth to tenth examples of a disk drive device according to an embodiment of the present invention. In any of the disk drive devices 121 to 123 shown as the seventh to ninth examples, the top cover 24 may be moved relative to the tray chassis 23 in a thickness direction of the disk drive device, and the drive unit 21 has a modified moving mechanism.

The disk drive devices 121 to 123 are approximately identical in configuration to the aforementioned disk drive device 110 but differ from the disk drive device 110 in that guide grooves 125 straightly extending in the thickness direction are provided in four places in the top cover 24 in this example, although the obliquely extending guide grooves 113 are provided in the top cover 24 of the disk drive device 110. Guide pins 126 are provided in four places in the tray chassis 23 corresponding to the four guide grooves 125 of the top cover 24. The four guide grooves 126 are provided so that two of the four guide grooves 126 are formed on each side surface of the tray chassis 23 to protrude inward at a predetermined interval between them in a longitudinal direction. The four guide pins 126 are slidably engaged with the four guide grooves 125, respectively, and may be moved in the guide grooves 125 relatively in the thickness direction.

In the disk drive device 121 according to the eighth example shown in FIG. 38, the drive unit 21 may be rocked by the rocking mechanism described in the example shown in FIG. 26. Accordingly, the drive unit 21 is supported to be vertically rotatable relative to the tray chassis 23. As a result, the turntable 41 of the drive unit 21 may be selectively either in a horizontal state shown in FIG. 38A or in an inclined state shown in FIG. 38B where the turntable 41 is lower in the front. The other configuration is the same as in the aforementioned example shown in FIG. 26.

In the disk drive device 122 according to the ninth example shown in FIG. 39, the drive unit 21 may be vertically -moved with a horizontal state maintained by the horizontal moving mechanism described in the example shown in FIG. 30. Accordingly, the turntable 41 of the drive unit 21 is supported to be liftable in a vertical direction relative to the tray chassis 23. As a result, the turntable 41 of the drive unit 21 may be selectively either in an upper position shown in FIG. 39A where the turntable 41 is away from the tray chassis 23 and lifted or in a lower position shown in FIG. 39B where the turntable 23 is pressed toward the tray chassis 23. The other configuration is the same as in the aforementioned example shown in FIG. 30.

In the disk drive device 123 according to the tenth example shown in FIGS. 40A and 40B, protrusions 191 and 192 according to the third example shown in FIG. 21 are provided in disk drive device 123 according to the ninth example shown in FIG. 39, so that the non-recording region of the optical disk 30 may be directly held. In this example, a wide disk storage region may be ensured in the state shown in FIG. 39A. On the other hand, in the state shown in FIG. 39B, the protrusions 191 provided to the top cover 24 and the protrusion 192 provided to the base member 33 hold the outer periphery of the optical disk 30 during non-use, making it possible to firmly hold the optical disk 30.

FIGS. 41A and 41B show a first example where the disk drive device 20 may be detached from the enclosures of the laptop 1. The laptop 1 includes the lower enclosure 2, the upper enclosure 3 and the display enclosure 4, and a drive storage part 40 provided on a plane where the lower enclosure 2 is brought into contact with the upper enclosure 3. The drive storage part 40 has an opening on one side surface of the enclosures, and the disk drive device 20 may be detached from the opening. The disk drive device 20 includes an enclosure having the tray chassis 23 and the top cover 24; and the disk tray 22 inserted into and removed from the enclosure.

FIG. 41A shows a state where the disk drive device 20 is removed from the enclosures and the disk tray 22 is pulled out from the enclosure of the disk drive device 20. FIG. 41B shows a state where the disk tray 22 is stored in the enclosure of the disk drive device 20. FIG. 42A shows a state where the disk drive device 20 is stored in the enclosure of the laptop 1. FIG. 42B shows a state where the display enclosure 4 is folded and the whole size of the laptop 1 is minimized. The laptop 1 is usually carried in the state shown in FIG. 42B.

FIGS. 43A and 43B show a second example where the disk drive device 20 may be detached from the enclosures of the laptop 1. This laptop 1 differs from the laptop 1 shown in FIGS. 41A and 41B in terms of an enclosure structure. Specifically, the enclosures according to the second example have a bottom opening separated from a side surface opening. The other configuration is the same as in the aforementioned example shown in FIGS. 41A and 41B. Therefore, repeated description of the same parts is omitted by attaching the same reference symbols.

FIG. 43A shows a state where the disk drive device 20 is removed from the enclosures and the disk tray 22 is pulled out from the enclosure of the disk drive device 20. FIG. 43B shows a state where the disk tray 22 is stored in the enclosure of the disk drive device 20. FIG. 44A shows a state where the disk drive device 20 is stored in the enclosures of the laptop 1. FIG. 44B is a bottom view showing a state where the display enclosure 4 is folded and the whole size of the laptop 1 is minimized. In this example, since a lower surface of the drive storage part 40 is opened, the lower enclosure 2 may be thinner by eliminating a thickness of the lower surface of the lower enclosure 2.

FIG. 45 is a block diagram schematically describing a configuration of a control device in accordance with an information processing device according to an embodiment of the present invention. A control device 200 has a power supply switch 201, an eject button switch 202, a disk detection switch 203, an LCD panel detection switch 204, a spindle motor control circuit 205 and a lifting motor 206 which are electrically connected to each other. The power supply switch 201 turns a power supply of the laptop 1 on and off, and its ON or OFF signal is supplied to the control device 200. The eject button switch 202 is operated when the optical disk 30 is removed from the disk drive device 20, and its operation signal is supplied to the control device 200. The disk detection switch 203 is a detection mechanism detecting whether or not the optical disk 30 is mounted on the turntable 41 of the disk drive device 20. A corresponding detection signal is supplied to the control device 200 based on whether or not the optical disk 30 is mounted on the turntable 41.

The LCD panel detection switch 204 is a switch detecting whether the display enclosure 4 is opened or closed. The LCD panel detection switch 204 detects a state where the display enclosure 4 approaches the upper enclosure 3 within a predetermined distance and is immediately before being superposed on the upper enclosure 3, for example, and outputs its detection signal. The spindle motor control circuit 205 controls driving of the spindle motor 43 based on a control signal supplied from the control device 200, and immediately stops the spindle motor 43 when the display enclosure 4 is immediately closed, for example. The lifting motor 206 is an electric motor forming a driving source automatically lifting the turntable 41 of the disk drive device 20.

The control device 200 having such a configuration may control respective parts through a control mechanism shown in FIGS. 46 to 51, for example. FIG. 46 is a flow chart showing a first example of driving control using the control device 200. First, a power supply of the laptop 1 is manually turned on in Step S1, so that the control is passed to Step S2. An eject button is manually pushed in Step S2, so that the control is passed to Step S3 to open the disk tray 22.

Next, the disk tray 22 is closed by mounting the optical disk 30 on the disk tray 22, for example, so that the control is passed to Step S5 to determine whether or not the optical disk 30 is mounted on the disk tray 22. Processing is terminated when it is determined in Step S5 that the optical disk 30 is not mounted on the disk tray 22. On the other hand, when it is determined that the optical disk 30 is mounted on the disk tray 22, the control is passed to Step S6 to perform recording (writing) and/or reproduction (reading) processing of an information signal on the optical disk 30.

Next, the control is passed to Step S7 to determine whether or not an LCD panel is closed, that is, the display enclosure 4 is closed. When it is determined in Step S7 that the display enclosure 4 is closed, the control is passed to Step S9 to stop the spindle motor 43 and the processing is terminated. On the other hand, the control is passed to Step S8 when it is determined in Step S7 that the display enclosure 4 is not closed. This Step S8 determines whether or not recording and/or reproduction processing of an information signal on the optical disk 30 is terminated. When it is determined in Step S8 that the recording and/or reproduction processing is terminated, the control is passed to Step S6 to repeat the following processing. On the other hand, when it is determined in Step S8 that the recording and/or reproduction processing is not terminated, the control is passed to Step S9 to stop the spindle motor 43 and the processing is terminated.

This example based on the first flow chart may be applied to a laptop without the aforementioned enclosure lock mechanism 180. Further, this example may be applied to a disk drive device which may not reduce a disk storage region in size when an optical disk is mounted on a turntable.

FIG. 47 is a flow chart showing a second example of driving control by the control device 200 and formed by partially modifying the flow chart according to the first example. This second example may be applied to a laptop having the enclosure lock mechanism 180. The flow chart according to the second example differs from the flow chart according to the first example in that Step S11 is provided following Step S2, Step S12 and Step S13 are provided following S6, and Step S14 is provided following Step S9. The other processing steps are the same.

Step S11 performed following Step S2 is a step of locking an LCD panel. Specifically, the enclosure lock mechanism 180 is operated to retain an attitude of the display enclosure 4 at that time. Step S12 performed following Step S6 determines whether or not an eject command is output. This determination may be performed by observing whether or not an operation signal of the eject button is output. The control is passed to Step S13 when it is determined in Step S12 that an eject command is output, that is, the eject button is operated. The spindle motor 43 is stopped in Step S13 and the control is returned to Step S3.

On the other hand, in the case where the control is passed to Step S9 through Step S8 based on determination in Step S12, the control is passed to Step S14 from Step S9. In Step S14, the enclosure lock mechanism 180 locked in Step S11 is unlocked to terminate this processing. When it is determined in Step S5 that the disk tray 22 does not have an optical disk, the control is passed to Step S14 to terminate this processing.

FIG. 48 is a flow chart showing a third example of driving control by the control device and suitably used for a laptop having an electric enclosure moving mechanism shown in FIGS. 16A to 16C and having a height adjustable in two steps. The control is passed to Step S21 from Step S1 to perform control of increasing the laptop in thickness. Accordingly, the laptop may be used as a typical laptop as in the case of Step S22. Next, when the control is passed to Step S23 and a power supply of the laptop is turned off, its command is retained in a predetermined part.

Next, the control is passed to Step S24 to determine whether or not the disk tray 22 is opened. This determination may be performed based on a signal from a switch detecting a position of the disk tray 22. When it is determined in Step S24 that the disk tray 22 is opened, the control is passed to Step 25 to output a signal to close the disk tray 22 and then returned to Step S24. On the other hand, when it is determined in Step S24 that the disk tray 22 is closed, the control is passed to Step S26 to perform control of reducing the laptop in thickness. Next, the control is passed to Step 27 to perform processing to turn off the power supply.

FIG. 49 is a flow chart showing a fourth example of driving control by the control device and suitably used for a laptop having an electric enclosure moving mechanism shown in FIGS. 16A to 16C and having a height adjustable in two steps. The flow chart according to the fourth example differs from the flow chart according to the second example in that Step S21 is provided instead of Step S11 and Step S26 is provided instead of Step S14. The other processing steps are the same.

Step S21 performed following Step S2 is a step of increasing a laptop in thickness. Step S26 performed following Step S9 is a step of reducing a laptop in thickness. When the spindle motor 43 is stopped in Step S9, the laptop is still thick if an optical disk is mounted on the turntable 41. The laptop is also still thick if a power supply is turned off in this state. On the other hand, when Step S26 is performed following Step S9, the laptop is thick only during opening/closing of the disk tray 22 and rotation of the optical disk 30. When the laptop is thin with the optical disk mounted on the turntable 41, processing is performed to increase the laptop in thickness only if a recording/reproduction command is supplied.

FIG. 50 is a flow chart showing a fifth example of driving control by the control device and suitably used for a laptop having an electric enclosure moving mechanism shown in FIGS. 16A to 16C and having a height adjustable in two steps. The flow chart according to the fifth example differs from the flow chart according to the third example in that Step S31 is provided following Step S1, Step S26 is not provided, and Step S5 is provided following Step S24. The other processing steps are the same.

In Step S31, it is determined whether or not a laptop is thick. When it is determined in Step S31 that the laptop is not thick, the control is passed to Step S21 to perform processing of increasing the laptop in thickness. On the other hand, when it is determined in Step S31 that the laptop is thick, the control is passed to Step S22. In Step S5 performed following Step S24, it is observed whether or not an optical disk is mounted on the turntable 41. When it is determined in Step S5 that the optical disk is not mounted, the control is passed to Step S26 to perform processing of reducing the laptop in thickness. On the other hand, when it is determined in Step S5 that the optical disk is mounted, the control is passed to Step S27 and a power supply is turned off.

Finally, FIG. 51 is a flow chart showing a sixth example of driving control by the control device and suitably used for a laptop having an electric enclosure moving mechanism shown in FIGS. 16A to 16C and having a height adjustable in two steps. The flow chart according to the sixth example differs from the flow chart according to the third example in that Step S41 is provided following Step S1, Step S5 and Step S42 are provided following S24, and Step S43 is performed after the Step S5 when the result is Yes in Step S5. The other processing steps are the same.

In Step S41, it is determined whether or not a laptop is thickest. When it is determined in Step S41 that the laptop is not thickest, the control is passed to Step S21 to perform processing of increasing the laptop in thickness. On the other hand, when it is determined in Step S41 that the laptop is thickest, the control is passed to Step S22. Step 42 that is one step based on determination in Step S5 performs processing of making the laptop thinnest. On the other hand, Step 43 that is the other step based on determination in Step S5 performs processing of allowing the laptop to have a medium thickness. Thereafter, the control is passed to Step 27, respectively.

As heretofore described, by performing processing as shown in the aforementioned six flow charts, an information processing device may be thinner during carrying where it is truly important to make the information processing device thin.

Only an enclosure moving mechanism is shown in the figures and description of a lifting restraint mechanism and a lock mechanism is omitted in any of the laptop 1D shown in FIG. 15, the laptop 1E shown in FIG. 18, the laptop 1F shown in FIG. 19, the laptop 1G shown in FIG. 22, the laptop 1H shown in FIGS. 26 and 27, the laptop 1I shown in FIG. 31 and the laptop 1J shown in FIGS. 34 and 36; however, the lifting restraint mechanism and the lock mechanism may obviously be applied to these laptops.

As described above, according to the embodiments of the present invention, an information processing device may have a small thickness during carrying where it is truly important to make the information processing device thin. Further, an information processing device may be thin even when a disk-shaped recording device is stored in a disk drive device. The present invention is not limited to the embodiments described above and shown in the drawings, and various modifications may be effected without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a flat rectangular parallelepiped upper enclosure having an input operation part for inputting an operation signal;
a flat rectangular parallelepiped lower enclosure which supports the upper enclosure with a varied attitude and on which the upper enclosure is superposed;
a disk drive device stored in one of the upper enclosure and the lower enclosure and having a disk mounting part on which a disk-shaped recording medium is detachably mounted, the disk drive device carrying out at least one of recording of a first information signal on and reproducing of a second information signal from the disk-shaped recording medium mounted on the disk mounting part and rotationally driven; and
an enclosure moving mechanism setting a disk storage region to have a first thickness with the upper enclosure allowed to have a distance from the lower enclosure when the disk drive device is used and setting the disk storage region to have a second thickness smaller than the first thickness with the upper enclosure allowed to come close to the lower enclosure to reduce the disk storage region when the disk drive device is not used.

2. An information processing device according to claim 1, wherein the enclosure moving mechanism comprises:
a first hinge rotatably connecting the upper enclosure to the lower enclosure; and
a rotatable cam member between the upper enclosure and the lower enclosure rotated so that the upper enclosure can come close to and have the distance from the lower enclosure with the first hinge as a rotation center.

3. An information processing device according to claim 2, further comprising:
a display enclosure rotatably connected to the upper enclosure through a second hinge and superposed on the upper enclosure, wherein
the second hinge has the cam member, and
the display enclosure is rotated to rotate the cam member so that the upper enclosure can come close to and have the distance from the lower enclosure.

4. An information processing device according to claim 1, wherein the enclosure moving mechanism comprises:
a pair of pantographs supporting the upper enclosure and the lower enclosure movable in parallel or with a varied attitude from both sides; and
a rotatable cam member between the upper enclosure and the lower enclosure and rotated so that the upper enclosure can come close to and have the distance from the lower enclosure through the pair of pantographs.

5. An information processing device according to claim 1, wherein the enclosure moving mechanism comprises a first hinge rotatably connecting the upper enclosure to the lower enclosure, a rotatable cam member between the upper enclosure and the lower enclosure, and a gear train rotating the cam member; and
wherein the gear train is rotated to rotate the cam member to allow the upper enclosure to come close to and have the distance from the lower enclosure.

6. An information processing device according to claim 1, wherein
the enclosure moving mechanism has a restraining mechanism preventing the upper enclosure from moving more than a predetermined distance from the lower enclosure.

7. An information processing device according to claim 6, wherein the information processing device is a laptop computer.

8. An information processing device according to claim 1, wherein the disk drive device comprises:
a support part allowing the disk mounting part to come close to and have a second distance from the upper enclosure;
a height determination part restricting movement of the disk mounting part toward the upper enclosure; and
an impelling member impelling the disk mounting part toward the height determination part.

9. An information processing device according to claim 1, wherein the upper enclosure comprises:
a pressing part brought into contact with the disk mounting part with the upper enclosure superposed on the lower enclosure.

10. An information processing device according to claim 1, further comprising:
a first detection mechanism detecting a rotation operation of the disk drive device and outputting a detection signal thereof; and
a first lock mechanism preventing the upper enclosure from coming close to the lower enclosure based on the detection signal from the first detection mechanism when the disk drive device is driven.

11. An information processing device according to claim 1, wherein the disk drive device has a spindle motor rotationally driving the disk mounting part, the information processing device further comprising:
a first detection mechanism detecting a rotation operation of the disk mounting part and outputting a first detection signal thereof;
a second detection mechanism detecting a change in the enclosure moving mechanism and outputting a second detection signal thereof; and
a motor stopping mechanism stopping the spindle motor based on the first detection signal from the first detection mechanism and the second detection signal from the second detection mechanism if the upper enclosure comes close to the lower enclosure when the disk drive device is driven.

12. An information processing device according to claim 1, further comprising:
a third detection mechanism detecting whether or not the disk-shaped recording medium is mounted on the disk mounting part and outputting a detection signal thereof; and a second lock mechanism preventing the upper enclosure from coming close to the lower enclosure based on the detection signal from the third detection mechanism when the disk-shaped recording medium is mounted on the disk mounting part.

13. A disk drive device comprising:

a disk rotary driving part having a disk mounting part on which a disk-shaped recording medium is detachably mounted and rotating the disk mounting part;

a pickup part carrying out at least one of recording of an information signal on and reproducing of the information signal from the disk-shaped recording medium mounted and rotated on the disk mounting part;

a pickup moving part moving the pickup part in a radial direction of the disk-shaped recording medium;

a chassis supporting the disk rotary driving part, the pickup part and the pickup moving part;

a first member covering a first side of the chassis having the disk mounting part;

a second member covering a second side of the chassis opposite to the disk mounting part and movable relative to the first member;

a support part supporting the disk rotary driving part to come close to and have a distance from the first member;

a height determination part restricting movement of the disk rotary driving part toward the first member; and an impelling member impelling the disk rotary driving part toward the height determination part.

14. A disk drive device according to claim 13, wherein the first member and the second member comprise a disk holding part holding the disk-shaped recording medium mounted on the disk mounting part from both sides when the first member and the second member are allowed to come close to each other.

15. A disk drive device according to claim 14, wherein the disk holding part comprises:

a first protrusion provided in the first member and protruding toward the disk-shaped recording medium to be brought into contact with a non-recording region on one surface of the disk-shaped recording medium; and a second protrusion provided in the second member and protruding toward the disk-shaped recording medium to be brought into contact with a non-recording region on the other surface of the disk-shaped recording medium.

16. A disk drive device according to claim 13, wherein the chassis is rocked and supported by one of the first member and the second member, and the chassis is rocked so that the disk rotary driving part is inclined relative to, comes close to, and has the distance from the other of the first member and the second member.

17. A disk drive device according to claim 16, wherein at least part of the pickup part is placed outside in a radial direction of the disk-shaped recording medium from a rocking center of the chassis when the disk rotary driving part supported by the chassis has the distance from the other of the first member and the second member.

18. A disk drive device according to claim 13, further comprising:

a parallel moving mechanism changing an interval between a first main surface of the first member and a second main surface of the second member with the first and second main surfaces maintained parallel to each other.

19. A disk drive device according to claim 13, further comprising:

a disk detector detecting whether the disk-shaped recording medium is mounted on the disk mounting part and outputting a detection signal thereof; and an interval adjusting mechanism maintaining a first interval between a first main surface of the first member and a second main surface of the second member during at least one of recording and reproduction, and maintaining a second interval narrower than the first interval during storage, with the disk-shaped recording medium mounted on the disk mounting part based on the detection signal from the disk detector.

* * * * *